US005138348A

United States Patent [19]

Hosaka et al.

[11] Patent Number: 5,138,348

[45] Date of Patent: Aug. 11, 1992

[54] APPARATUS FOR GENERATING IONS USING LOW SIGNAL VOLTAGE AND APPARATUS FOR ION RECORDING USING LOW SIGNAL VOLTAGE

[75] Inventors: Yasuo Hosaka, Tokyo; Tadayoshi Ohno, Kawasaki; Hideyuki Nakano, Tokyo; Hitoshi Nagato, Kawasaki, all of Japan

[73] Assignee: Kabushiki Kaisha Toshiba, Kawasaki, Japan

[21] Appl. No.: 453,298

[22] Filed: Dec. 22, 1989

Related U.S. Application Data

[63] Continuation-in-part of Ser. No. 434,424, Nov. 13, 1989, Pat. No. 4,985,716.

[30] Foreign Application Priority Data

Dec. 23, 1988 [JP] Japan ................................ 63-325585
Mar. 14, 1989 [JP] Japan ................................ 63-59705

[51] Int. Cl.[5] ............................................ G01D 15/06

[52] U.S. Cl. ................................ 346/159; 346/153.1; 346/160.1

[58] Field of Search ............ 346/154, 155, 159, 160.1, 346/153.1; 355/261, 265, 267, 221, 269

[56] References Cited

U.S. PATENT DOCUMENTS

| | | | |
|---|---|---|---|
| 3,725,950 | 4/1973 | Lamb | 346/154 |
| 4,023,900 | 5/1977 | Whittaker et al. | 355/261 X |
| 4,155,093 | 5/1979 | Fotland et al. | 346/159 |
| 4,160,257 | 7/1979 | Carrish | 346/159 |
| 4,172,565 | 10/1979 | Zaffarano | 242/67 PR |
| 4,181,912 | 1/1980 | Satake | 346/154 |
| 4,265,998 | 5/1981 | Barkley | 355/269 |
| 4,423,134 | 12/1983 | Miyakawa et al. | 430/103 |
| 4,494,129 | 1/1985 | Gretchev | 346/154 |
| 4,538,163 | 8/1985 | Sheridon | 346/155 |
| 4,558,334 | 12/1985 | Fotland | 346/159 |
| 4,626,876 | 12/1986 | Miyagawa et al. | 346/160 |
| 4,697,196 | 9/1987 | Inaba et al. | 346/159 |
| 4,783,716 | 11/1988 | Nagase | 361/225 |
| 4,803,503 | 2/1989 | Mayer | 346/159 |
| 4,903,049 | 2/1990 | Sotack | 346/159 |
| 4,918,468 | 4/1990 | Miekka et al. | 346/159 |
| 4,956,670 | 9/1990 | Masuda et al. | 346/159 X |

FOREIGN PATENT DOCUMENTS

| | | |
|---|---|---|
| 0055599 | 12/1981 | European Pat. Off. . |
| 0232136 | 8/1987 | European Pat. Off. . |
| 63-143573 | 12/1986 | Japan . |

OTHER PUBLICATIONS

Patent Abstracts of Japan, vol. 11, No. 111 (M-578) (2558) Apr. 8, 1987; Fuji Xerox Co. Ltd.
Patent Abstracts of Japan, vol. 10, No. 34, (P-427) (2091) Feb. 8, 1986, Olympus Kogaku Kogyo K.I.
Patent Abstracts of Japan, vol. 9, No. 242 (M-417) (1965) Sep. 28, 1985, Nippon Denshin Denwa Kosha.
Patent Abstracts of Japan, vol. 7, No. 120 (M-217) (1265) May 25, 1983, Nippon Denshin Denwa Kosha.
Patent Abstracts of Japan, vol. 10, No. 134 (M-479) (2191) May 17, 1986, Canon K.K.
Patent Abstracts of Japan, vol. 11 No. 318 (M-632) (2765) Oct. 16, 1987, Canon Inc.

*Primary Examiner*—George H. Miller, Jr.
*Assistant Examiner*—Randy W. Gibson
*Attorney, Agent, or Firm*—Foley & Lardner

[57] ABSTRACT

An apparatus for ion recording using an apparatus for generating ions which can be operated by a low signal voltage. The corona ions are controlled either by imposing the low signal voltage which changes the voltage level of the corona ion generation section above and below the critical voltage for corona ion generation, or by controlling the flows of constantly generated corona ions using the low signal voltage which changes the relative voltage level of the corona ion generation section in order to turn the flows of corona ions on and off.

31 Claims, 43 Drawing Sheets

PROIR ART

FUG.50

APPARATUS FOR GENERATING IONS USING LOW SIGNAL VOLTAGE AND APPARATUS FOR ION RECORDING USING LOW SIGNAL VOLTAGE

This is a continuation-in-part application of our earlier copending, commonly assigned Ser. No. 07/434,424, U.S. Pat. No. 4,985,716 which is entitled "Apparatus for Generating Ions Using Low Signal Voltage," and filed Nov. 13, 1989, patented Jan. 15, 1991.

BACKGROUND OF THE INVENTION

1. Field of the Invention

The present invention relates to an apparatus for generating ions which is suitable as a source of corona ions for forming electrostatic latent images in an electrostatic printer, and an apparatus for ion recording using such an apparatus for generating ions.

2. Description of the Background Art

As a conventional apparatus for generating ions to be used as a source of corona ions for forming electrostatic latent images in an electrostatic printer, there is one comprising a corona charger or a solidified ion generation substrate, and an ion current control electrode on which a multiplicity of slits corresponding to recording dots are provided. In this apparatus for generating ions, a flow of ion currents flowing towards a recording medium is allowed or disallowed by controlling a high voltage to be applied to the ion current control electrode. In particular, with the solidified ion generating substrate it has been possible to generate highly dense corona ions which are suitable for a high speed recording.

This type of an apparatus for generating ions is disclosed in U.S. patent Ser. No. 4,155,093, which is schematically shown in FIG. 1.

As shown in FIG. 1, there are two electrodes 102 and 103 provided above and below an insulative substrate 101, respectively, of which the electrode 103 has an incision or a hole 104 for increasing a field concentration so as to be able to generate corona ions more easily. Between these electrodes 102 and 103, an alternating voltage 105 is applied, so that a strong alternating field is created in the incision or hole 104 by which highly dense positive and negative ions are generated. Out of these generated ions, only the negatively charged ones are selectively allowed to flow towards acceleration electrodes 107 as ion currents by means of a control voltage 106 to be applied to the electrode 103. These ion currents are accelerated by a voltage 108 applied to the acceleration electrodes 107 so as to reach an insulative recording medium 109 on which an electrostatic latent image is to be formed.

A so called ion recording head is a collection of as many apparatuses for generating ions of the type described above as a number of picture elements required. Such an ion recording head is known to have the following drawbacks. First, because both of the positive and negative corona ions are steadily generated by the electrodes for generating ions, a lifetime of the insulative substrate is shortened and at the same time an ozone odor is produced as the corona ions leak out. Second, the control voltage to be applied to the control electrode is required to be as high voltage of over 400V. As a consequence, since a control IC for controlling such a high voltage inevitably occupies a large mounting area which is prohibitive for a highly condensed implementation, a realization of a highly compact ion recording head has been difficult.

As a method of reducing the control voltage, there was a proposition made in Japanese Patent Application Laid open No. S61-255870, in which a control voltage is applied in a direction perpendicular to the slits for the corona ions to pass through. According to this proposition, it is possible to reduce the control voltage to a low voltage of approximately 30V. However, since it is necessary to provide additional electrodes for producing a field perpendicular to the slits, a structure is further complicated. This gives rise to a limitation in terms of a mounting area, which in turn gives rise to limitations on the resolution of the image and the number of picture elements that can be incorporated.

In addition to these problems of a conventional apparatus for generating ions, there is a general problem associated with an apparatus for generating ions. Namely, the generation of the ions in an apparatus for generating ions is affected by environmental conditions of the apparatus, because a critical voltage for the corona ion generation and the amount of corona ion currents changes and the corona ion generation becomes uneven, as the environmental condition of the apparatus changes. Among the environmental conditions that affects the corona ion generation, the temperature affects the critical voltage for the corona ion generation, whereas the atmospheric pressure affects the amount of the corona ion currents and the critical voltage. Also, a vapor condensation on the electrode for generating ions occurring at a high humidity condition can prevent the corona ion generation altogether.

More specifically, the effects of the environmental conditions on the corona ion generation by an apparatus for generating ions can be analyzed as follows.

When a pair of parallel electrodes in the apparatus which are provided on an insulator are approximated by a pair of parallel wires, the critical voltage for the corona ion generation is given by:

$$V_T = 30m\delta\left(1 + \frac{0.301}{\sqrt{a\delta}}\right)a \cdot \ln\left(\frac{L}{a}\right)(kV) \tag{1}$$

$$\delta = \frac{3.92P}{273 + T} \tag{2}$$

where $2a$ is equal to a thickness of the electrodes(cm), L is a distance between the electrodes(cm), P is an atmospheric pressure(cmHg). T is a temperature(° C.), m is a coefficient depending on cleanness of the surface of the electrodes which is equal to 1 when the surface is clean (See R. M. Shaffert "Electrophotography", p.235, Focal Press, London, 1980). According to these equations (1) and (2), for the apparatus with L=100 micron and a=10 micron, the critical voltage $V_T$ is roughly 650V at 25° C. and 76 cmHg.

The dependence of the critical voltage on temperature is shown in FIG. 2. As can be seen from FIG. 2, the critical voltage at 0° C. is roughly 60V higher than that at 25° C. In fact, for a given amount of ion currents, the control voltage needs to be roughly 60V higher at 0° C. than at 25° C.

The dependence of the critical voltage on atmospheric pressure is shown in FIG. 3. As can be seen from FIG. 3, the critical voltage at 71 cmHg(950 mb) is roughly 40V lower than that at 76 cmHg(1013 mb). In fact, for a given amount of ion currents, the control voltage needs to be roughly 40V lower at 71 cmHg than at 76 cmHg. Furthermore, because the mobility of the corona ions is inversely proportional to the atmospheric pressure, the amount of ion currents changes slightly, and accordingly there is a slight shift of curves in FIG. 3 as indicated by a one dot chain line.

Thus, the critical voltage for corona ion generation is greatly affected by the temperature and the atmospheric pressure, while the amount of corona ion currents is also affected by the atmospheric pressure to a smaller extent. It is to be noted that these environmental conditions usually do not change very much during a particular operation of the apparatus, so that once the operation is started out successfully, a fairly stable operation can be expected.

On the other hand, when a vapor condensation on the electrode for generating ions occurs at a high humidity condition, the corona ion generation is prevented altogether. In this condition, if the control voltage is increased to approximately 900V the insulation by the air is lost and the spark discharge occurs as shown in FIG. 4, which in turn causes the breakdown of the electrodes.

In the apparatus for generating ions using a solidified ion generation substrate, resister heat elements for removing the vapor condensation on the electrodes may be provided. Alternatively, a high frequency voltage which is lower than the critical voltage may be applied between the electrodes before the operation so as to heat up the electrodes through the insulator by the induction loss of the insulator, as disclosed in Japanese Patent Application Laid Open No. 63-18372.

An apparatus described in the last reference is schematically shown in FIG. 5. In this apparatus, a high frequency voltage is applied between a discharge electrode 111 on an inductive body 110 and an induction electrode 112 embedded in the inductive body 110 by a voltage source 113 controlled by a voltage controller 114 in order to generate the corona ions, and one of the generated positive and negative corona ions is selected by a bias voltage 114 as corona ions to charge a recording medium 116. In addition, there is a heater 117 provided on the inductive body 110 in order to maintain the electrodes 111 and 112 at a constant temperature by controlling a heater power source 18 in accordance with the temperature of the electrodes 111 and 112 detected by a temperature detector 119. By means of these features, the temperature of the electrodes 111 and 112 is controlled to be constant as shown in FIG. 6.

Meanwhile, as shown in FIG. 7, a high frequency voltage $V_A$ which is less than the critical voltage $V_T$ is applied for a predetermined period of time between the electrodes 111 and 112 so as to accelerate the heating by the heater 117 by the heat generation by the inductive body 110 dye to the induction loss of the insulator. Thus, by maintaining the temperature of the apparatus above that of the environment, the vapor condensation on the electrodes 111 and 112 is removed, and then a control voltage $V_B$ which is greater than the critical voltage $V_T$ by $V_C$ is applied. These high frequency voltage $V_A$ and the control voltage $V_B$ are biased by the bias voltage $V_B$.

However, in this apparatus of FIG. 5, the temperature control is not performed in accordance with the humidity, depending on which the amount of the vapor varies considerably. Moreover, whether the vapor is completely removed from the electrodes 111 and 112 is not checked at all.

Also, in this apparatus of FIG. 5, no attention is paid for the change in the atmospheric temperature and the atmospheric pressure, so that the apparatus still is greatly affected by the environmental conditions.

As for a corona charger in which a high voltage is applied to a wire in order to generate corona ions, which has been widely used in conventional copy machines, no attention has been paid for the effects due to the environmental conditions at all, so that the fluctuation in the quality of the copied images has been a general feature in a conventional copy machine.

SUMMARY OF THE INVENTION

It is therefore an object of the present invention to provide an apparatus for generating ions and an apparatus for ion recording capable of preventing generation of extraneous corona ions, with which a lifetime of a recording medium can be elongated, which has a simple structure and can be operated by a low signal voltage such that a highly compact implementation is realizable.

It is also an object of the present invention to provide such apparatuses capable of obtaining stable ion generation and ion currents regardless of the environmental conditions such as temperature, atmospheric pressure, and humidity.

According to one aspect of the present invention there is provided an apparatus for generating ions, comprising: first electrode means for generating ion; first voltage source means for applying, to the first electrode means, a first voltage slightly less than a critical voltage for an ion generation constantly; second electrode means for starting the ion generation by the first electrode means, which is located in a vicinity of the first electrode means with a gap; and second voltage source means for applying to the second electrode means, a second voltage significantly less than the first voltage having such an amplitude that a total of the first and the second voltages exceeds the critical voltage such that the ion generation by the first electrode means takes place only while the second voltage is being applied to the second electrode means.

According to another aspect of the present invention there is provided an apparatus for generating ions, comprising: first electrode means for generating ion; first voltage source means for applying, to the first electrode means, a first voltage; second electrode means for controllably starting the ion generation by the first electrode means, which is located in a vicinity of the first electrode means with a gap; second voltage source means for applying, to the second electrode means, a second voltage having such an amplitude that a total of the first and the second voltages exceeds a critical voltage for an ion generation such that the ion generation by the first electrode means takes place only when the second voltage is being applied to the second electrode means; additional electrode means for detecting an amount of ions generated by the first electrode means, which is located in a vicinity of the first electrode means with the same gap as the gap between the first and second electrode means, to which a third voltage greater than the critical voltage is applied; and means for controlling the direct voltage source of the first voltage source means and the second voltage source means in accordance with the amount of ions detected by the additional electrode means such that the first voltage and the second voltage have amplitudes appropriate for a prescribed desired ion generation by the first electrode means.

According to another aspect of the present invention there is provided an apparatus for generating ions, comprising: first electrode means for generating ion; first voltage source means for applying, to the first electrode means, a first voltage, comprising; an alternating voltage source for applying an alternating voltage; and a direct voltage source for applying a direct bias voltage such that the direct bias voltage gradually increased from zero to an appropriate amplitude; second electrode means for starting the ion generation by the first electrode means, which is located in a vicinity of the first electrode means with a gap; and second voltage source means for applying, to the second electrode means, a second voltage having such an amplitude that a total of the first and the second voltages exceeds a critical voltage for an ion generation such that the ion generation by the first electrode means takes place only when the second voltage is being applied to the second electrode means.

According to another aspect of the present invention there is provided an apparatus for generating ions, comprising: corona ion generation electrode means having a gap for generating corona ions in the gap; induction electrode means for inducing electric field for generating corona ions in the gap of the corona ion generation electrode means; corona ion control electrode means having corona ion passing hole for controlling a flow of corona ions generated by the corona ion generation electrode means and passing through the corona ion passing hole; alternating voltage source means for applying alternating voltage to cause corona ion generation at the corona ion generation electrode means between the corona ion generation electrode means and the induction electrode means; and driving IC means for applying signal voltage to the corona ion control electrode means, the signal voltage being significantly less than a peak voltage of the alternating voltage, according to which the flow of corona ions is controlled by the corona ion control electrode means.

According to another aspect or the present invention there is provided an apparatus for ion recording of an image information on a recording paper, comprising: a recording medium on which an electrostatic latent image corresponding to the image information is to be formed; pre-charging corona ion generator means for charging the recording medium uniformly at a precharge voltage level in a first polarity; and corona ion generator means for forming the electrostatic latent image on the recording medium by charging the recording medium to a recording voltage level in a second polarity which is opposite of the first polarity with flows of corona ions corresponding to the electrostatic latent image to be formed, comprising a plurality of ion generation means, each of which is corresponding to a picture element of the electrostatic latent image and is comprising: corona ion generation electrode means having a gap for generating corona ions in the gap, the corona ions being accelerated toward the recording medium by the one voltage level given to the recording medium by the pre-charging corona ion generator means; induction electrode means for inducing electric field for generating corona ions in the gap of the corona ion generation electrode means; corona ion control electrode means having corona ion passing hole for controlling flows of corona ions generated by the corona ion generation electrode means and passing through the corona ion passing hole; alternating voltage source means for applying alternating voltage to cause corona ion generation at the corona ion generation electrode means between the corona ion generation electrode means and the induction electrode means; and driving IC means for applying signal voltage to the corona ion control electrode means, the signal voltage being significantly less than a peak voltage of the alternating voltage, according to which the flow of corona ions is controlled by the corona ion control electrode means.

According to another aspect of the present invention there is provided an apparatus for ion recording, comprising: a recording medium movable at variable speed on which an electrostatic latent image is to be formed; and corona ion generator means for forming the electrostatic latent image on the recording medium by charging the recording medium with slows of corona ions corresponding to the electrostatic latent image to be formed.

According to another aspect of the present invention there is provided an apparatus for ion recording, comprising: a recording medium movable intermittently on which an electrostatic latent image is to be formed; and corona ion generator means for forming the electrostatic latent image on the recording medium by charging the recording medium with flows of corona ions corresponding to the electrostatic latent image to be formed.

According to another aspect of the present invention there is provided an apparatus for ion recording, comprising: a recording medium on which an electrostatic latent image is to be formed; means for developing the electrostatic latent image with developer into developed image on the recording medium; means for transferring the developed image onto the recording paper electrostatically; and corona ion generator means for forming the electrostatic latent image on the recording medium by charging the recording medium with flows of corona ions corresponding to the electrostatic latent image to be formed, such that first residual developer remaining on the recording medium after the transfer of the developed image by the transferring means in previous recording inside the electrostatic latent image for next recording is charged to one of two different voltage levels by the corona ion generator means, whereas second residual developer remaining on the recording medium after the transfer of the developed image by the transferring means in previous recording outside the electrostatic latent image for next recording is charged to another one of the two different voltage levels by the corona ion generator means.

Other features and advantages of the present invention will become apparent from the following description taken in conjunction with the accompanying drawings.

DETAILED DESCRIPTION OF THE PREFERRED EMBODIMENTS

Figure 1:
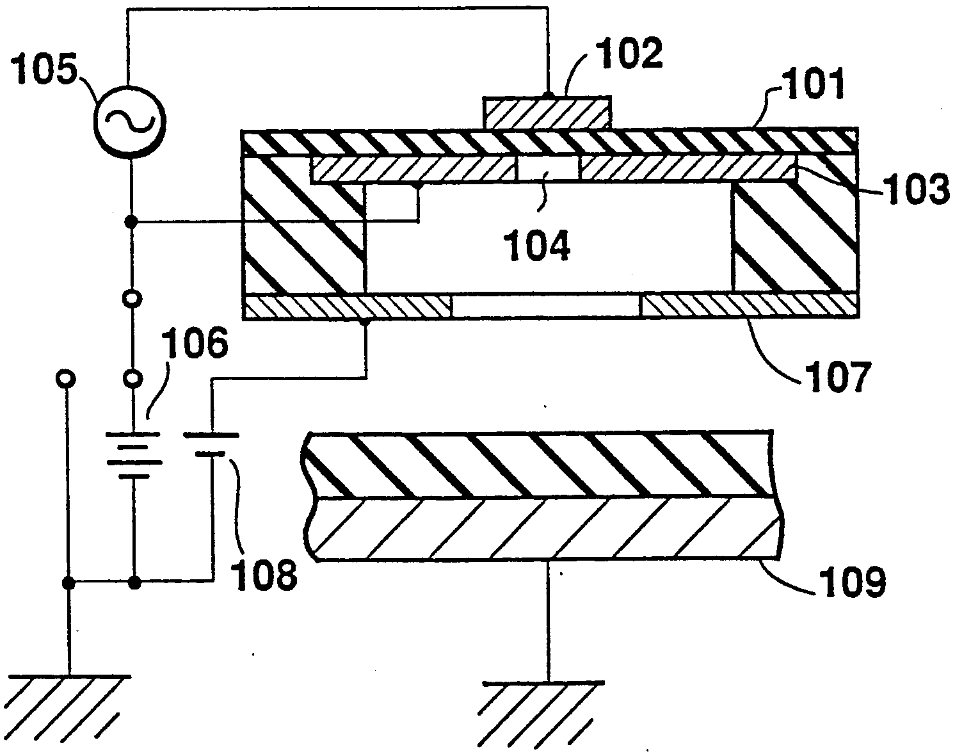
FIG.1 PRIOR ART
FIG. 1 is a schematic block diagram of a conventional apparatus for generating ions.
Figure 2:
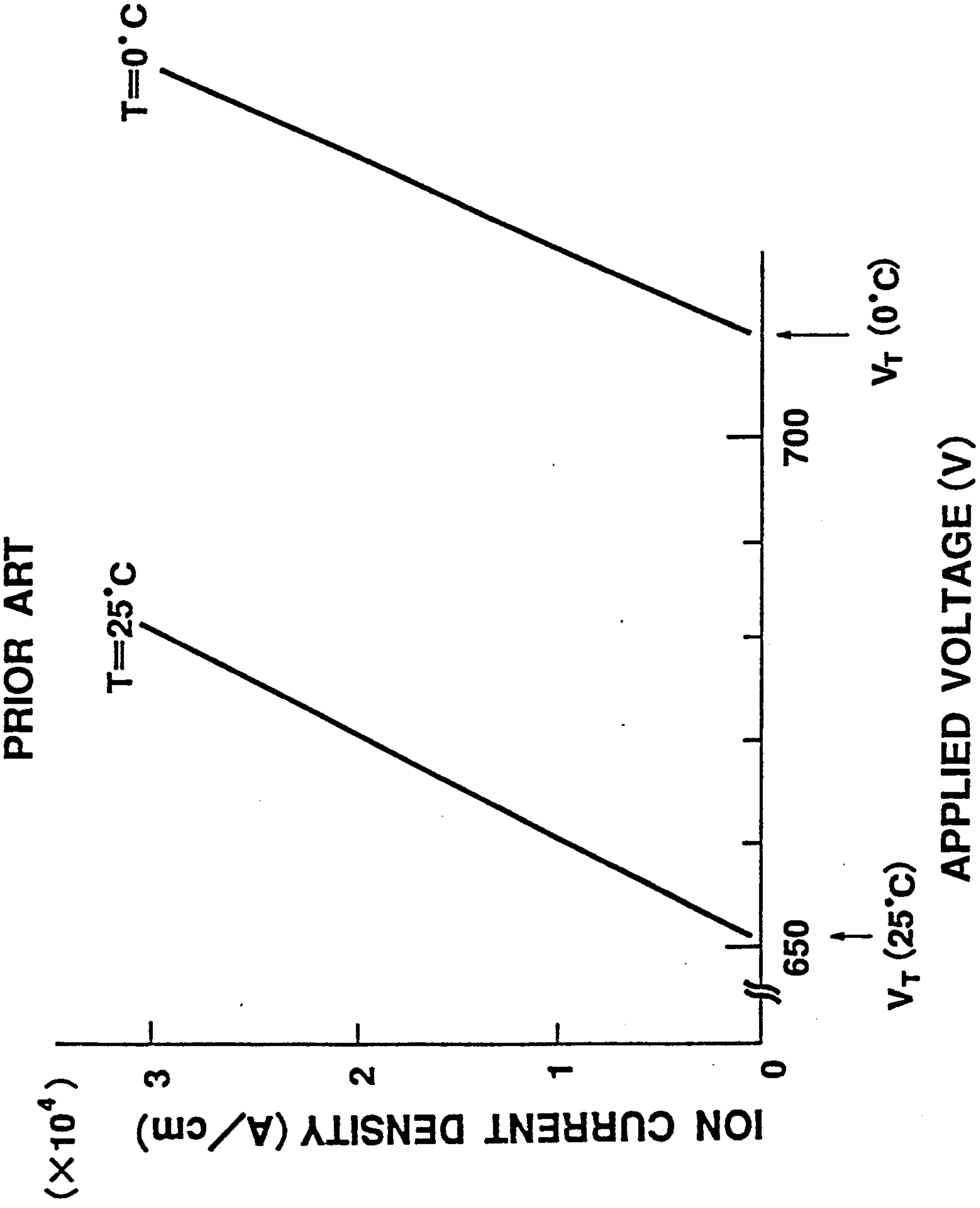
FIG.2 PRIOR ART
FIG. 2 is a graph of a ion current density versus a control voltage for different temperatures.
Figure 3:
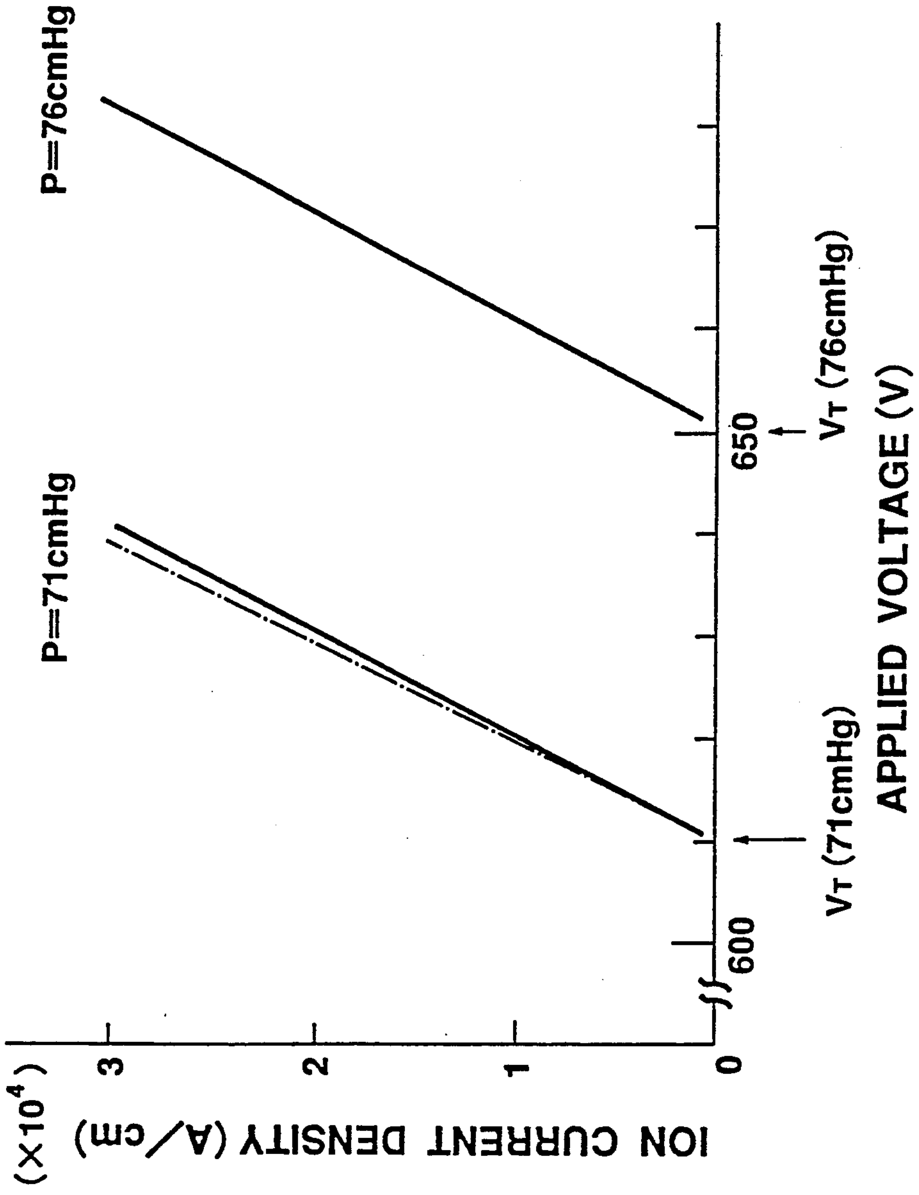
FIG.3 PRIOR ART
FIG. 3 is a graph of a ion current density versus a control voltage for different atmospheric pressure.
Figure 4:
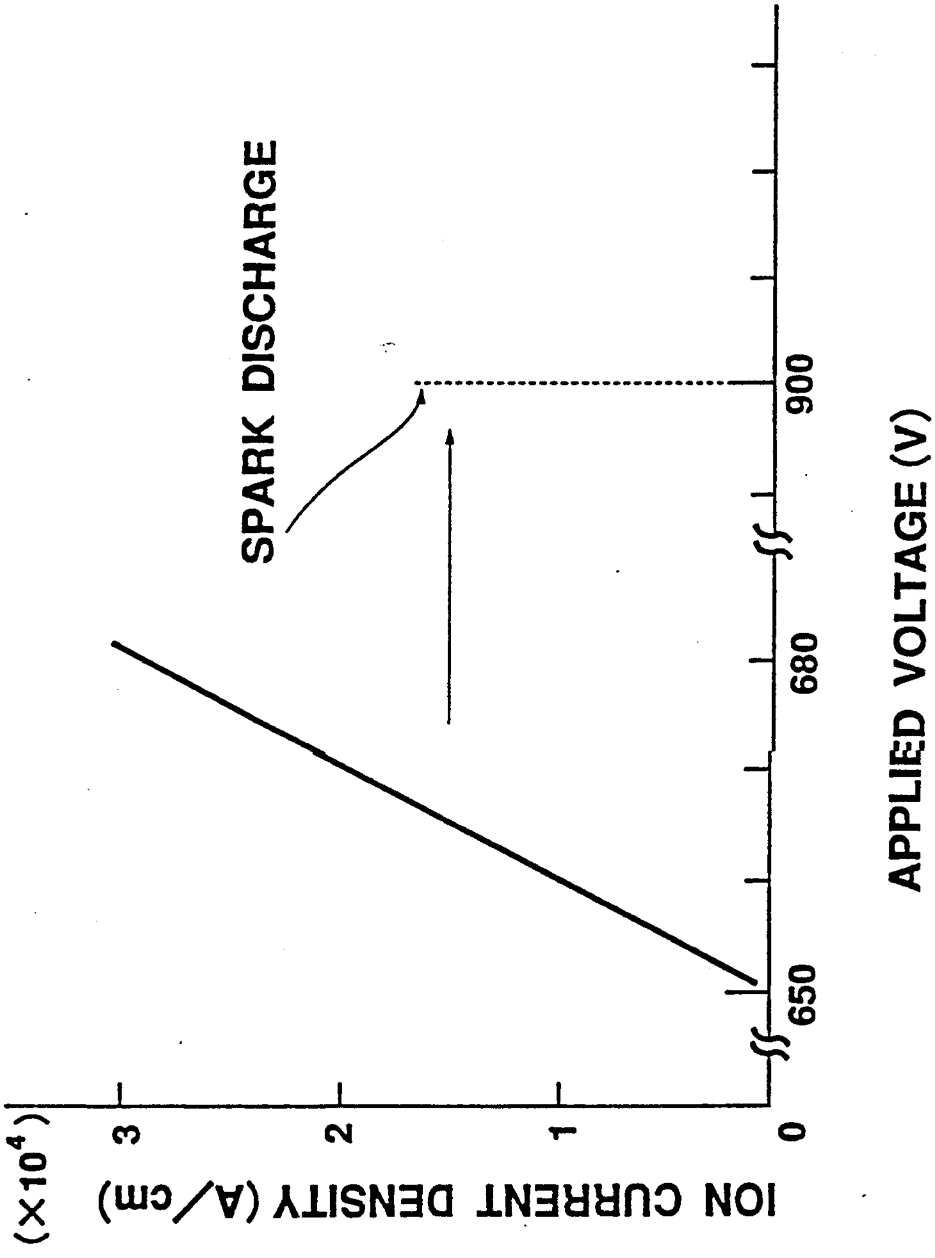
FIG.4 PRIOR ART
FIG. 4 is a graph of a ion current density versus a control voltage at high humidity condition.
Figure 5:
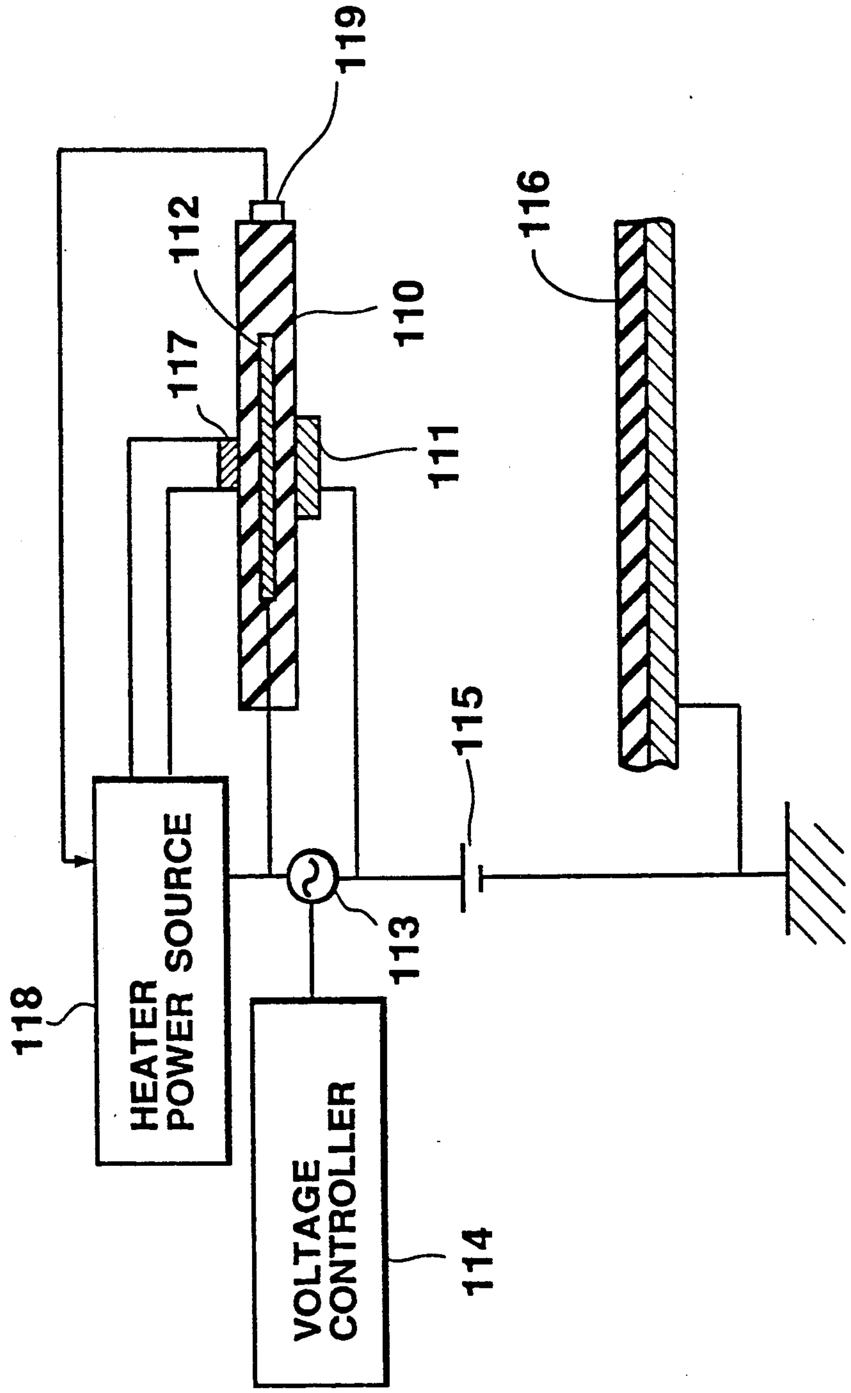
FIG.5 PRIOR ART
FIG. 5 is a schematic block diagram of a conventional apparatus for generating ions with additional features to cope with the vapor condensation problem.
Figure 6:
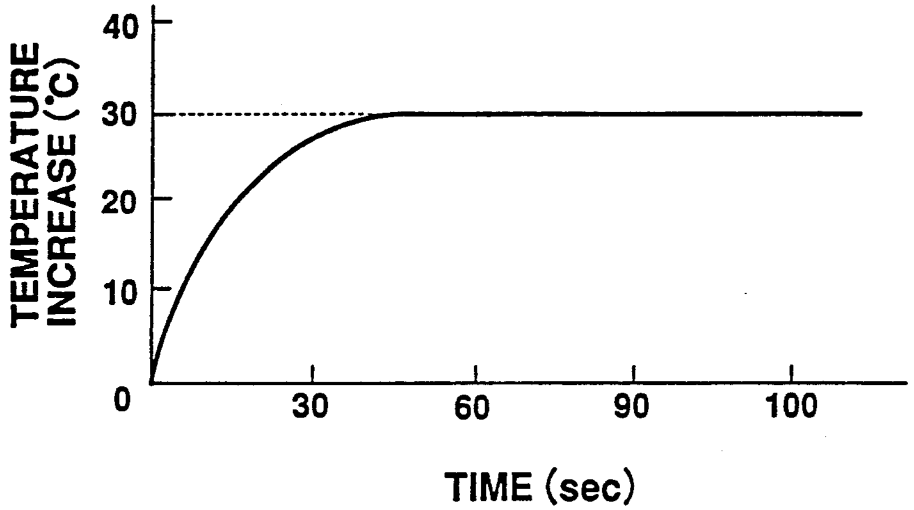
FIG.6 PRIOR ART
FIG. 6 is a graph of the temperature of the apparatus of FIG. 5 as a function of time.
Figure 7:
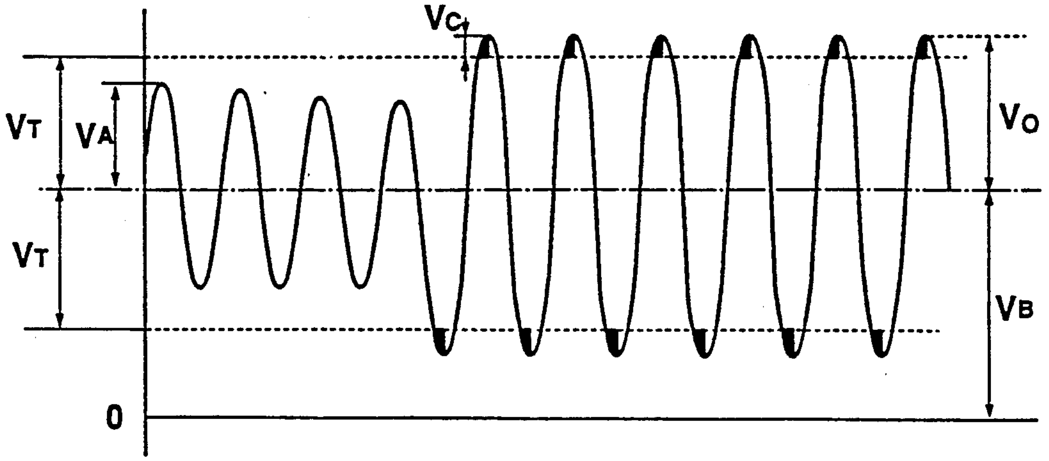
FIG. 7 is a graph of a high frequency voltage and a control voltage to be used in the apparatus of FIG. 5.
Figure 8:
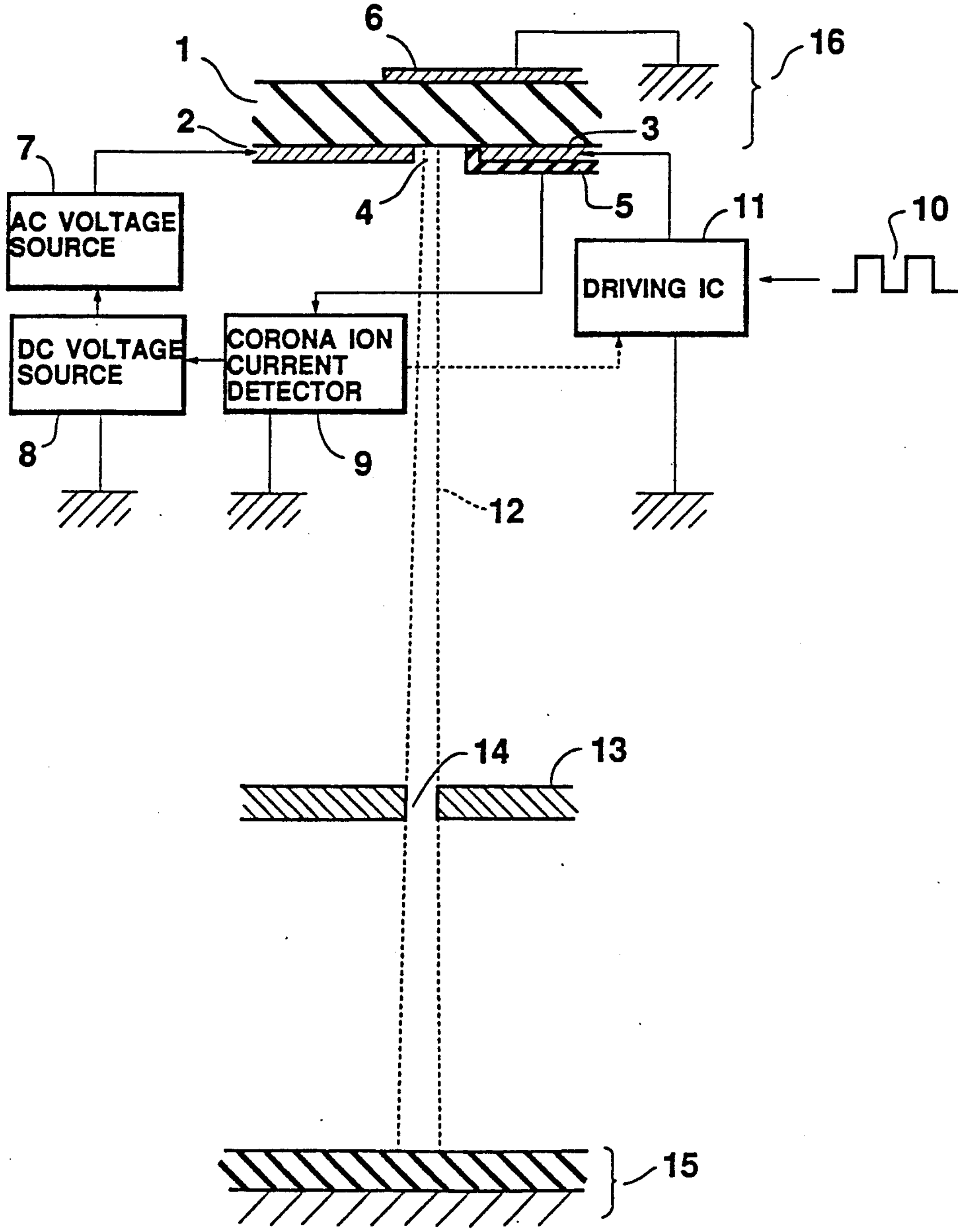
FIG. 8 is a schematic side view diagram of a first embodiment of an apparatus for generating ions according to the present invention.
Figure 9:
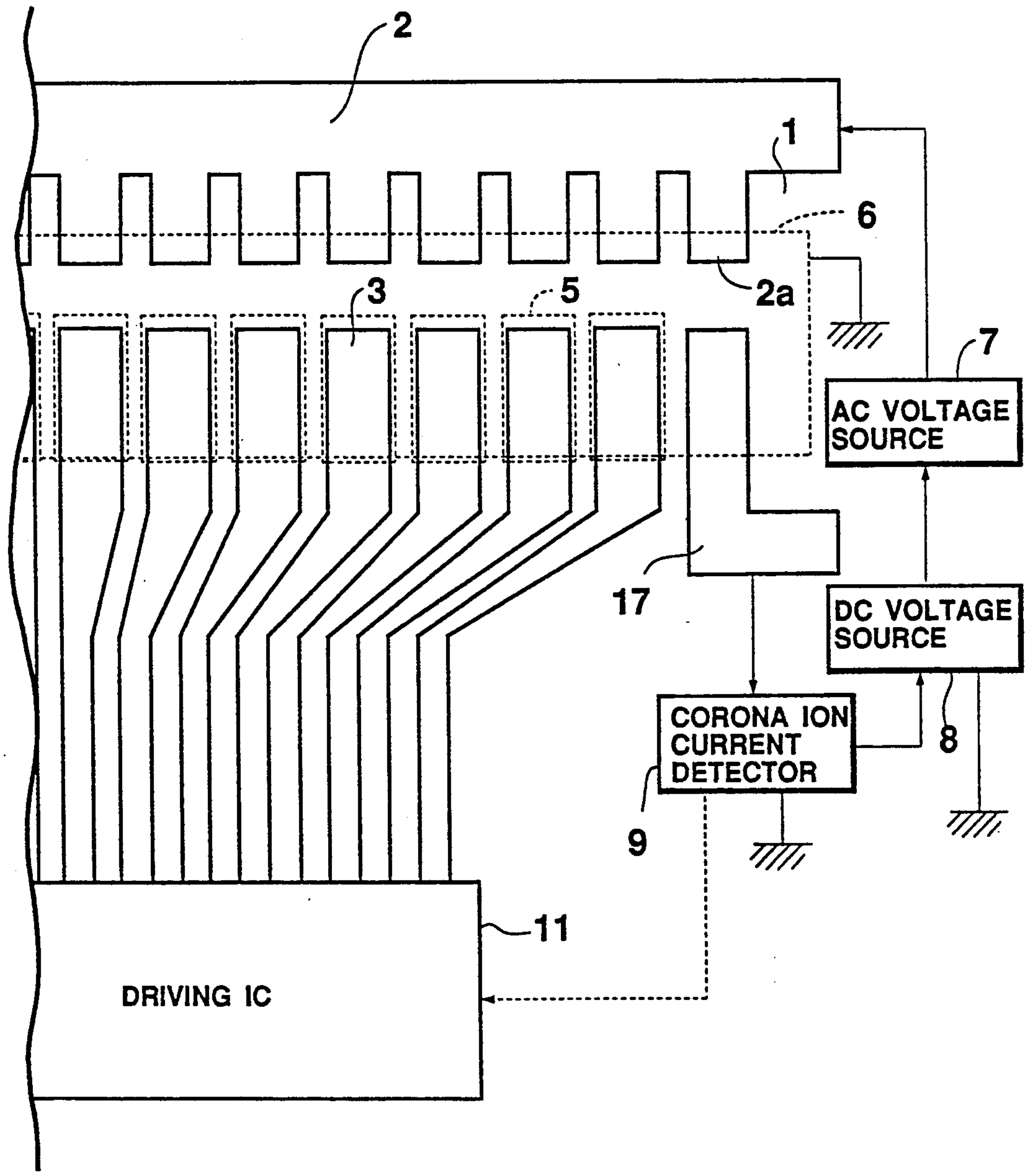
FIG. 9 is a schematic plan view diagram of the apparatus of FIG. 8.

Referring now to FIGS. 8 and 9, there is shown a first embodiment of an apparatus for generating ions according to the present invention.

In this embodiment, there is provided an ion recording head 16 comprising a corona ion generation electrode 2 having plurality of terminals each of which is paired with one of signal electrodes 3, provided on one side of an insulative substrate 1 facing toward a recording medium 15, with a gap 4 between each terminal of the corona ion generation electrode 2 and the paired signal electrode 3.

In addition, as shown in FIG. 9, one terminal *2a* of the corona ion generation electrode 2 is paired with a corona ion detection electrode 17.

Each signal electrode 3 is covered by an insulative resin 5 made of such material as polyimide and Mylar(-trade name), in order to protect a driving IC 11 for the signal electrodes 3, to be described in detail below, from a current overflow due to abnormal discharge and other causes.

On the other side of the insulative substrate 1, there is provided an electric field formation electrode 6 which is grounded.

To the corona ion generation electrode 2, an alternating voltage from an AC voltage source 7 and a direct bias voltage from a DC voltage source 8 for raising a peak value of the alternating voltage to a vicinity of level of a critical voltage for corona ion generation are applied.

To the corona ion detection electrode 17, a constant direct voltage is applied so that between the corona ion detection electrode 17 and one terminal *2a* of the corona ion generation electrode 2 which is paired with the corona ion detection electrode 17 the corona ions are constantly generated.

The DC voltage source 8 is controlled by a signal from a corona ion current detector 9 for detecting currents from the corona ion detection electrode 17, so that the direct bias voltage can be adjusted to stabilize the corona ion generation.

To the signal electrodes 3, signal voltages from the driving IC 11 are applied in response to externally supplied pulse signals 10. The magnitude of the signal voltages is normally equal to that of the constant direct voltage applied to the corona ion detection electrode 17.

The driving IC 11 converts the externally supplied pulse signals 10 given in a form of serial image signal voltages into the signal voltages in a form of parallel image signals which are applied to the signal electrodes 3 at timings given by a clock signal.

The driving IC 11 is also controlled by the signal from the corona ion current detector 9 so as to make the amount of generated corona ion currents constant by changing the magnitude of the signal voltages.

When the appropriate direct bias voltage is applied from the DC voltage source 8 such that a peak value of the alternating voltage from the AC voltage source 7 is raised to a critical voltage level, and the signal voltages are applied from the driving IC 11, the corona ion currents 12 are generated between the corona ion generation electrode *2a* and the signal electrodes 3, which subsequently pass through holes 14 on an acceleration electrode 13 to which an appropriate acceleration voltage is applied such that the generated corona ion currents 12 reach the recording medium 15 to form an electrostatic latent image on the recording medium 15.

Figure 10:
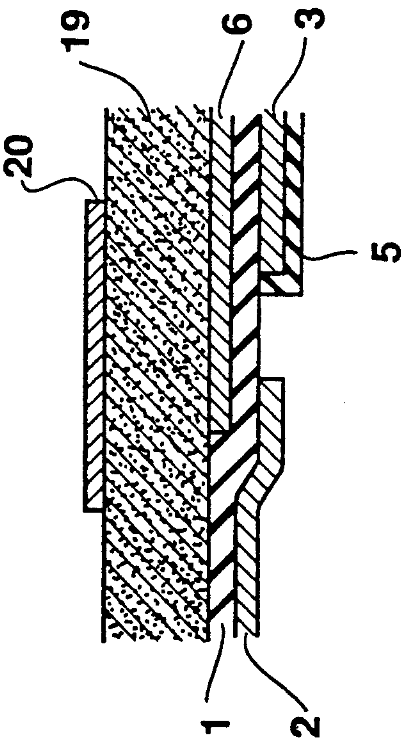
FIG. 10 is an enlarged cross sectional view of an ion recording head of the apparatus of FIG. 8.

To be more specific, in this embodiment, the corona ion generation electrode 2 or 8 micron thickness made of tungsten and the signal electrodes 3 of 8 micron thickness made of tungsten are arranged on the insulative substrate 1 of 100 micron thickness made of polyimide with the 100 micron gap 4 between each terminal of the corona ion generation electrode 2 and the paired signal electrode 3. Each terminal of the corona ion generation electrode 2 as well as each of the signal electrodes 3 has a width of 80 micron, and the terminals of the corona ion generation electrode 2 as well as the signal electrodes 3 are arranged with 100 micron intervals. Each of the signal electrodes 3 is covered by the insulative resin 5 of 10 micron thickness made of polyurethane. The electric field formation electrode 6 on the other side of the insulative substrate 1 has a thickness of 8 micron and is made of tungsten. As shown in FIG. 10, this ion recording head 16 is mounted on a ceramic substrate 19 of 1 mm thickness, and on the other side of this ceramic substrate 19 a heater 20 is attached if necessary. The use of a strong ceramic substrate 19 makes the handling of the apparatus easier.

The acceleration electrode 13 is located 1 mm away from the ion recording head 16 and has as many holes 14 as the number of the signal electrodes 3 each of which having 80 micron diameter. The recording medium 15 comprises an insulative resin layer of 10 micron thickness covering a conductive body and is located 0.2 mm farther away of the acceleration electrode 13.

The acceleration electrode 13 is constantly applied with the direct voltage of 150V, while the corona ion generation electrode 2 is applied with the constant alternating voltage of 50 kHz frequency and 400V amplitude which is grater than a half of the critical voltage for corona ion generation but less than the critical voltage itself, along with the variably controlled direct bias voltage.

Figure 11:
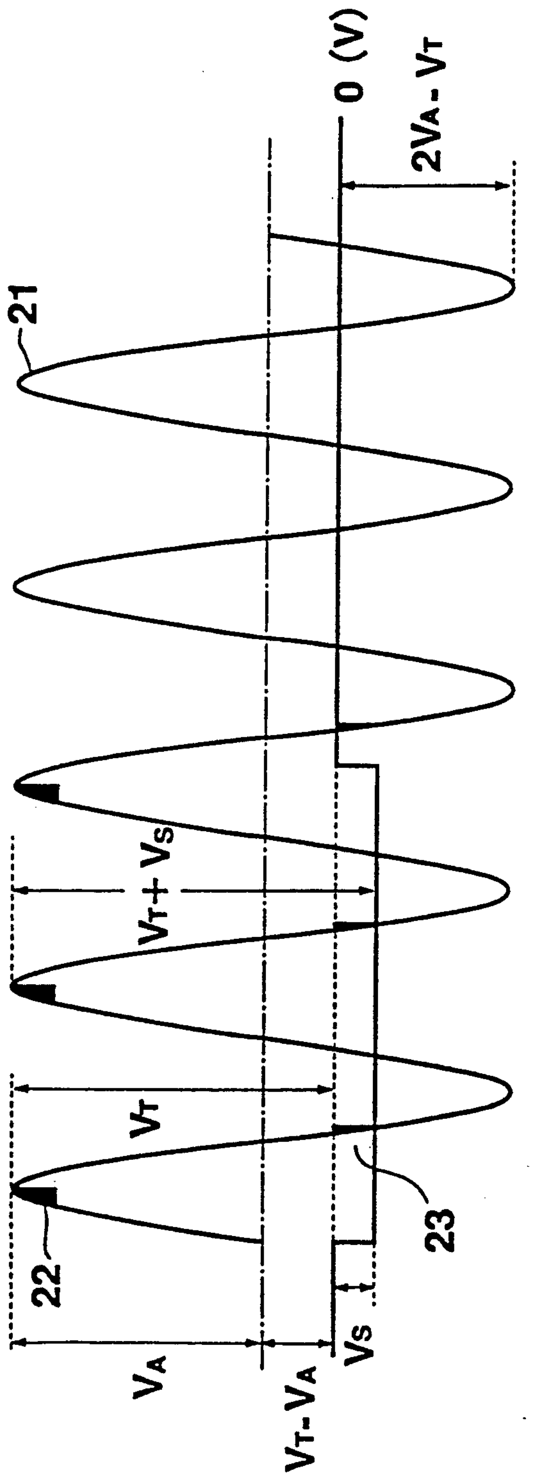
FIG. 11 is a signal form diagram for the alternating voltage and the direct bias voltage to be applied to the corona ion generation electrode and the signal voltages to be applied to the signal electrodes in the apparatus of FIG. 8.

Referring now to FIG. 11, the effects of the alternating voltage and the direct bias voltage to be applied to the corona ion generation electrode 2 and the signal voltages to be applied to the signal electrodes 3 will be explained.

The corona ion generation electrode 2 is applied with the alternating voltage 21 of the amplitude shown as $V_A$ and the direct bias voltage of the amplitude $V_T—V_A$ such that the peak value of the alternating voltage 21 is at the level of the critical voltage $V_T$ for corona ion generation.

As mentioned above, the amplitude $V_A$ of the alternating voltage 21 is 400V which is greater than a half of the critical voltage $V_T$ for corona ion generation but less than the critical voltage $V_T$ itself, so that the generation of the corona ions takes place only when the signal voltage $V_S$ of negative polarity is applied to the signal electrodes 3 and when the signal voltage $V_S$ is not applied to the signal electrodes 3 the corona ion generation does not take place. In other words, when the signal voltage $V_S$ is not applied to the signal electrodes 3 the electric field in a vicinity of the corona ion generation electrodes 2 is not strong enough for causing the corona ion generation, whereas when the signal voltage $V_S$ is applied to the signal electrodes 3 the electric field between the corona ion generation electrodes 2 and the signal electrodes 3 is strong enough for causing the corona ion generation, as the voltage $V_T+V_S$ which is greater than the critical voltage $V_T$ is applied there.

Figure 12:
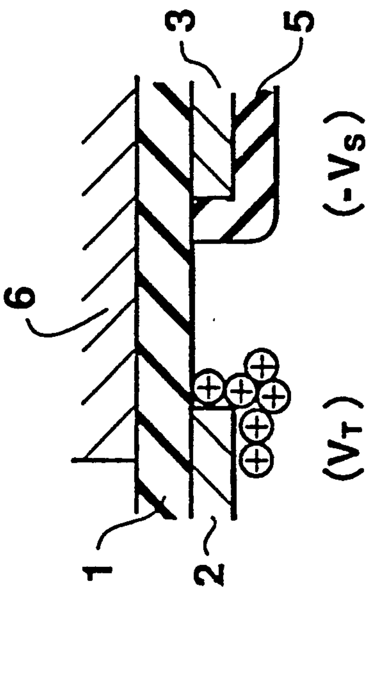
FIGS. 12(A), (B), (C), and (D) are sequential illustrations of the ion recording head of the apparatus of FIG. 8 for explaining the corona ion generation process.
Figure 12:
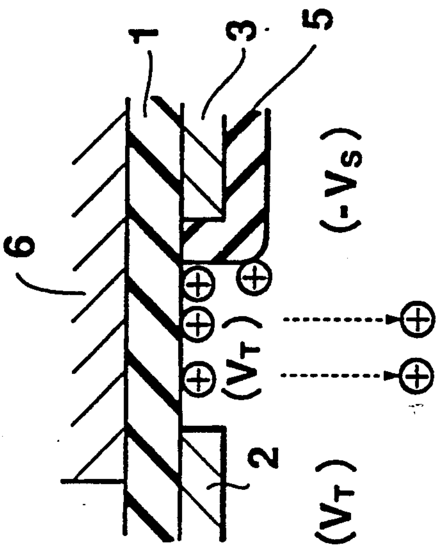
Figure 12:
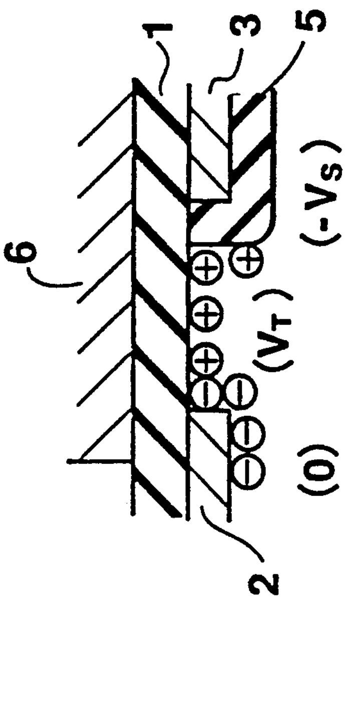
Figure 12:
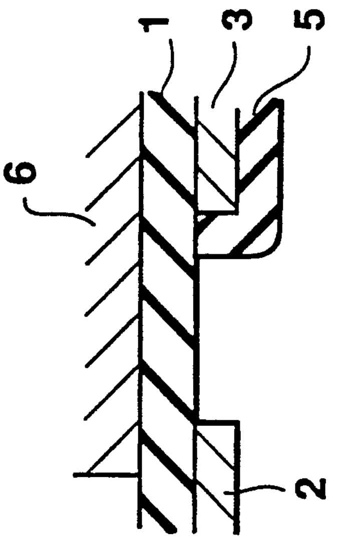

Thus, when the applied voltage exceeds the critical voltage $V_T$ which are indicated as 22 in FIG. 11, the corona ions of positive polarity are generated as shown in FIG. 12(A).

The most of the corona ions thus generated then moves toward the acceleration electrodes 13 as the corona ion currents 12, but some fraction of the generated corona ions are used for charging up the insulative substrate 1 to the level of the total voltage applied to the corona ion generation electrode 2 so as to assist the acceleration of the corona ion currents 12 moving toward the recording medium 15, and still another fraction of the generated corona ions are used for charging up the insulative resins 5, as shown in FIG. 12(B). The corona ion generation stops when the voltage gap between the corona ion generation electrode 2 and the signal electrodes 3 drops below the critical voltage $V_T$.

Then, when the voltage level of the corona ion generation electrode 2 drops below the zero level which is indicated as 23 in FIG. 11, the voltage gap between the insulative substrate 1 and the corona ion generation electrode 2 becomes greater than the critical voltage $V_T$, so that the generation of the corona ions of negative polarity begins, as shown in FIG. 12(C). The corona ions of negative polarity cancel out the corona ions of positive polarity charging up the insulative substrate 1 and the insulative resins 5 until the ion recording head 16 resumes its initial state as shown in FIG. 12(D). This completes one cycle of the alternating voltage 21. The corona ions of negative polarity also cancel out the excessive corona ions of positive polarity around the ion recording head 16 so as to prevent undesirable widening of the image of the recording medium 15 as well as leakage of the corona ions to the surroundings.

When the signal voltage $V_S$ is stopped, the voltage gap between the corona ion generation electrode 2 and the signal electrodes 3 drops below the critical voltage $V_T$ and the corona ion generation also stops.

In this manner, while the signal voltage $V_S$ is applied the corona ions are generated many times by the alternating voltage applied to the corona ion generation electrode 2, so that a uniform electrostatic latent image can be obtained on the recording medium 15.

The direct bias voltage to be applied to the corona ion generation electrode 2 must be greater than $V_T-V_A-V_S$ and not greater than $V_T-V_A$ in order for the corona ion generation to take place properly. If the direct bias voltage is less than $V_T—V_A-V_S$ or the amplitude $V_A$ of the alternating voltage 21 is less than a half of the critical voltage $V_T$ the corona ion generation does not take place at all, whereas if the direct bias voltage is greater than $V_T-V_A$ or the amplitude $V_A$ of the alternating voltage 21 is greater than the critical voltage $V_T$ itself the corona ion generation takes place regardless of the presence or absence of the signal voltage $V_S$.

Figure 13:
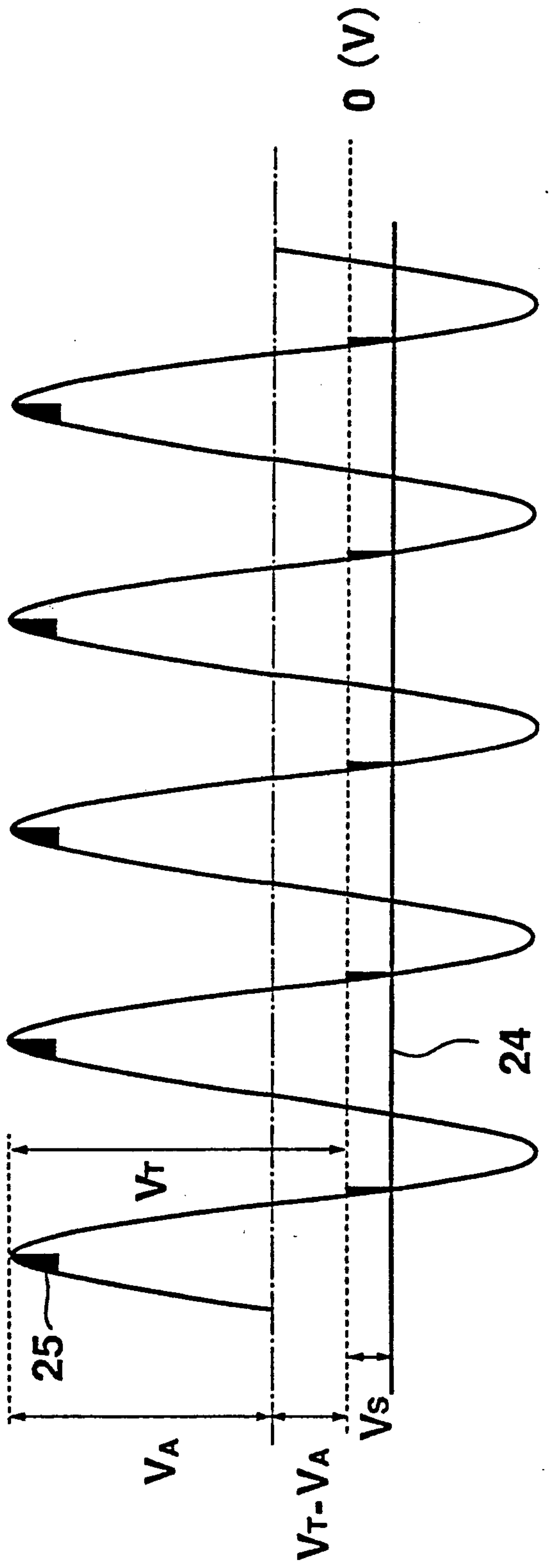
FIG. 13 is a signal form diagram for the alternating voltage and the direct bias voltage to be applied to the corona ion generation electrode and the direct voltage to be applied to the corona ion detection electrode in the apparatus of FIG. 8.
Figure 14:
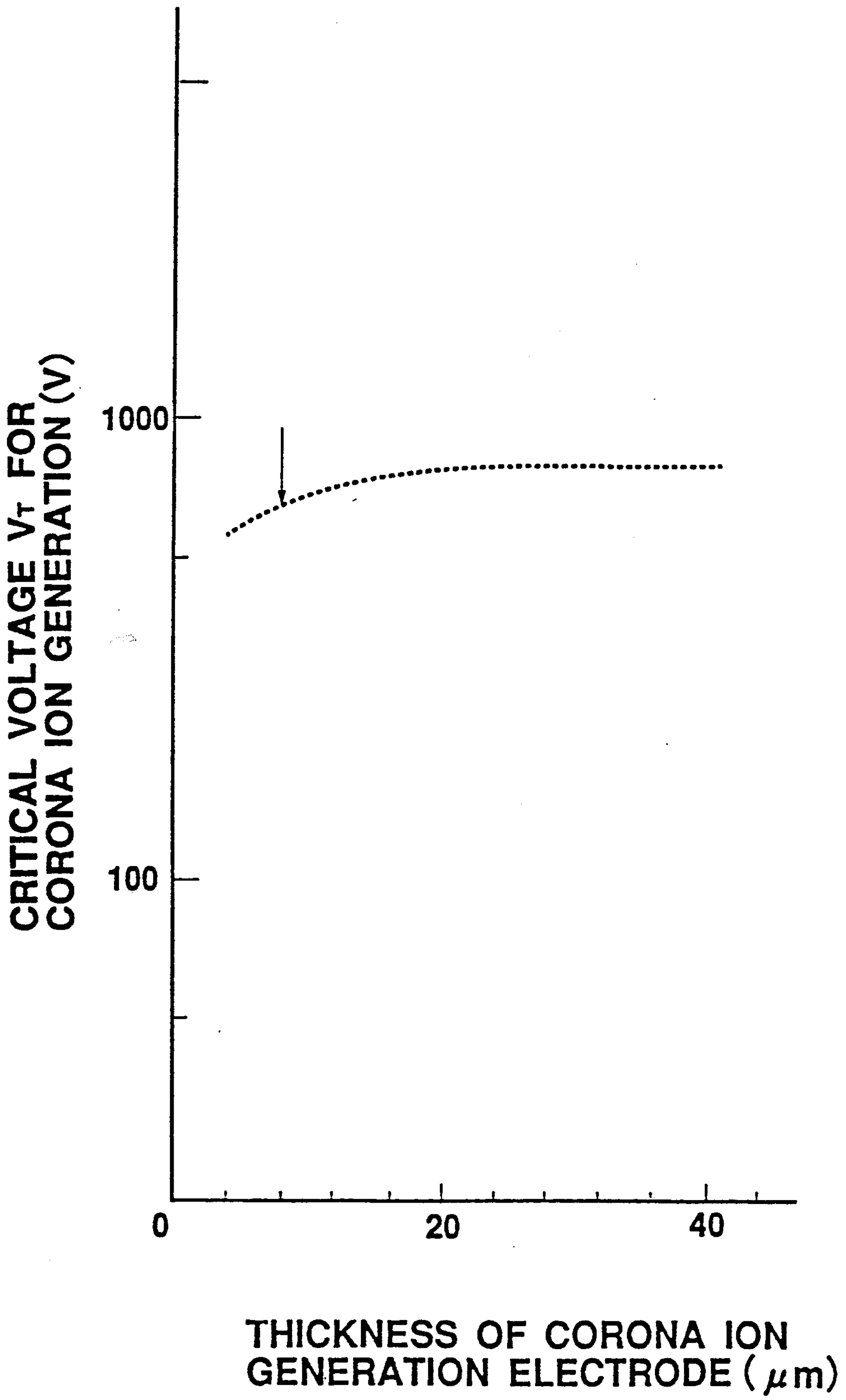
FIG. 14 is a graph of the critical voltage for the corona ion generation versus the thickness of the corona ion generation electrode for the apparatus of FIG. 8.

On the other hand, as shown in FIG. 13, the corona ion detection electrode 17 is applied with the constant direct voltage 24 equal to the signal voltage, so that one terminal 2a of the corona ion generation electrode 2 paired with the corona ion detection electrode 17 continue to generate the corona ions at each peak value of the alternating voltage indicated as 25 in FIG. 13 is applied to the corona ion generation electrode 2.

As already mentioned above, the DC voltage source 8 is controlled by the signal from the corona ion current detector 9 for detecting currents from the corona ion detection electrode 17, so that the direct bias voltage can be adjusted to stabilize the corona ion generation and the driving IC 11 is also controlled by the signal from the corona ion current detector 9 so as to make the amount of generated corona ion currents constant regardless of the environmental conditions of the apparatus.

Specifically, the critical voltage for the corona ion generation $V_T$ and the corona current density I can be approximated using the following formulae given for a corona charger (See R. M. Shaffert "Electrophotography", p.234, Focal Press, London, 1980):

$$V_T = 31a \cdot \left(1 + \frac{0.308}{\sqrt{a}}\right) \cdot \ln\frac{R}{a} \cdot 1000\ (V) \tag{3}$$

$$I = 2\mu \cdot \frac{(V_O + V_S)(V_O - V_T + V_S)}{R^2 \cdot \ln(R/a)} \cdot 1.11 \times 10^{-12}\ (A/\text{cm}) \tag{4}$$

where a is a radius of a corona charger wire which is to be approximated by a half of the thickness of the corona ion generation electrode 2, R is a radius of a shielding of a corona charger which is to be approximated by a distance between the corona ion generation electrode 2 and the signal electrode 3 or the electric field formation electrode 6, $V_O$ is an actual voltage applied to the corona ion generation electrode 2, and $\mu$ is the mobility of the corona ions in the air which is approximately equal to 2 $cm^2/V \cdot sec$. The values of the critical voltage $V_T$ and the current density I obtained by these approximation are plotted in FIG. 15 and FIG. 16, respectively.

Figure 15:
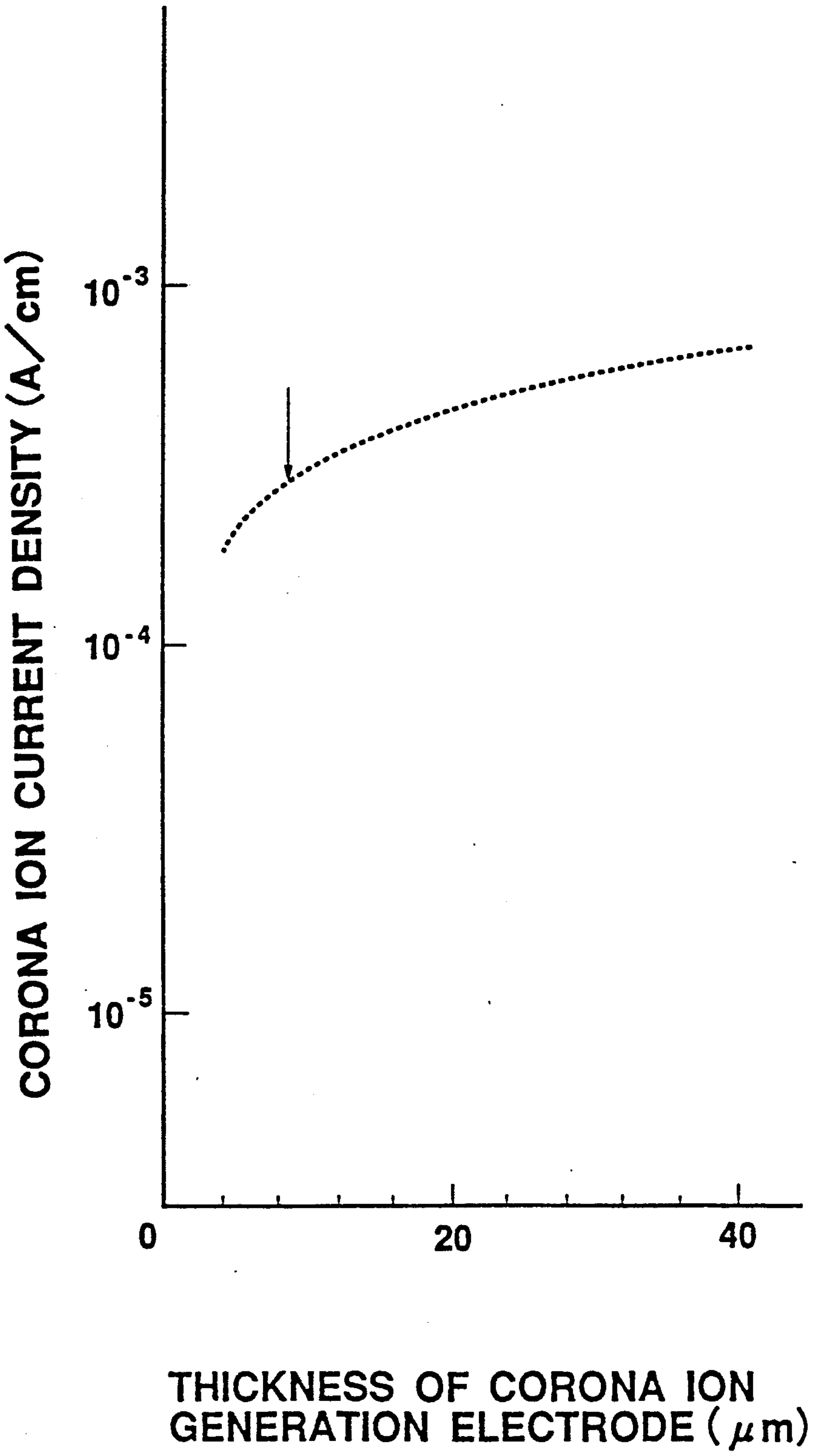
FIG. 15 is a graph of the corona ion current density versus the thickness of the corona ion generation electrode for the apparatus of FIG. 8.
Figure 16:
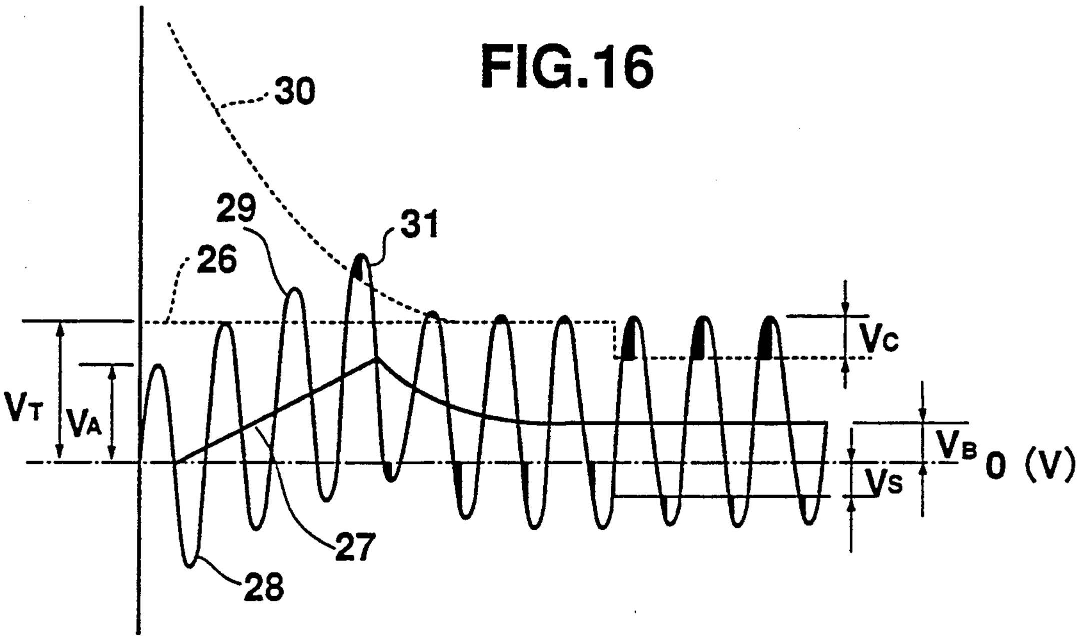
FIG. 16 is a signal form diagram for the alternating voltage and the direct bias voltage to be applied to the corona ion generation electrode and the direct voltage to be applied to the corona ion detection electrode in the apparatus of FIG. 8 in a case in which the critical voltage for the corona ion generation is changed by the change in the environmental conditions of the apparatus.

As indicated by an arrow in FIG. 15, for the apparatus of this embodiment, the critical voltage $V_T$ is approximately 650V, so that by using the 400V alternating voltage as described above and the 250 direct bias voltage, when the signal voltage of 30V is applied to the signal electrodes 3, the corona current of the density approximately equal to $2.8\times10^{-4}$A/cm flows through the corona ion generation electrode 2, as indicated by an arrow in FIG. 16, and the corona ion current 12 passing through the holes 14 of the acceleration electrode 13 in this case is approximately equal to $6.7\times10^{-4}/cm^2$.

This implies that the recording medium 15 will be charged up to 150V to 100 μsec of signal pulse width, which can provide over 200 pages of printing for A4 size paper with a linear ion recording head of 100 micron resolution. During this 100 μsec of the signal pulse width, the peak value of the alternating voltage is applied to the corona ion generation electrode 2 for about five times, within which any irregularity of discharging can be averaged out, so that the uniform electrostatic latent image can be obtained on the recording medium 15.

Also, the time taken by the corona ions to move from the corona ion generation electrode 2 to the recording medium 15 is approximately 10 μsec, so that the corona ions reach the recording medium 15 in a half of the period of the alternating voltage.

In order to achieve stable electrostatic latent image formation on the recording medium 15, the amount of the generated corona ion currents should be controlled within less than 10% fluctuation. Since the amount of the generated corona ion currents is roughly proportional to the signal voltage, this means 650V of the total voltage applied to the corona ion generation electrode 2 need to be controlled within 3V, that is, less than 0.5% fluctuation in applied voltage is required.

For this purpose, at the corona ion current detector 9, the corona ion current of approximately $2.8\times10^{-6}$ A from one terminal 2a of the corona ion generation electrode 2 paired with the corona ion detection electrode 17 is applied to an integrating circuit comprising 100 kΩ resistor and $10^{-9}$ F. capacitor of 100 μsec time constant to produce 0.28V of voltage and 1/10 of this voltage, i.e., 0.028V fluctuations are detected, on basis of which the direct bias voltage is controlled within 3V range around its value of 250V.

On the other hand, the controlling of the amount of generated corona ion currents within the same 10% fluctuation can be achieved by merely controlling 30V of the signal voltage within 3V range.

In these controllings, the better accuracy can be achieved by using the larger corona ion detection electrode 17 for which the amount of corona currents is larger.

Referring now to FIG. 16, a case in which the critical voltage for corona ion generation is changed by the environmental conditions of the apparatus will be described.

Here, the critical voltage $V_T$ changes as indicated by a dashed line 26. To cope with such a situation, the direct bias voltage to be applied to the corona ion generation electrode 2 is gradually increased from 0V as indicated by a solid line 27, so that the peak value of the alternating voltage applied on the corona ion generation electrode 2 starts out from the level below the critical voltage $V_T$ as indicated by 28, and then gradually increased to the level above the critical voltage $V_T$ as indicated by 29 where the corona ion generation can takes place.

The onset of the corona ion generation is monitored through the corona ion detection electrode 17 and the corona ion current detector 9, and the DC voltage source 8 is controlled to provide an appropriate direct bias voltage for the stable corona ion generation on the basis of this monitoring.

Also, the amount of the corona ion currents is monitored through the corona ion detection electrode 17 to which the direct voltage equal to the signal voltage $V_S$ is applied and the corona ion current detector 9, and the driving IC 11 is controlled to provide an appropriate value of the signal voltage for proper electrostatic latent image formation.

The case in which the vapor condensation on the corona ion generation electrode 2 occurred can be dealt with in the similar manner.

As already mentioned in the description of the background art above, when the vapor condensation on the corona ion generation electrode 2 occurs, no corona ion generation takes place at the ordinary critical voltage. Moreover, in the apparatus such as that of this embodiment, when the applied voltage is kept increased beyond the ordinary critical voltage, at approximately 900V the insulation by the air is lost and the spark discharge occurs, which in turn causes the breakdown of the electrodes and the driving IC 11.

Now, in this embodiment, the direct bias voltage to be applied to the corona ion generation electrode 2 is gradually increased from 0V, so that the peak value of the alternating voltage applied to the corona ion generation electrode 2 also gradually increases from its initial value of 400V which is less than the critical voltage as well as than the voltage for spark discharge, so that initially neither the corona ion generation nor the spark discharge occurs.

Figure 17:
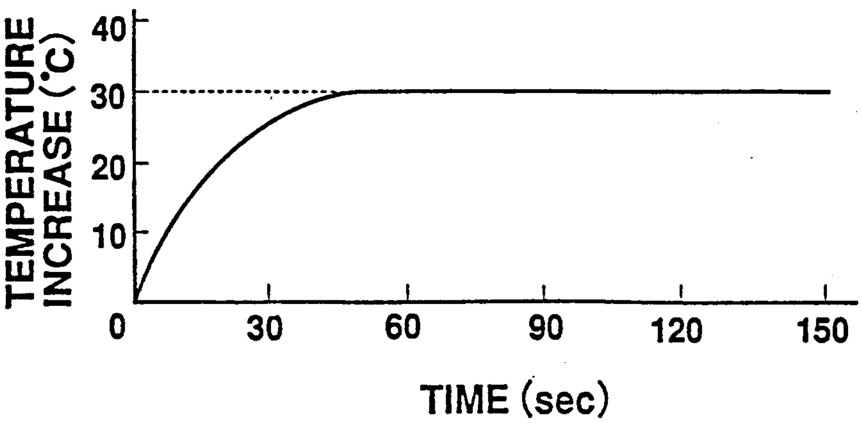
FIG. 17 is a graph of the temperature in the vicinity of the corona ion generation electrode of the apparatus of FIG. 8 as a function of time in a case in which the critical voltage for the corona ion generation is changed by the change in the environmental conditions of the apparatus.

However, by this alternating voltage the induction loss appears in the insulative substrate 1 is lost, so that the temperature in the vicinity of the corona ion generation electrode 2 gradually increases as shown in FIG. 17. As a result, the vapor condensation on the corona ion generation electrode 2 evaporates, and along with this evaporation the critical voltage for the corona ion generation approaches the normal value without vapor condensation as indicated by a dashed line 30 in FIG. 16. The corona ion generation begins when the peak value of the alternating voltage becomes greater than the critical voltage as indicated by 31 in FIG. 16, the corona ion generation is stabilized subsequently by the controlling of the direct bias voltage to be applied to the corona ion generation electrode 2 as described above and the amount of the corona ion currents is controlled to the constant by controlling the signal voltage to be applied to the signal electrodes 3 as described above.

As described, according to this embodiment, the stable corona ion generation can be achieved by controlling the direct bias voltage to be applied to the corona ion generation electrode 2 and the amount of the corona ion currents can be kept at proper amount by controlling the signal voltage to be applied to the signal electrodes 3, both on a basis of monitoring by the corona ion detection electrode 17 and the corona ion current detector 9.

Consequently, it is possible in this embodiment to provide an apparatus for generating ions capable of preventing generation of extraneous corona ions, with which a lifetime of a recording medium can be elongated, which has a simple structure and can be operated by a low control voltage such that a highly compact implementation is realizable.

Furthermore, in the conventional apparatus for generating ions the surface voltage level of the recording medium has been restricted to about 250V from the strength of the driving IC against high voltage in the apparatus in which a high voltage of 150V is already used as the signal voltage. As a consequence, the developer for developing the electrostatic latent image on the recording medium has been limited to the conductive one component magnetic toner which can be developed at low voltage level, the transfer of the image has been limited to the thermal roller transfer since the electrostatic transfer has been impossible, the recording medium has been limited to such material as aluminum which can endure high temperature and has a high surface strength, and the color toner has been impossible.

In contrast, in the apparatus of this embodiment, the surface voltage level of the recording medium is not restricted by the requirement from the strength of the driving IC against high voltage since the apparatus is operated with low signal voltage, so that the use of non-magnetic insulative toner, use of color toner, the electrostatic transfer, as well as the use of insulative resin layer for the recording medium become possible.

Moreover, according to this embodiment, it is also possible to provide such an apparatus for generating ions capable of obtaining stable corona ions generation and constant corona ion currents regardless of the environmental conditions such as temperature, atmospheric pressure, and humidity.

It is to be noted that the electrostatic latent image may be formed alternatively by applying uniformly a high voltage of negative polarity to the recording medium beforehand, and forming a negative electrostatic latent image by cancelling the negative voltage on the recording medium by the corona ions of positive polarity generated by the apparatus.

Also, the arrangements of the signal electrodes 3 and the electric field formation electrode 6 may be interchanged in the above embodiment.

Furthermore, the apparatus may be further equipped with a heater equipments for heating the ion recording head in order to evaporate the vapor condensation on the corona ion generation electrode, such as those found in the conventional apparatus for generating ions, which can be made to be controllable by incorporating with the corona ion detection electrode and the corona ion current detector.

It is further to be noted that although the above embodiment is described as a corona ion generator using the solidified ion generation substrate to be used in an electrostatic printer, the aspects of the present invention pertaining to the controlling of the voltages to be applied to corona ion generation electrode and the signal electrode by using the corona ion detection electrode and the corona ion current detector, and that pertaining to the gradual increase of the direct bias voltage in order to evaporate the vapor condensation on the corona ion generation electrode are equally applicable to the other usage of the apparatus for generating ions such as a charger for electrophotographic recording apparatus.

Figure 18:
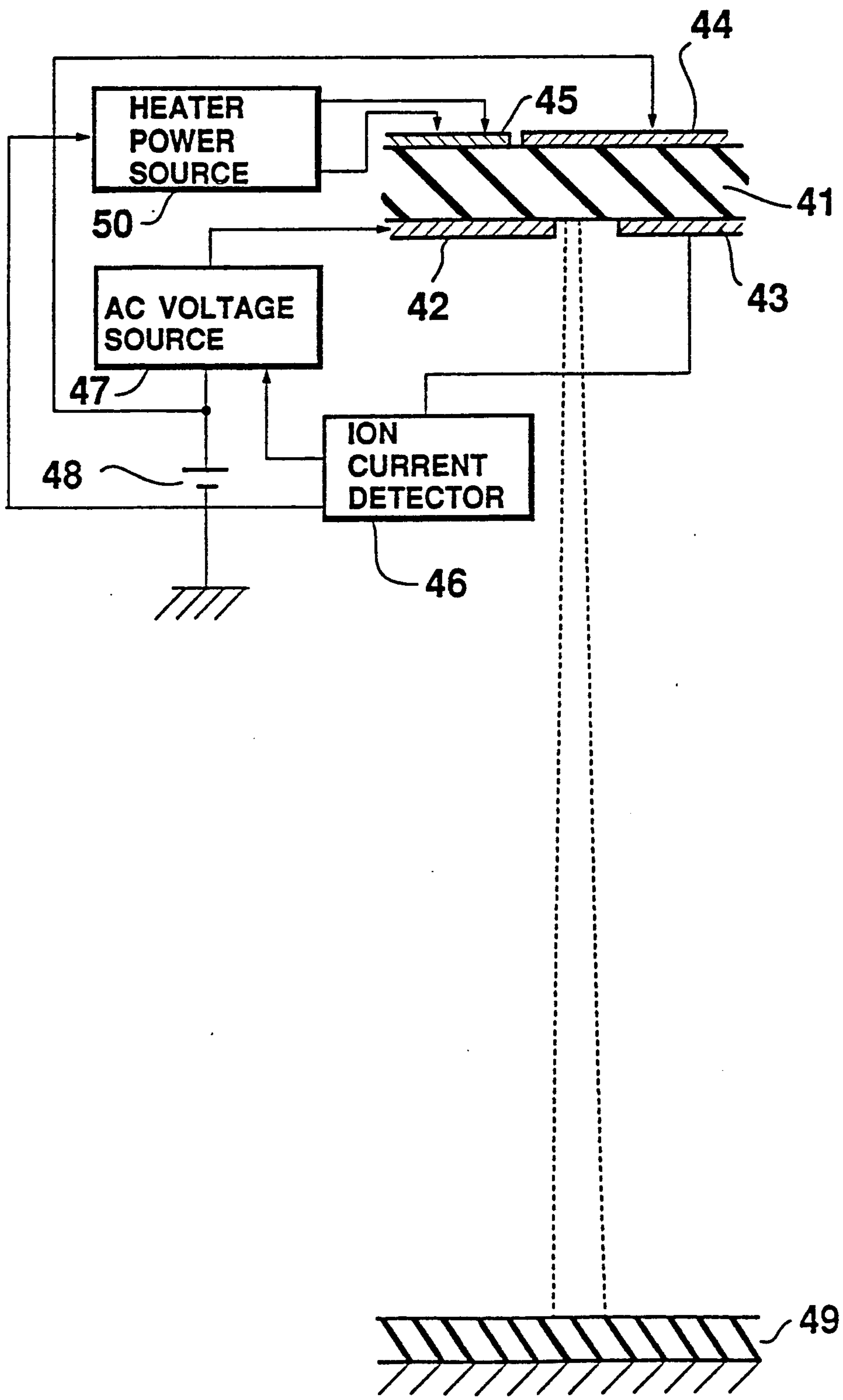
FIG. 18 is a schematic side view diagram of a second embodiment of an apparatus for generating ions according to the present invention.

As an example of such an application of the present invention, referring now to FIG. 18 a second embodiment of the present invention will now be described with references to FIG. 18.

Here, the apparatus for generating ions is used as a charger for an electrophotographic recording apparatus.

In this second embodiment, a corona ion generation electrode 42 and a corona ion detection electrode 43 are provided on one side of an insulative substrate 41 facing toward a recording medium 49.

On the other side of the insulative substrate 41, an induction electrode 44 and a heater 45 are provided.

To the corona ion generation electrode 42, an alternating voltage from an AC voltage source 47 is applied. The AC voltage source 47 is controlled by a signal from an ion current detector 46 for detecting currents from the corona ion detection electrode 43, such that the alternating voltage is gradually increased from zero as described in detail below.

In addition, the AC voltage source 47 and the induction electrode 44 are applied with a direct bias voltage from a DC voltage source 48 for raising a peak value of the alternating voltage to a vicinity of level of a critical voltage for corona ion generation. Also, the polarity of this direct bias voltage determines the polarity of the ions to be generated from the corona ion generation electrode 42 and to be radiated on the recording medium 49.

The heater 45 is controlled by a heater power source 50 which in turn is also controlled by a signal from an ion current detector 46 for detecting currents from the corona ion detection electrode 43, so as to heat up the corona ion generation electrode 42 in a manner to be described below.

To be more specific, in this second embodiment, the corona ion generation electrode 42 of 20 micron thickness made of tungsten and the signal electrodes 3 of 8 micron thickness is mounted on the insulative substrate 41 of 10 micron thickness made of polyimide. The recording medium 49 is placed 1 mm away from the apparatus, and the alternating voltage applied to the corona ion generation electrode 42 is of 100 kHz, while the direct bias voltage applied to the AC voltage source 47 and the induction electrode 44 is 600V of positive polarity.

Figure 19:
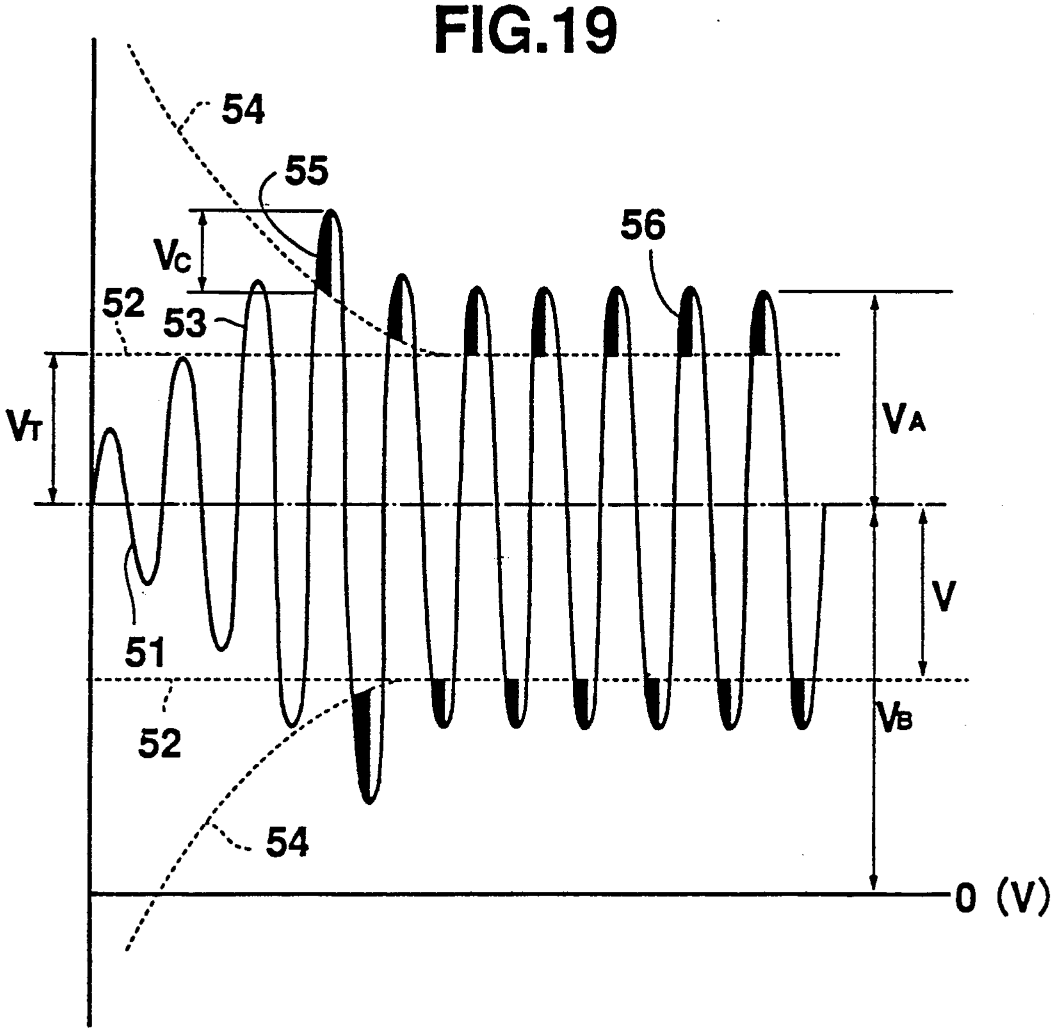
FIG. 19 is a signal form diagram for the alternating voltage and the direct bias voltage to be applied to the corona ion generation electrode and the direct voltage to be applied to the corona ion detection electrode in the apparatus of FIG. 18 in a case in which the critical voltage for the corona ion generation is changed by the change in the environmental conditions of the apparatus.

As shown in FIG. 19, the alternating voltage 51 of amplitude $V_A$ to be applied to the corona ion generation electrode 42 is gradually increased from zero, so that the corona ion generation begins when the peak value of the alternating voltage 51 biased by the direct bias voltage $V_B$ exceeds the critical voltage $V_T$ for the corona ion generation. When there is no vapor condensation on the corona ion generation electrode 42, the critical voltage $V_T$ is an indicated by a dashed line 52, so that the corona ion generation begins with the peak indicated as 53 in FIG. 19.

As a result, the corona ion current is detected at the corona ion detection electrode 43, on a basis of which the AC voltage source 47 is controlled by the ion current detector 46 such that the corona ion current at the corona ion detection electrode 43 is at a predetermined desired level.

Figure 20:
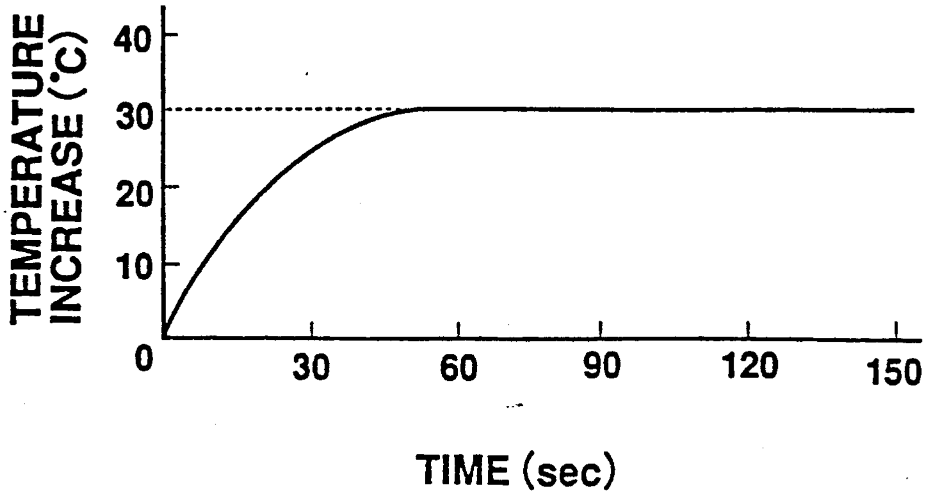
FIG. 20 is a graph of the temperature in the vicinity of the corona ion generation electrode of the apparatus of FIG. 18 as a function of time in a case in which the critical voltage for the corona ion generation is changed by the change in the environmental conditions of the apparatus.

When the vapor condensation is present on the corona ion generation electrode 42. The alternating voltage 51 of amplitude $V_A$ to be applied to the corona ion generation electrode 42 is gradually increased from zero as before. In this case, the induction loss appears in the insulative substrate 41, so that the temperature in the vicinity of the corona ion generation electrode 42 gradually increases as shown in FIG. 20. As a result, the vapor condensation on the corona ion generation electrode 42 evaporates, and along with this evaporation the critical voltage for the corona ion generation approaches the normal value without vapor condensation as indicated by a dashed line 54 in FIG. 19. The corona ion generation begins when the peak value of the alternating voltage becomes greater than the critical voltage as indicated by 55 in FIG. 19, and the corona ion generation is stabilized subsequently as indicated by 56 in FIG. 19 by the controlling of the alternating voltage to be applied to the corona ion generation electrode 2 as described above.

The increase in temperature in the vicinity of the corona ion generation electrode 42 shown in FIG. 20 is given by equation:

$$T \cdot \rho \cdot v \cdot c = \frac{\epsilon \omega t}{4.18} \cdot \frac{A}{d} \cdot V^2 \cdot \tan\delta \quad (5)$$

wherein $\rho$ is a specific weight, $v$ is a volume, c is a specific heat, $\epsilon$ is a dielectric constant, $\omega$ is an angular frequency, t is a time, A is a size of electrode, d is a distance between the electrodes, V is a voltage, and $\tan\delta$ is induction loss. For 100 kHz alternating voltage, increase of 25° C. in the corona ion generation electrode 42 takes roughly 60 sec as shown in FIG. 20. This heating up can be made faster by operating the heater 45 in accordance with the ion current detector 46.

Also, even when the alternating voltage is very high with respect to the critical voltage when the vapor condensation is completely evaporated, the alternating voltage can quickly be adjusted by the ion current detector 46 to an appropriate level.

Figure 21:
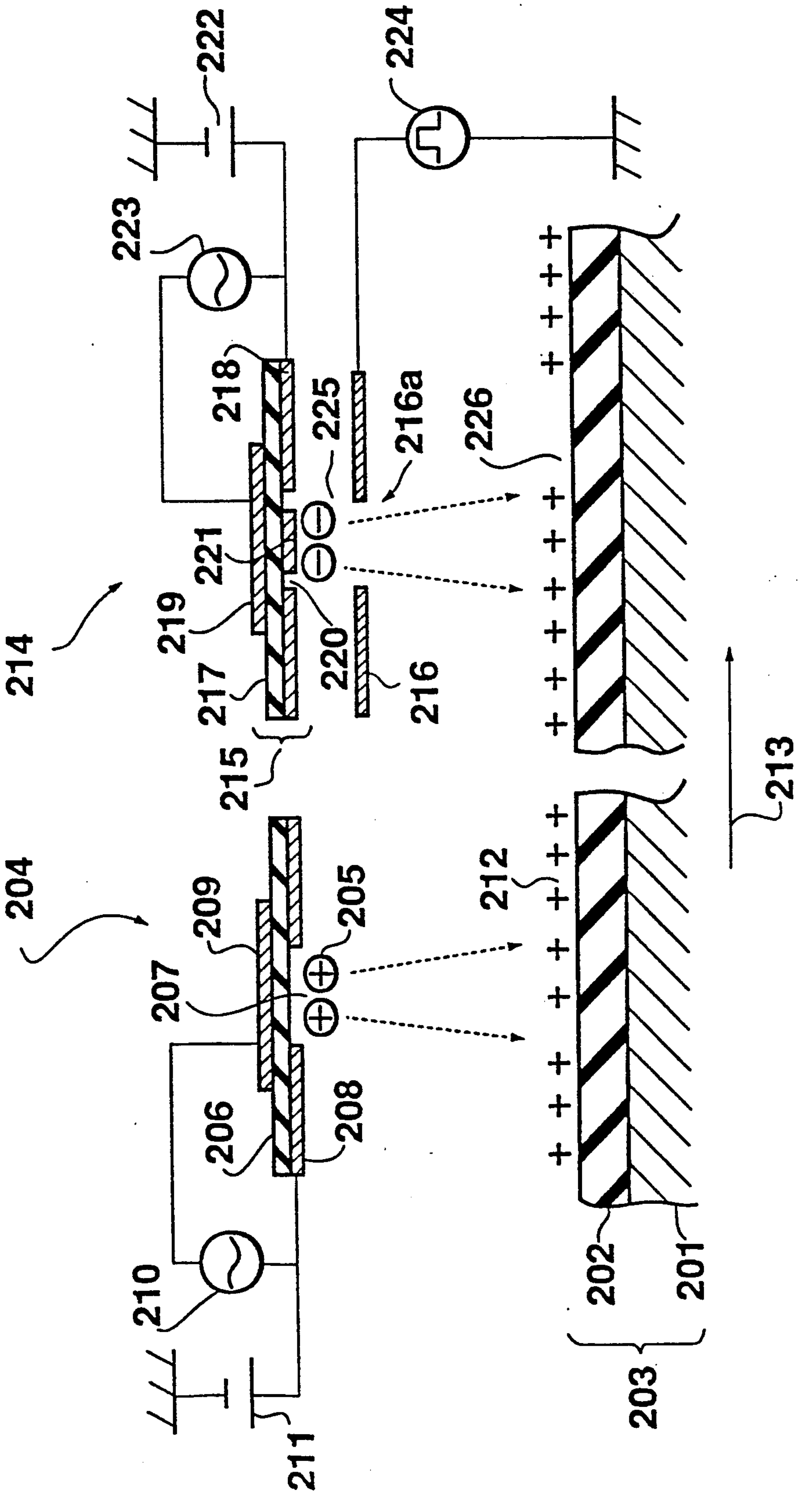
FIG. 21 is a schematic cross sectional view diagram of a third embodiment of an apparatus for generating ions according to the present invention.
Figure 22:
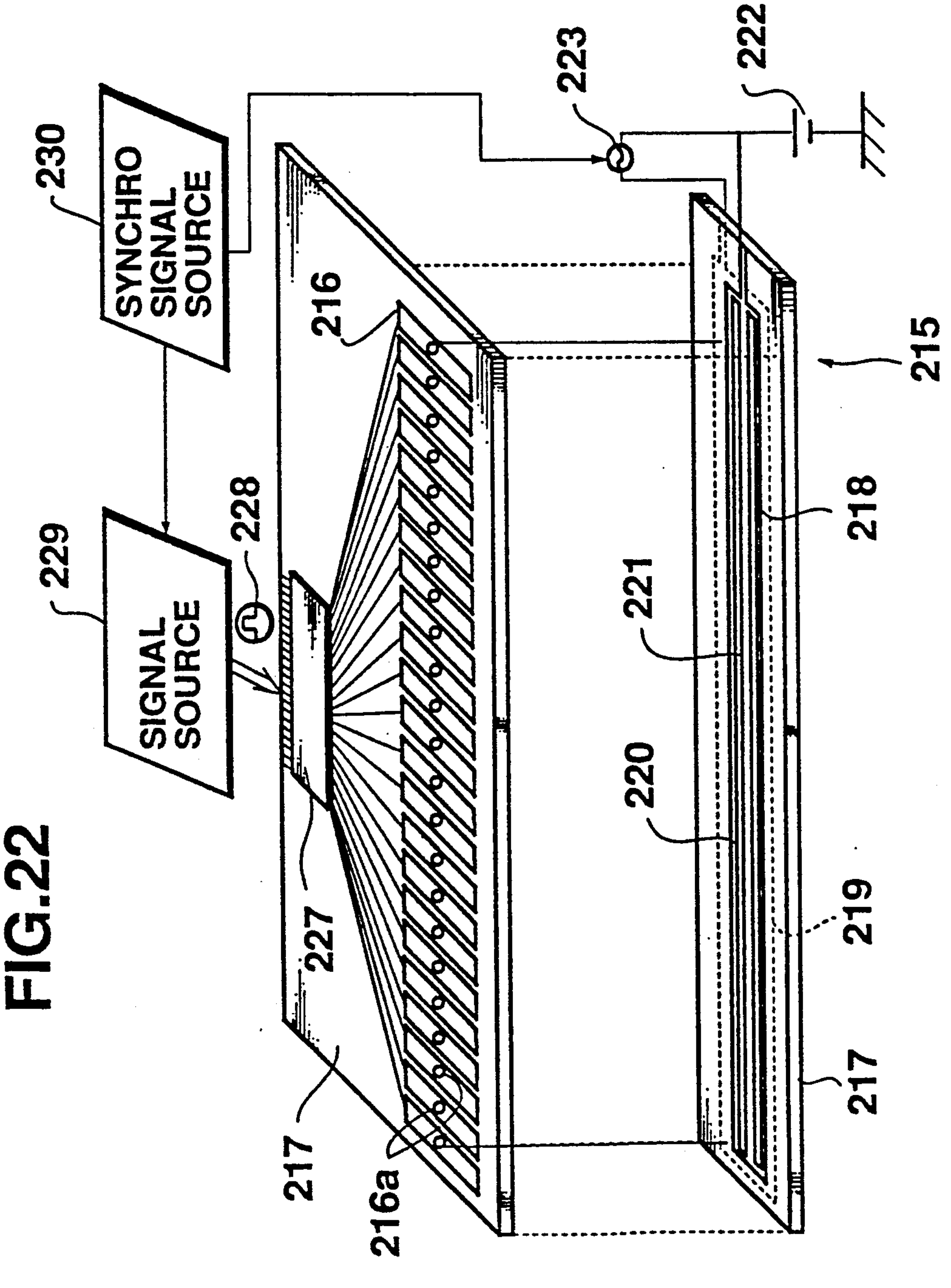
FIG. 22 is a schematic perspective view diagram of the apparatus of FIG. 21.

Referring now to FIGS. 21 and 22, there is shown a third embodiment of an apparatus for generating ions according to the present invention.

First, an image formation process in this embodiment will be explained with reference to FIG. 21.

In this embodiment, a recording medium 203 comprising an insulative layer 202 over a conductive substrate 201 is uniformly charged with charges 205 using positive corona ion current generated by a pre-charging corona ion generator 204, before the image formation.

The pre-charging corona ion generator 204 comprises a corona ion generation electrode 208 having a slit 207 for concentrating an electric field for corona ion generation inside thereof on a recording medium side of an insulative substrate 206, and an induction electrode 209 on the other side of the insulative substrate 206 such that the electric field is formed at the slit 207 between the corona ion generation electrode 208 and the induction electrode 209.

Between the corona ion generation electrode 208 and the induction electrode 209 there is applied an alternating voltage 210 of 900V peak voltage and 20 KHz frequency, so as to be able to generate both positive and negative corona ions. In addition, on the corona ion generation electrode 208 there is also applied a positive direct bias voltage 211 of 600V which makes only the positive corona ions to move toward the recording medium 203 such that a surface of the recording medium 203 is charged by corona charges 212 to have a surafce voltage Vs of 600V.

The recording medium 203 with such a uniform surface voltage Vs is then carried in a direction of an arrow 213 to underneath a corona ion generation 214.

The corona ion generation 214 comprises a corona ion generation section 215 and a plurality of corona ion control electrodes 216 each of which having a corona ion passing hole 216a corresponding to a recording dot. The corona ion generation section 215 comprises a corona ion generation electrode 218 and an induction electrode 219 on opposite sides of an insulative substrate 217, as in the pre-charging corona ion generation 204 above. The corona ion generation electrode 218 has a slit 220 as in the corona ion generation electrode 208 above, but inside the slit 220 there is a barrier electrode 221 for cutting off unnecessary electric field inside the slit 220, which is maintained at the same voltage level as the corona ion generation electrode 218.

On the corona ion generation electrode 218 and the barrier electrode 221 there is applied a bias voltage 222 of "38V so as to shut out the corona ions, and between the corona ion generation electrode 218 and the induction electrode 219 there is applied an alternating voltage 223 of 1800V peak to peak voltage and 10 KHz frequency which induces the corona ion generation therebetween at timings of pulsed signal voltages 224 of "38V applied to the corona ion control electrodes 216. Alternatively, the corona ion generation electrode 218 and the barrier electrode 221 may be maintained at a ground level while the signal voltage of "38V is applied to the corona ion control electrodes 216.

Among the positive and negative corona ions generated at the corona ion generation electrode 218 by the alternating voltage 223, only the negative corona ions 225 at the corona ion passing holes 216a of the corona ion control electrodes 216 with the signal voltage 224 applied are allowed to pass through the corona ion control electrodes 216 and get accelerated by the surface voltage Vs of the recording medium 203 to reach the recording medium 203 and reduce the surface voltage Vs to below 200V. As a result, a reversed electrostatic latent image 226 of as high electrostatic contrast as over 400V is produced on the recording medium 203.

In this embodiment, a corona ion head is formed by assembling a plurality of such corona ion generation 214, as shown in FIG. 22. The corona ion generation section 215 is common to all recording dots, which as described above comprises the corona ion generation electrode 218 with the barrier electrode 221 inside the slit 220 and the induction electrode 219 provided on opposite sides of the insulative substrate 217. As shown in FIG. 22, the corona ion generation electrode 218 and the barrier electrode 221 are connected together at their ends. The slit 220 has a width equal to a diameter of each of the corona ion passing holes 216a of the corona ion control electrodes 216. The corona ion generation electrode 218 is also covered by an insulators at side edges so as to prevent unnecessary corona ion generation.

Each of the corona ion control electrodes which is provided in correspondence with a recording dot is connected to a driving IC 227 to which parallel signals 228 corresponding for the recording dots are given by a signal source 229. The corona ion generation electrode 218 and the barrier electrode 221 are applied with the bias voltage 222 as described above, and in addition the corona ion generation electrode 218 and the induction electrode 219 are applied with the alternating voltage 223 which is synchronized with the signal voltage 224 applied to the corona ion control electrodes 216 by means of a synchronizing signal source 230.

Now, the preferable width of the slits 207 and 220 in the corona ion generation electrodes 208 and 218, respectively, will be explained.

Figure 23:
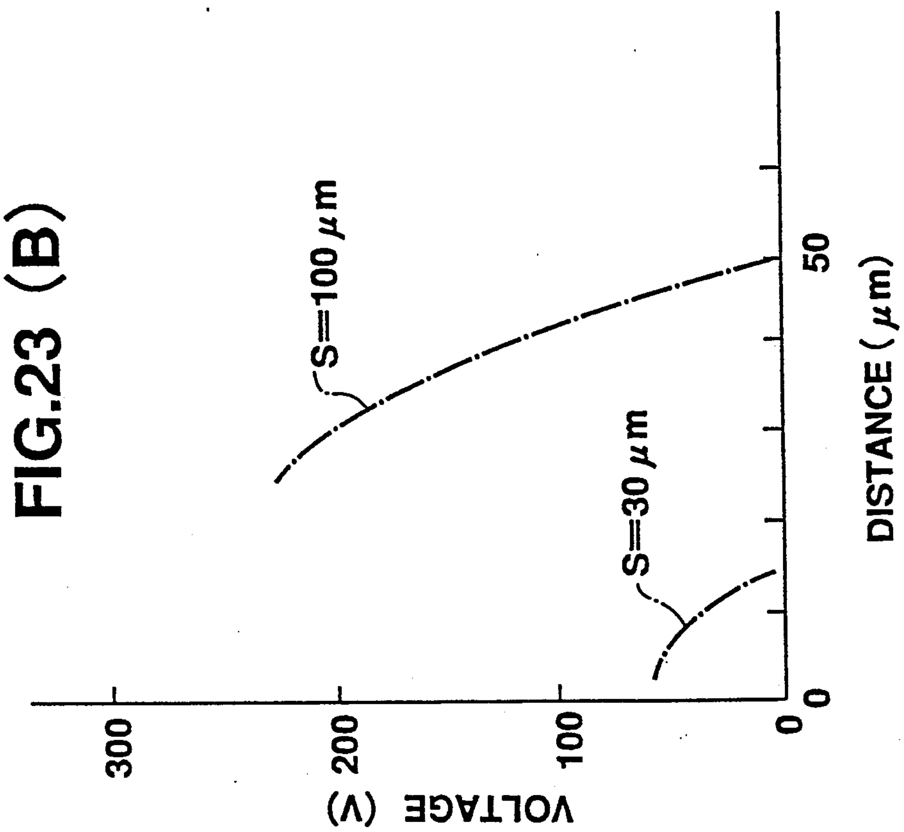
FIG. 23(A) is an enlarged cross sectional view of a corona ion generation section of a pre-charging corona ion generator in the apparatus of FIG. 21.
FIG. 23(B) is a graph of voltage level as a function of a distance from a corona ion generation electrode in the corona ion generation section of FIG. 23(A).
Figure 23:
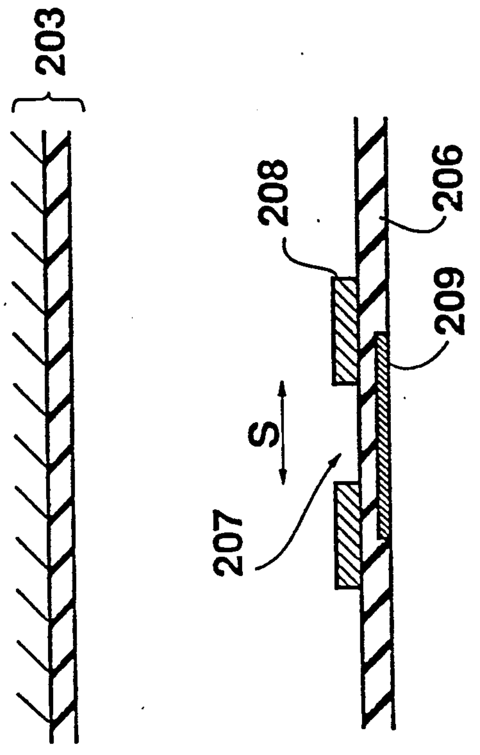

FIG. 23(A) shows the corona ion generator 204. Here, the induction electrode 209 is 2 μm thick and 200 μm wide, the insulative substrate 206 is 40 μm thick, and each side of the corona ion generation electrode 208 is 18 μm thick and 100 μm wide. The width of the slit 207 of the corona ion generation electrode 208 is taken to be S μm which is varied in order to find an appropriate value. The corona ion generation electrode 208 and the recording medium 203 are 500 μm apart.

With this configuration, the voltage levels were measured at 10 μm away from the center in the slit 207 for the slit width S=30 μm and S=100 μm which are plotted together in FIG. 23(B). As shown, when the width of the slit 207 approaches to that of the insulative substrate 206 the voltage levels drops down significantly so that over 2 KV peak to peak voltage will be necessary to cause the corona ion generation in a case of S=30 μm , whereas only 1 KV peak to peak voltage will be sufficient to cause the corona ion generation in a case of S=100 μm . Thus, the width of the slit 207 is preferably be thicker than the thickness of the insulative substrate 206. For the similar reason, the width of the slit 220 in the corona ion generation electrode 218 is also preferably be thicker than the thickness of the insulative substrate 217. The widths of the slits 207 and 220 are taken to be 100 μm in the following description of this embodiment, which is 2.5 times the thickness of the insulative substrates 206 and 217.

Next, the effect of the barrier electrode 221 provided in the slit 220 of the corona ion generation electrode 218 will be explained.

Figure 24:
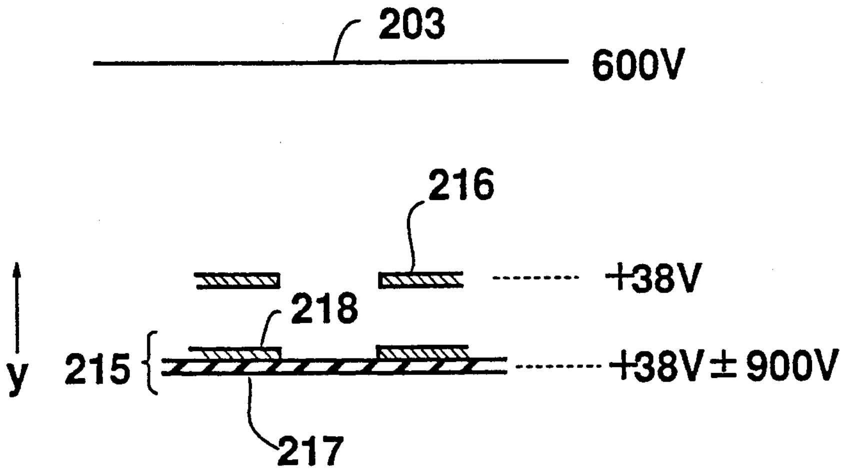
FIG. 24(A) is an enlarged cross sectional view of a corona ion generation section of a corona ion generator in the apparatus of FIG. 21 without a barrier electrode.
FIG. 24(B) is a graph of voltage level as a function of a distance from a center of a corona ion control electrode in the corona ion generation section of FIG. 24(A).
Figure 24:
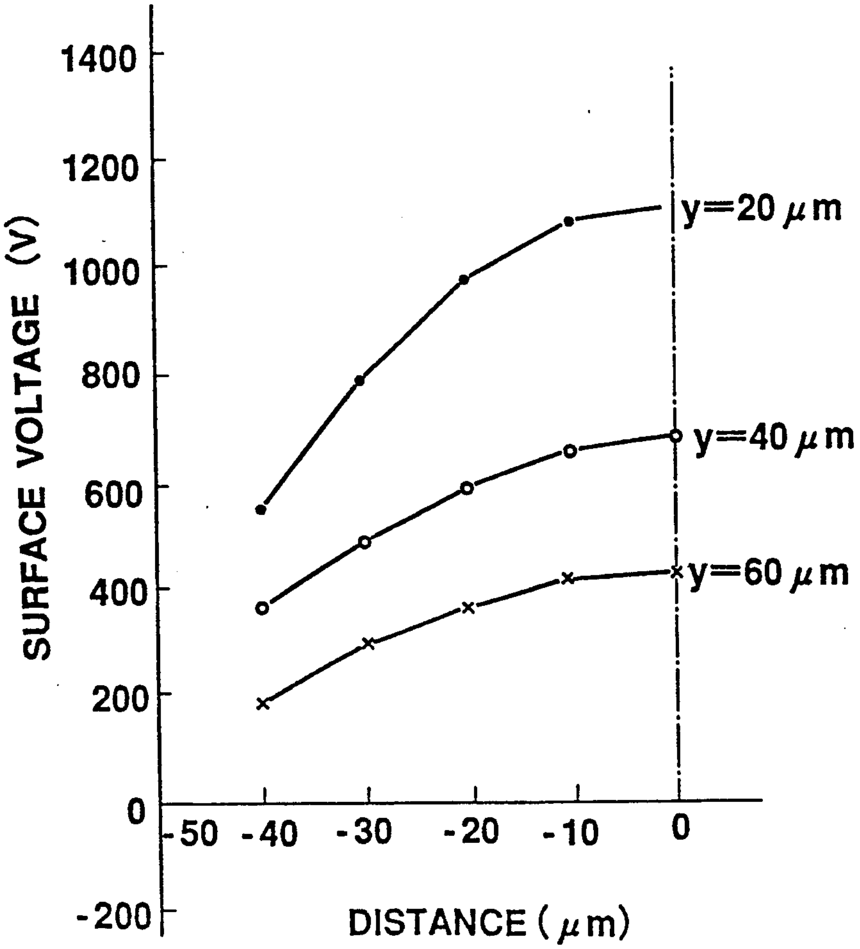

For this purpose, FIG. 24(A) shows the corona ion generator 214 without the barrier electrode 221. Here, the corona ion generation electrode 218 is 8 μm thick, the induction electrode 219 is 2 μm thick, and the corona ion control electrode 216 is 10 μm thick. The width of the slit 220 of the corona ion generation electrode 218 as well as the diameter of the corona ion passing hole 216*a* of the corona ion control electrode 216 is 100 μm . The corona ion generation electrode 218 and the corona ion control electrode 216 are 60 μm apart, and the corona ion control electrode 216 and the recording medium 203 are 200 μm apart.

In this case, the negative corona ions are generated from the corona ion generation electrode 218 when the recording medium 203 has the surface voltage of +600 V, the corona ion generation electrode 218 is biased by +38V, the alternating voltage of 1800V peak to peak voltage is applied between the corona ion generation electrode 218 and the induction electrode 219, and the signal voltage of +38V is applied to the corona ion control electrode 216.

The distribution of the potential level as a function of a distance from the corona ion generation section 215 at a middle of the slit 220 and the corona ion passing hole 216*a* is plotted in FIG. 24(B). As shown, the potential level in this case is typically of the order of hundreds of volt, so that in order to control the corona ion current by changing the potential level at the corona ion control electrode 216 with respect to the corona ion generation electrode 218, a control voltage of the order of hundreds of volt needs to be applied to the corona ion control electrode 216.

Figure 25:
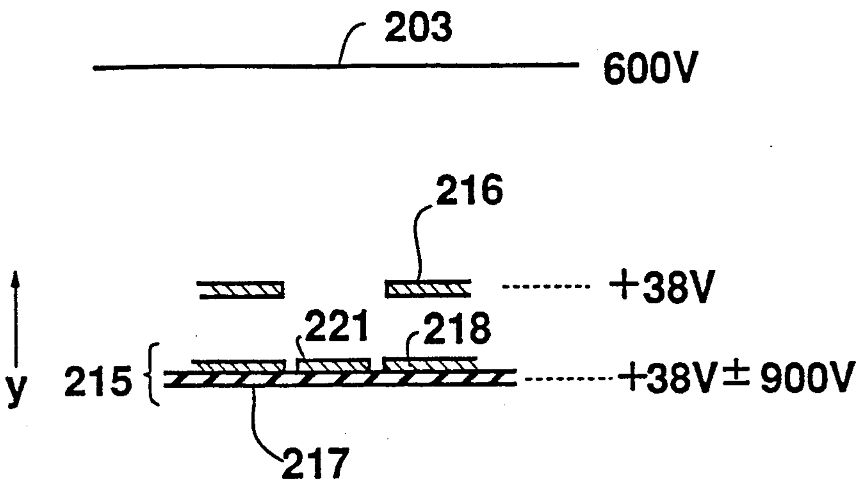
FIG. 25(A) is an enlarged cross sectional view of a corona ion generation section of a corona ion generator in the apparatus of FIG. 21 with a barrier electrode.
FIG. 25(B) is a graph of voltage level as a function of a distance from a center of a corona ion control electrode in the corona ion generation section of FIG. 25(A).
Figure 25:
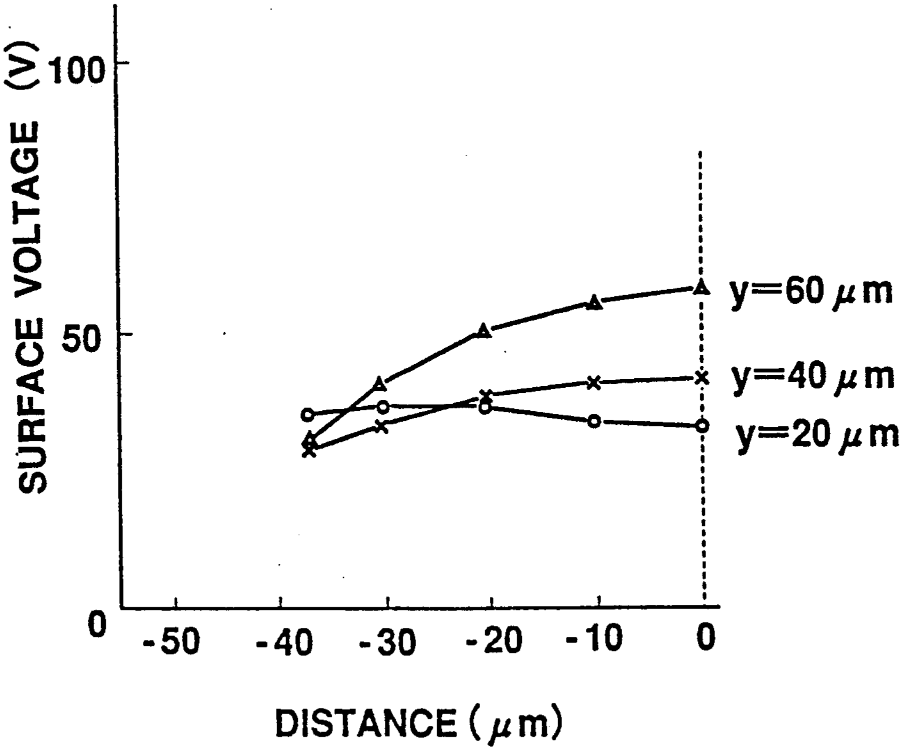

On the other hand, when the barrier electrode 221 of 50 μm width is placed in the slit 220 of the corona ion generation electrode 218 as shown in FIG. 25(A), the distribution of the potential level changes to that shown in FIG. 25(B).

As shown, the potential level in this case is typically of the order of tens of volts, so that the corona ion current can be controlled by simply grounding the corona ion control electrode 216. Moreover, the steady corona ion generation is guaranteed in this case because the electric field in a vicinity of the corona ion generation electrode 218 is hardly affected by such a low voltage. Meanwhile, the positive corona ions are absorbed by the corona ion control electrode 216 without reaching to the recording medium 203 because of the lower potential level of the corona ion control electrode 216 with respect to the surface of the recording medium 203. Furthermore, the amount of corona ion generation is also unaffected by the placement of the barrier electrode 221 because the regions of the strong electric field in which the corona ion generation take place are located at the immediate vicinity of the corona ion generation electrode 218 which the barrier electrode 221 leaves out.

Now, the corona ion generation with the barrier electrode 221 described above will be explained theoretically.

This corona ion generation can basically be described in analogy with a triode by regarding the barrier electrode 221 as a cathode, the recording medium as an anode and the corona ion control electrode 216 as a grid, with the difference that the case of the actual triode deals with the electrons whose role is replaced by the corona ions in this case, which gives rise to a difference n the relation between the carrier velocity and the voltage. With this difference taken into account, the corona ion generation in this case can be described by the following equations:

$$\frac{d^2V}{d^2y} = -\frac{\rho}{\epsilon_a \epsilon_0} \tag{6}$$

$$V = \mu \frac{dV}{dy} \tag{7}$$

$$i = \sigma v \tag{8}$$

where V is a potential level at a distance y away from the corona ion generation section 215, $\epsilon_a$ is a dielectric constant of air, $\epsilon_0$ is a dielectric constant of vacuum, $\sigma$ is a charge density of the corona ions at the distance y, v is a velocity of the corona ions at the distance y, $\mu$ is a mobility of the corona ions, and i is a corona ion current at the distance y.

The above equations hold for the steady presence of the corona ions, which can be realized by making the period of the alternating voltage 223 applied between the corona ion generation electrode 218 and the induction electrode 219 as well as the period of the signal voltage 224 applied to the corona ion control electrode 216 sufficiently longer than the time taken by the corona ions to reach the recording medium 203 which is approximately 2 μsec. In this regard it is further preferable to synchronize the signal voltage 224 and the alternating voltage 223.

Thus, in this embodiment, the low voltage driving is achieved by generating floating charges steadily and controlling the, in a sharp contrast to the conventional method in which the corona ion generation is controlled by restricting the floating charges with high voltages.

The negative corona ions so generated will then be attracted toward the surface voltage Vs of the recording medium 203 when a control voltage Vg is applied between the corona ion generation electrode 218 and the corona ion control electrode 216 in a form of the corona ion current $I_p$ given by the following expression:

$$I_p = \frac{9}{8}\cdot\epsilon_a\cdot\epsilon_0\cdot\mu\cdot\frac{1}{b^3}\cdot\left(\frac{Vg + Vs/k}{1 + 1/k\cdot(1 + 3a/2b)}\right)^2 \quad (9)$$

where a is a distance between the corona ion control electrode 216 and the recording medium 203, b is distance between the corona ion control electrode 216 and the corona ion generation electrode 218, and k is a voltage gain determined form the capacitances between the corona ion control electrode 216 and the recording medium 203, and between the corona ion control electrode 216 and the barrier electrode 221, here, the corona ion passing holes 216*a* of the corona ion control electrodes 216 are assumed to be periodically present just as the grids of the triode, in which case the voltage gain k varies as a function of a distance from the corona ion control electrode 216 and takes the minimum value at the center.

The above expression for the corona ion current holds until the corona ion current reaches to the constant saturated current level. Below the saturation current level, the corona ion current depends on the electrode structure, voltage applied to the corona ion control electrode 216 and the surface voltage of the recording medium 203, but is independent of the amount of corona ion generation. For this reason, the steady corona ion current is obtainable by setting the alternating voltage 223 more than necessary for the sufficient corona ion generation, in which case the fluctuation due to the difference in individual corona ion generation electrode 218 becomes irrelevant.

Also, the control voltage Vg to be applied to the corona ion control electrode 216 in order to shut off the corona ion current is given by the following expression:

$$Vg = -Vs/k \quad (10)$$

which takes the maximum value when the voltage gain k takes the minimum value at the center of the corona ion control electrode 216.

Furthermore, the signal voltage 224 to be applied to the corona ion control electrode 216 is preferably not greater than the bias voltage applied to the corona ion generation electrode 218. This is because when the signal voltage 224 is greater than the bias voltage a fraction of the negative corona ions is directly attracted toward the corona ion control electrode 216, which deteriorates the efficiency of the corona ion utilization, and which affects the voltage between the corona ion control electrode 216 and the recording medium 203 which further deteriorates the efficiency of the corona ion utilization. For the similar reason, the voltage between the barrier electrode 221 and the corona ion control electrode 216 is preferably at 0V for the absence of the control voltage for which the maximum amount of the corona ion current is obtainable, and should be lower than that at least.

As for the surface voltage of the recording medium 203, this surface voltage gradually reduces from its initial value Vs as the negative corona ions reaches the recording medium. This surface voltage Vp as a function of time t is give by the following expression:

$$Vp = \frac{Vs}{1 + \dfrac{9\cdot\epsilon_a\cdot\epsilon_0\cdot\mu\cdot(Vs/k)\cdot t}{8\cdot b^3\cdot(1 + 1/k\cdot(1 + 3a/2b))^2\cdot Cp}} \quad (11)$$

where Cp is a capacitance of the recording medium 203, and the voltage between the barrier electrode 221 and the corona ion control electrode 216 is assumed to be at 0V such that the corona ion current Ip has the maximum value.

Figure 26:
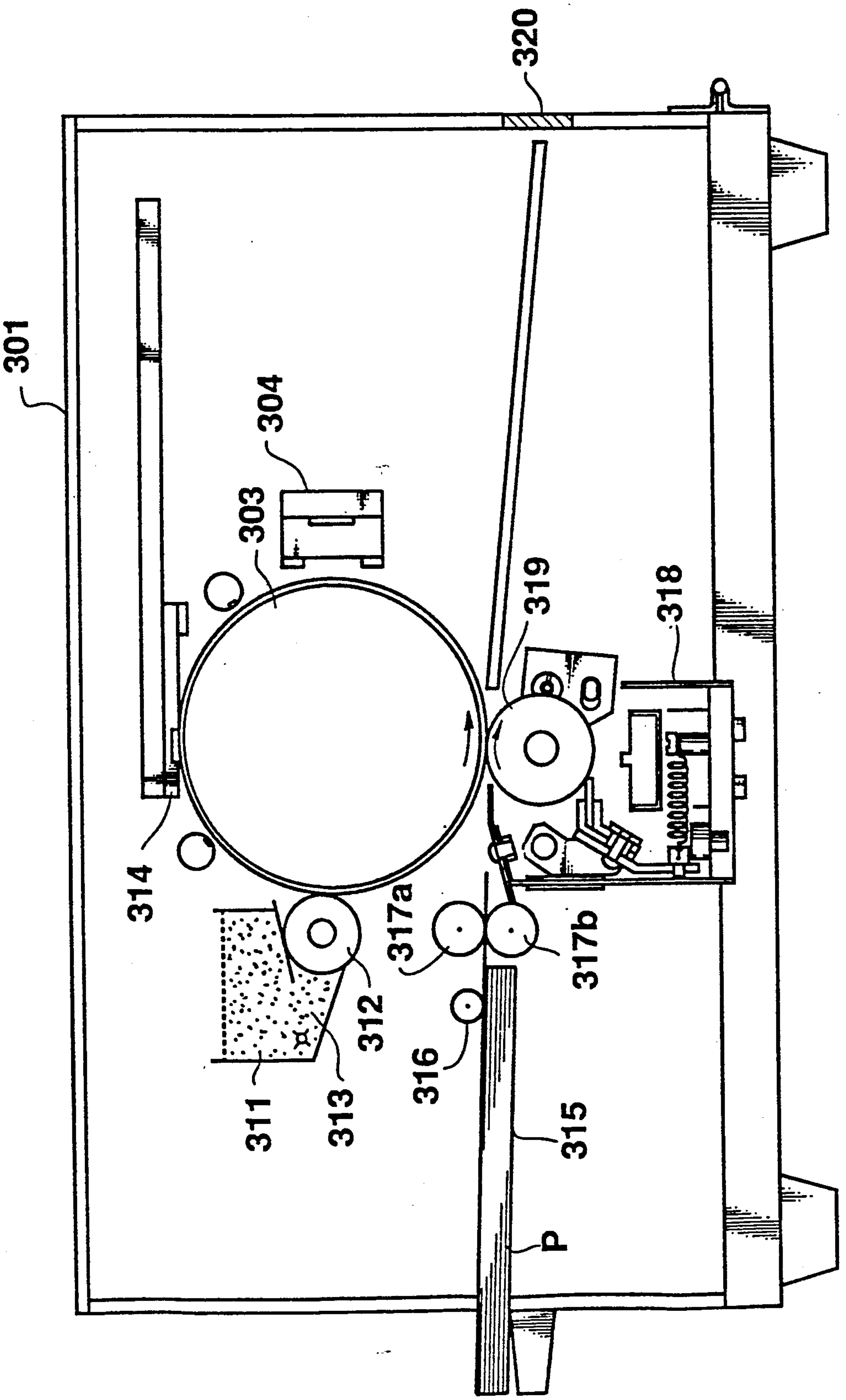
FIG. 26 is a cross sectional view of an apparatus for ion recording using the apparatus of FIG. 21 as an ion recording head.

Referring now to FIG. 26, an apparatus for ion recording using the apparatus for generating ions as described above which is constructed in accordance with the theoretical consideration given above will be described.

This apparatus for ion recording 301 comprises a cylindrical recording drum 303 which functions as an image bearer, around which there are, along the direction of its rotation, a pre-charging corona ion generator 304 for pre-charging the recording drum 303, an ion recording head 314 for producing an electrostatic latent image on the recording drum 303, a developing device 311 having a developing roller 312 and containing an developer 313 for developing the electrostatic latent image on the recording drum 303 by the developer 313, and roller transfer device 318 having a transfer roller 319 for transferring the developed toner image on the recording drum 303 onto a recording paper P. The apparatus for ion recording 301 is further equipped with a paper supply cassette 315 holding recording papers P within, from which one recording paper P at a time is taken out by a paper supply roller 316 and supplied between the recording drum 303 and the transfer roller 319 with the help of aligning rollers 317*a* and 317*b*, so as to have the image transferred thereon. The recording paper P with the image transferred will be ejected through a paper outlet 320 on the other side of the apparatus 301 from the paper supply cassette 315.

The recording drum 303 which corresponds to the recording medium 203 in the above description is made of an insulative resin layer of 50 μm thick over a conductive layer.

The pre-charging corona ion generator 304 for pre-charging this recording drum 303 with the initial surface voltage of +600V is located 600 μm away from the recording drum 303. This pre-charging generation generator 304, which corresponds to the pre-charging generator 204 in the above description, is made of the induction electrode of 2 μm thick and of 1 mm wide on the insulative ceramic substrate, the insulative resin layer of 8 μm thick over the induction electrode, and the corona ion generation electrode of 15 μm thick over the insulative resin layer which has the slit of 100 μm wide located above the induction electrode.

It is to be noted that the pre-charging corona ion generator 304 may be replaced by a conventional corona charger.

As described above, between the induction electrode and the corona ion generation electrode the alternating voltage of 1800V peak to peak voltage and 50 KHz frequency are applied in order to generate both positive and negative corona ions. The corona ion generation electrode is further applied with the bias voltage of +600V so as to allow only the positive corona ions to reach the recording drums 303 and charge it to +600V. The strong electric field due to the alternating voltage causes the generation of the corona ions of approximately $2.8\times10^{-4}$ A/cm$^2$ within 10 μm range from the corona ion generation electrode, by which the recording drum 303 of 50 μm thick can be charged up to +600V in approximately 100 μsec.

The pre-charged recording drum 303 then revolves around to underneath the ion recording head 314 which comprises a plurality of corona ion generators 214 described above, such that the electrostatic latent image is formed on the recording drum 303 by the negative corona ions generated by the ion recording head 314 in accordance with the signal voltages. Each of the corona ion generators in the ion recording head 314 is constructed similarly to the pre-charging corona ion generator 304 above with the difference that inside the slit of 100 μm wide there is provided the barrier electrode of 50 μm wide. In addition, each of the corona ion generator has the corona ion control electrode of 10 μm thick having the corona ion passing hole of 100 μm diameter corresponding to a recording dot, which is located 60 μm away from the corona ion generation section and is separated from the recording drum 303 by 500 μm . This ion recording head 314 possesses the resolution of 10 lines/mm.

The ion recording head 314 operates as follows. The corona ion generation electrode and the barrier electrode are both grounded while the alternating voltage of 1800V peak to peak voltage and 5KHz frequency synchronized with the signal voltage is applied to the induction electrode, to generate the corona ion current of $2.8\times10^{-4}$ A/cm$^2$. Out of the generated corona ions, only the negative corona ions are selected by the corona ion control electrode and allowed to reach the recording drum 303.

Figure 27:
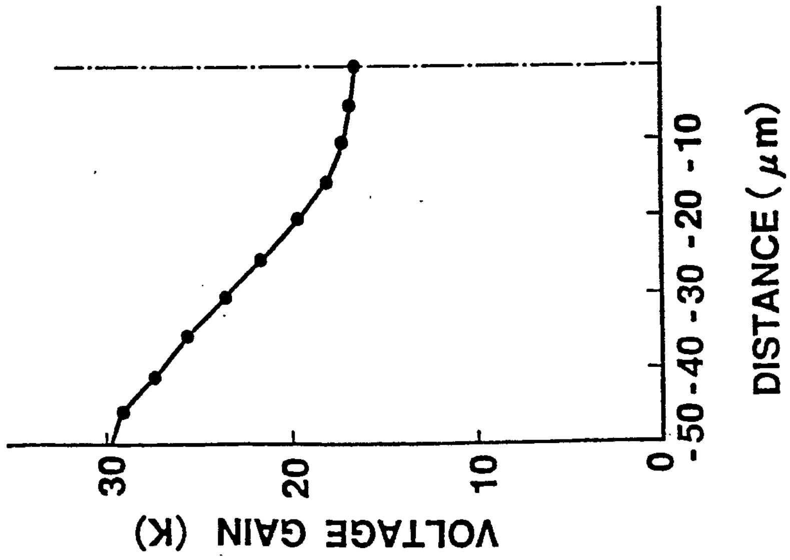
FIG. 27 is a graph of a voltage gain as a function of a distance from a center of a corona ion control electrode in the ion recording head of the apparatus of FIG. 26.

Here, the voltage gain k of the ion recording head 314 varies as a function of a distance from the center of the corona ion control electrode as shown in FIG. 27, with the minimum value at 16 at the center and the maximum value of 30 at the surface of the corona ion control electrode. Consequently, the control voltage to shut off the corona ion current is maximum at the center according to the equation (10) give above. The corona ion current can be shut off by applying reverse bias voltage of +38V to the corona ion generation electrode. In other words, the corona voltage of "38V to the corona ion generation electrode and the signal voltage comprising "38V and 0V levels to the corona ion control electrode.

The maximum value of the corona ion current density is $1.3\times10^{-5}$ A/cm$^2$ according to the equation (9) given above, which is sufficiently smaller than the corona ion current from the corona ion generation section, so that the sufficient amount of the corona ions can be obtained regardless of the differences in individual corona ion generation electrodes. Moreover, the corona ion current is obtained for each one of the recording dot separately so that the fluctuation in the amount of corona ions from one recording dot to another can be prevented.

The signal voltage to be applied to the corona ion control electrode is to be synchronized with the alternating voltage of 5KHz applied to the corona ion generation section so that the signal voltage has the pulse width of 100 μsec.

Figure 28:
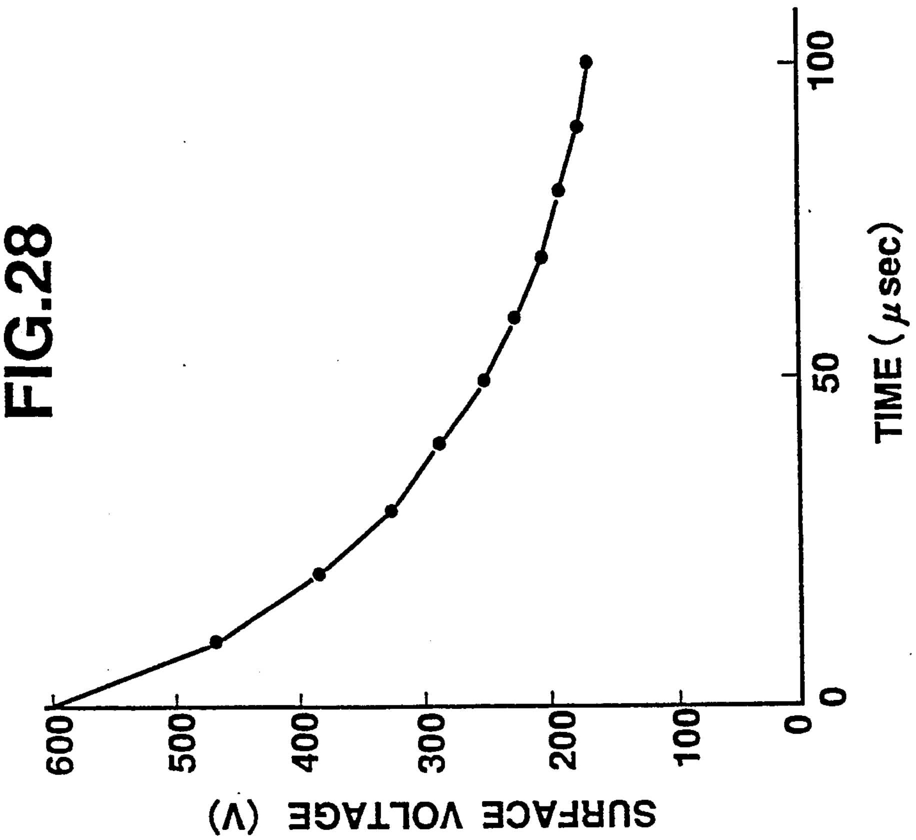
FIG. 28 is a graph of a surface voltage of a recording drum as a function of time in the apparatus of FIG. 26.

The surface voltage of the recording drum 303 changes in time according to the equation (11) given above, which is plotted for this apparatus in FIG. 28. As shown, the surface voltage drops from the initial value of +600V to +150V in 100 μsec so that the electrostatic latent image of as high electrostatic contrast as 450V can be obtained. Near the edge of the recording dot, the corona ion current is slightly less than at the center of the recording dot so that the electrostatic contrast is about 350V there. Such a difference in the electrostatic contrast between the center and edge of the recording dot may be compensated by arranging the corona ion generators in such a way as to have the edges of the neighboring recording dots overlapping.

The recording speed obtainable by the 100 μsec signal time of this apparatus corresponds to continuous printing at a high speed of 90 papers/min. for A4 size paper with the resolution of 01 lines/mm.

This ion recording head 314 enable to lower the signal voltage from the conventional order of hundreds of volt to 30 to 40V.

Also, the bias voltage of the order of hundreds of volt conventionally applied between the recording drum and the corona ion control electrode in order to accelerate the corona ions toward the recording drum is unnecessary in this ion recording head 314, and is replaced by the bias voltage of the order of tens of volt to be applied between the corona ion generation electrode and the corona ion control electrode for turning the corona ion current on and off.

Thus, the driving IC of this ion recording head 314 can be of low voltage driving IC which has a smaller implementation area, so that it is possible to make a compact ion recording head with the driving IC completely implemented on the substrate of the head.

Also, the corona ion current can be controlled solely by the applied voltage for controlling the floating charges so that the fluctuation in the corona ion currents due to the difference in individual corona ion generation electrodes can be prevented.

Furthermore, the surface voltage of the conventional ion recording head has been limited to about 150V by the strength of the driving IV against high voltage, and for this reason only a conductive magnetic toner has been usable, whose conductivity prevented the electrostatic transferring on the recording paper and necessitated the thermal or press transferring. This latter in turn necessitated the use of a metal blade for wiping out the residual toner adhering to the recording drum, which required the recording drum to have a very hard alumetized steel coating. In addition, the use of the magnetic toner prevented the color recording.

On the contrary, according to the apparatus for ion recording of this embodiment, the surface voltage of the recording drum can be made as high as to be able to use the insulative toner normally used in electrophotography because of the low voltage driving IC, which enable the electrostatic transferring an prevent the adhering of the toner on the recording drum so that the usual cleaning blade made of resin is sufficient for cleaning of the residual toner, which in turn allow the recording drum to have a cheap resin insulator layer. Also, the color recording becomes possible by using ordinary insulative resin toner.

It is to be noted that the corona ion generators used in this embodiment may be replaced by corona chargers usually used n the electrophotography. Also, the polarity of the corona ions used in this embodiment may be completely reversed. Also, the reversed electrostatic latent image used in this embodiment can easily be replaced by the normal electrostatic latent image by suitable adjusting the ion recording head. Also, the alternating voltage to be applied to the corona ion generation section may have the frequency which is an integer multiple of that of the signal voltage, so as to have more than one peak voltages of the one signal voltage.

Now, there are several additional features that can be added beneficially to the third embodiment described above, which will be described below as the variations of the third embodiment.

Figure 29:
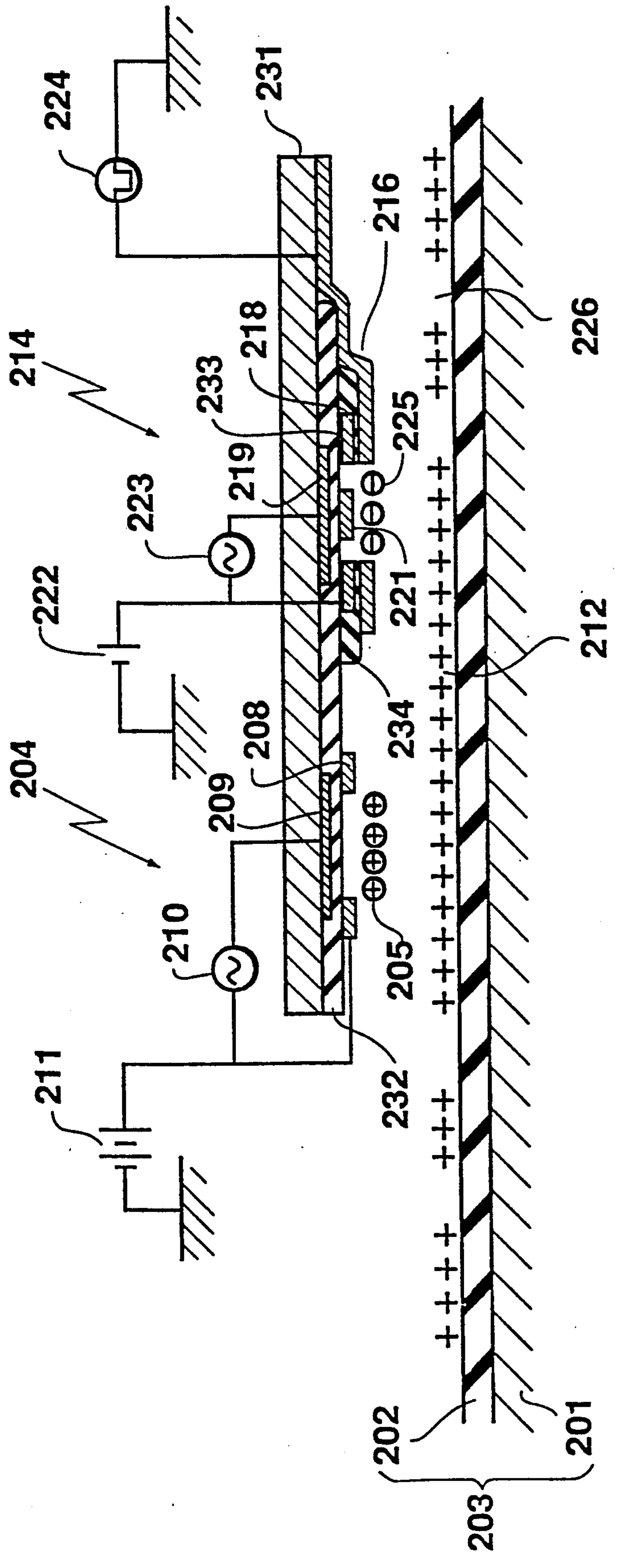
FIG. 29 is a schematic cross sectional view diagram of a first variation of the apparatus of FIG. 21.
Figure 30:
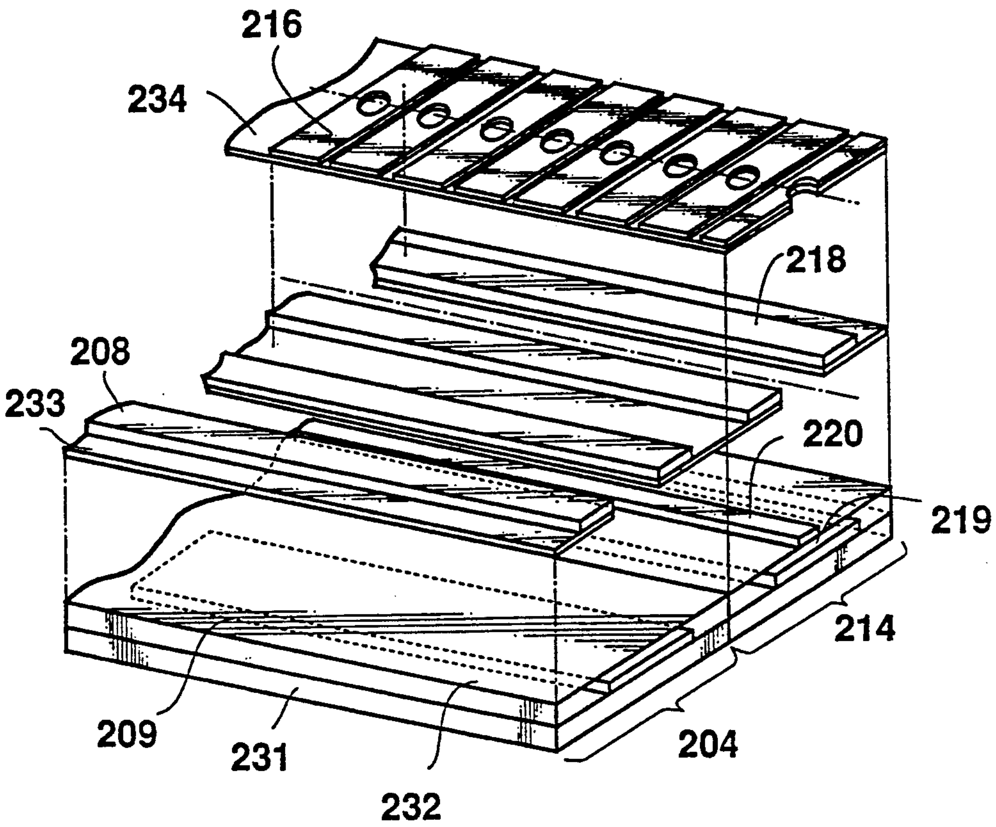
FIG. 30 is a schematic perspective view of the apparatus of FIG. 29.

As a first variation, the pre-charging corona ion generator 204 and the corona ion generator 214 shown in FIG. 21 can be manufactured as a single entity. This is shown in FIG. 29 in cross sectional view and in FIG. 30 in expanded view, where both the pre-charging corona ion generator 204 and the corona ion generator 214 are provided on a common ceramic substrate 231. This is achieved as follows. First, the induction electrodes 209 and 219 are made on the common ceramic substrate 231 of 500 μm thick by placing two aluminum layers of 200 μm wide each, 1 mm apart from each other, using sputtering technique. Then, the induction electrodes 209 and 219 are covered by a common polyimide insulation layer 232 of 10 to 40 μm . On this polyimide insulation layer 232, the barrier electrode 220 is attached at an appropriate location, and also the corona ion generation electrodes 208 and 218 made of a film of high melting point metal such as tungsten or molybdenum attached on a polyimide layer 223 are attached. Then, the corona ion generation electrode 218 of the corona ion generator 214 are covered by insulative layers 234 of 60 μm thick, and finally on top of the insulative layers 234 the corona ion control electrodes 216 are mounted.

Figure 31:
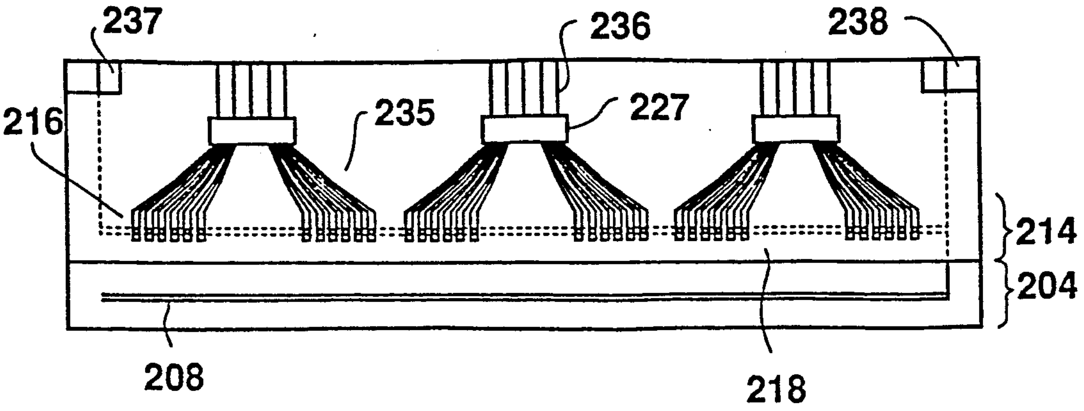
FIG. 31 is a schematic top plan view of the apparatus of FIG. 29.

In addition, the driving ICs 227 of the corona ion generator 214 can be incorporated as in FIG. 31. As shown, the driving ICs 227 are placed behind the corona ion control electrodes 216, with signal lines 235 connected to the corona ion control electrodes 216 and signal lines 236 to be connected with the signal sources. The corona ion generation electrodes 208 and 218 have lines 237 and 238, respectively, to be connected with the voltage sources.

This combining of the pre-charging corona ion generator 204 and the corona ion generator 214 including its driving ICs 227 not only enable to gather these parts compactly, but also reduces the number of parts to be placed around the recording medium 203 so that the recording medium 203 itself can be made smaller. Moreover, the maintenance duty can be reduced because of the smaller number of parts involved.

It is to be noted that the similar combining may be applied to other types of the corona ion generators and pre-chargers for the advantages just described.

Next, as a second variation, in the corona ion generator 214, the barrier electrode 221 can be made wider than the diameter of the corona ion passing hole 216a so as to have more effective confinement of the electric field in the vicinity of the corona ion generation electrode 218 such that the electric field will not leak into the corona ion passing hole 216a.

Figure 32:
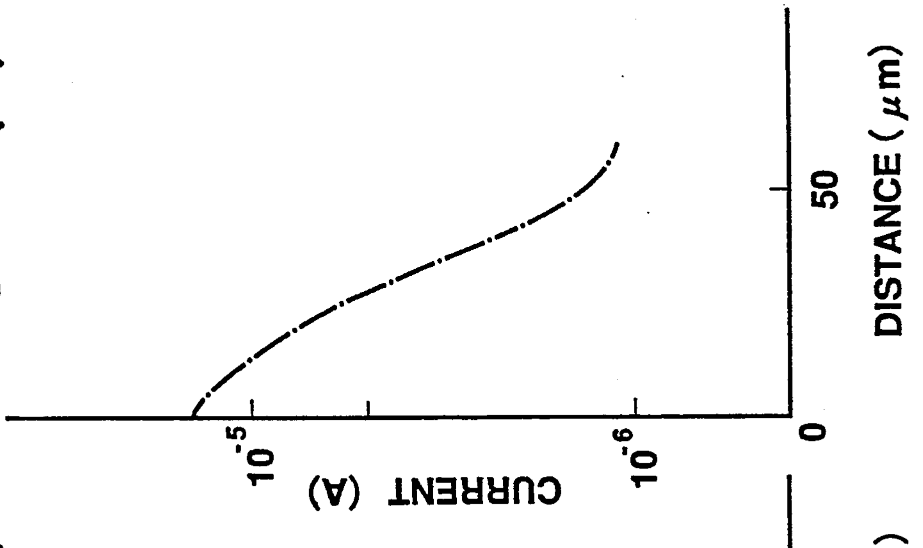
FIG. 32(A) is an enlarged cross sectional view of a corona ion generation section of a corona ion generator in the apparatus of FIG. 29.
FIG. 32(B) is a graph of a voltage gain as a function of a distance from a center of a corona ion control electrode in the apparatus of FIG. 29.
FIG. 32(C) is a graph of a corona ion current as a function of a distance from a center of a corona ion control electrode in the apparatus of FIG. 29.
Figure 32:
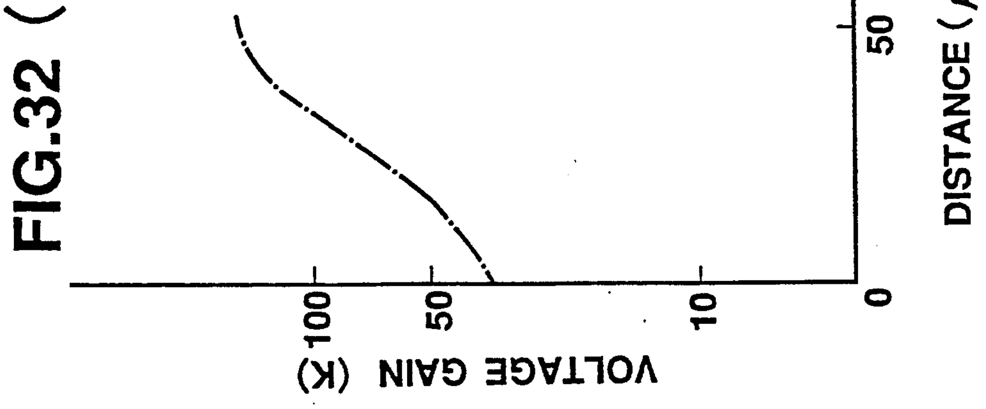
Figure 32:
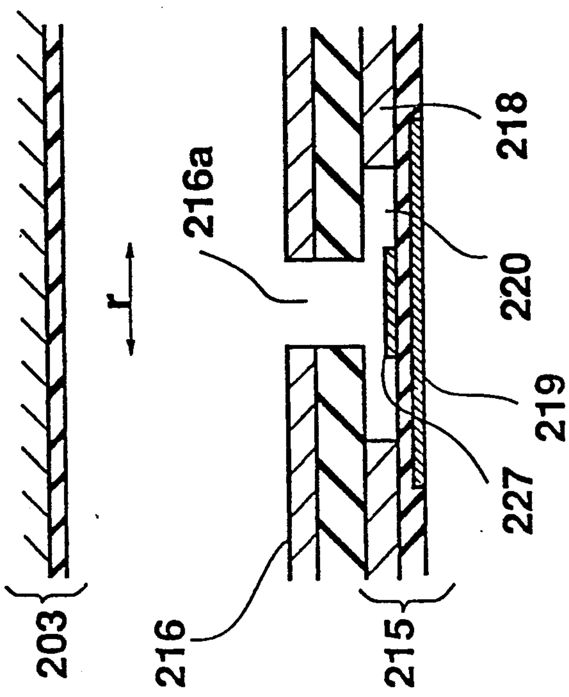

An example of such a configuration is shown in FIG. 32(A). Here, the corona ion control electrode 216 is 18 μm thick. The width of the slit 220 of the corona ion generation electrode 218 is wider than the diameter of the corona ion passing hole 216a of the corona ion control electrode 216 which is 100 μm . The corona ion generation electrode 218 and the corona ion control electrode 216 are 60 μm apart, and the corona ion control electrode 216 and the recording medium 203 are 500 μm apart.

With this configuration, the voltage gain and the corona ion current as a function of a distance from the center of the corona ion passing hole 216a are plotted in FIG. 32(B) and FIG. 32(C), respectively. As shown, the voltage gain has the minimum value of 35 at the center and the maximum value of 150 at the edge of the corona ion control electrode 216, and the corona ion current has the maximum value of $1.5\times10^{-5}$ A/cm$^2$.

Using this configuration with 200 μsec signal voltage, the recording speed of 90 papers/min. For A4 size paper with the resolution of 240 dpi. is obtainable.

Figure 33:
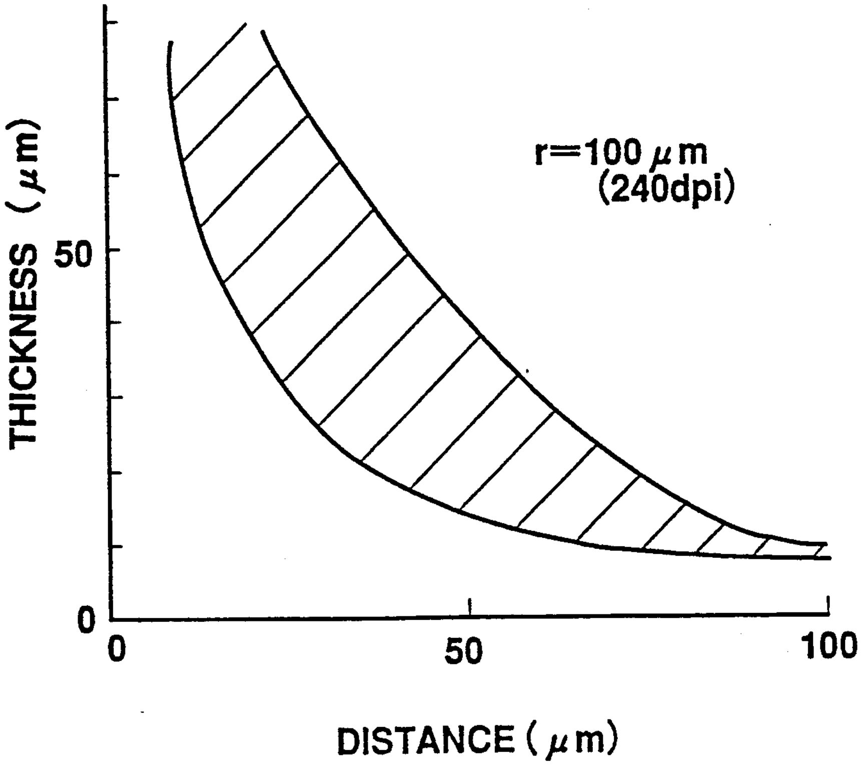
FIG. 33(A) is a graph of a thickness of a corona ion control electrode versus a distance between a corona ion generation electrode and the corona ion control electrode in the appearance of FIG. 29 for one particular resolution level.
FIG. 33(B) is a graph of a thickness of a corona ion control electrode versus a distance between a corona ion generation electrode and the corona ion control electrode in the apparatus of FIG. 29 for another particular resolution level.
Figure 33:
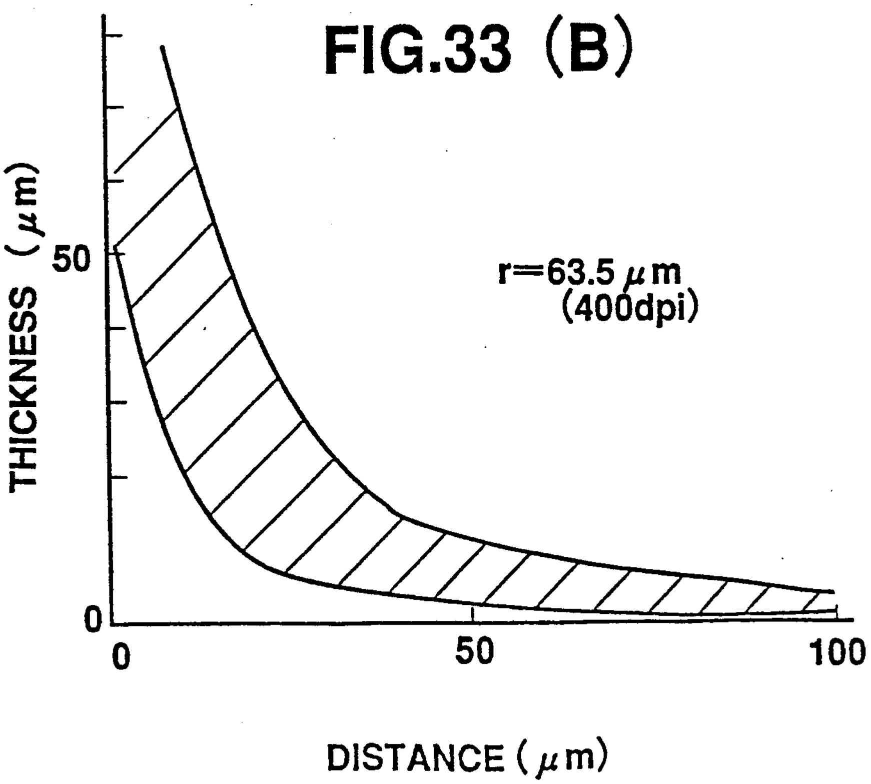

Now the voltage gain k is affected by the thickness of the corona ion control electrode 216 as well as by the distance between the corona ion control electrode 216 and the corona ion generation electrode 218, which in turn affect the amount of the corona ion current, as explained above. The ranges of the thickness of the corona ion control electrode 216 and the distance between the corona ion control electrode 216 and the corona ion generation electrode 218 which can give over 450V electrostatic contrast and 30 papers/min. recording speed has been calculated which is shown for a case of 240 dpi. resolution obtainable with the slit width of 100 μm in FIG .33(A), and for 400 dpi. resolution obtainable with the slit width of 63.5 μm in FIG. 33(B).

Next, as a third variation, the corona ion control electrode 216 and the corona ion generation electrode 218 can be separated by a distance greater than the width of the slit 220 of the corona ion generation electrode 218 so as to have more effective confinement of the electric field in the vicinity of the corona ion generation electrode 218 such that the electric field will not leak into the corona ion passing hole 216a.

Figure 34:
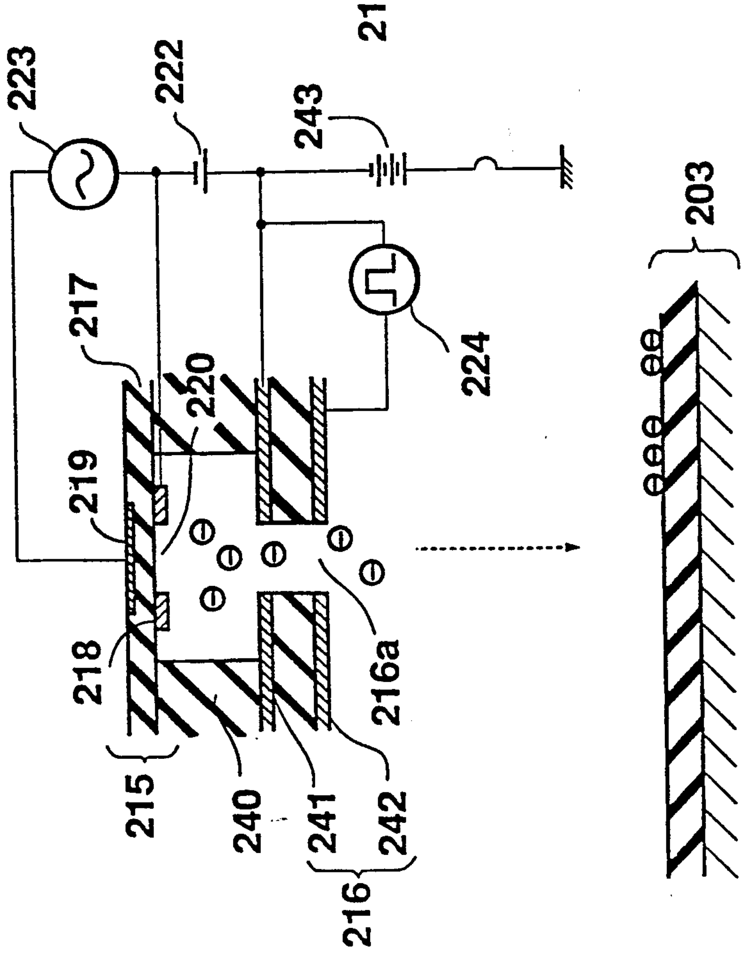
FIG. 34 is a schematic cross sectional view diagram of a second variation of the apparatus of FIG. 21.

Such a configuration is shown in FIG. 34, in which the corona ion control electrode 216 and the corona ion generation electrode 218 having the slit 220 of 100 μm wide are separated by a spacer 240 of 150 μm thick.

In this configuration, the corona ion control electrode 216 comprises a pair of an upper electrode 241 closer to the corona ion generation electrode 218 and a lower electrode 242 closer to the recording medium 203. The upper electrode 241 is given the bias voltage of 40 to 50V in order to select out the negative corona ions from the corona ions generated at the corona ion generation electrode 218 such that only the negative corona ions are moved toward the corona ion control electrode 216. On the other hand, the lower electrode 242 is given the signal voltage 224 comprising a high level equal to that of the bias voltage 222 and a lower level 30V lower than the higher level. As a result, when the signal voltage 224 is at the higher level the corona ions at the corona ion control electrode 216 will be accelerated by a high voltage 243 of 400 to 500V applied between the corona ion control electrode 216 and the recording medium 203, whereas when the signal voltage 224 is at the lower level the corona ion current will be shut off.

The above configuration can further be varied by combining with the previously mentioned variations as follows.

Figure 35:
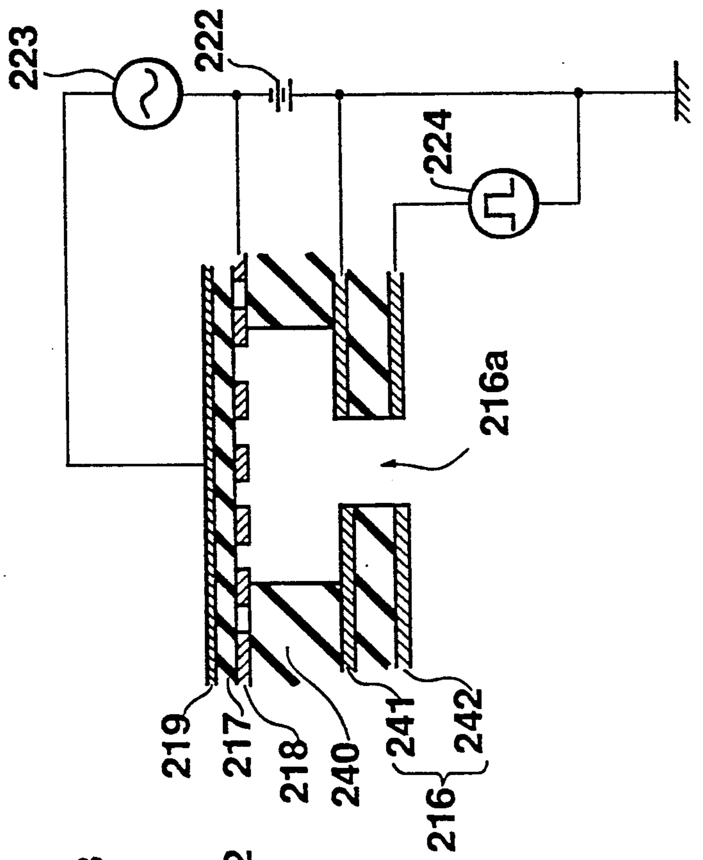
FIG. 35 is a schematic cross sectional view diagram of one variation on the apparatus of FIG. 34.

FIG. 35 shows a configuration in which there are plurality of corona ion generation electrodes 218 placed at 40 μm intervals, so as to stabilize the corona ion current. In this case, the corona ions can be more easily moved toward the corona ion control electrode 216 by applying the bias voltage of 40 to 60V between the corona ion generation electrode 218 and the corona ion control electrode 216.

Figure 36:
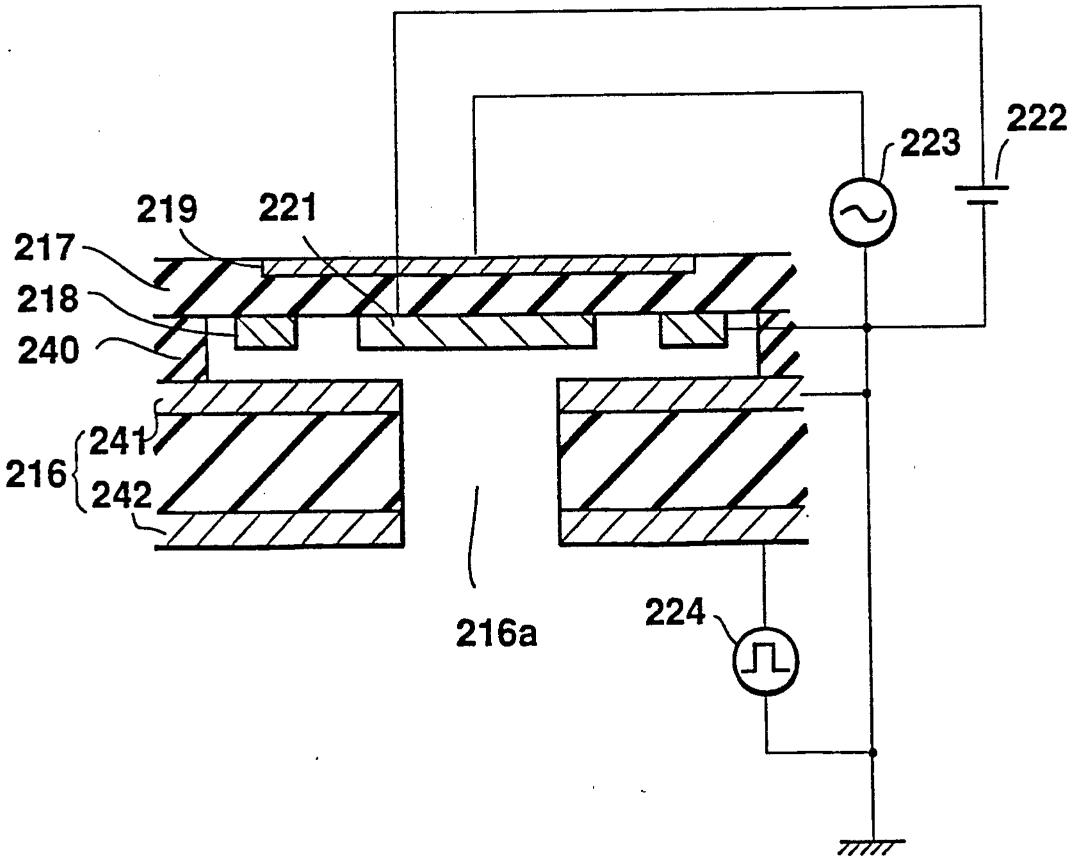
FIG. 36 is a schematic cross sectional view diagram of another variation on the apparatus of FIG. 34.

FIG. 36 shows another configuration in which the barrier electrode 221, which is wider than the diameter of the corona ion control electrode 216, is provided with 15 μm separation from the corona ion generation electrode 218, and the corona ion control electrode 216 and the corona ion generation electrode 218 are separated by the spacer 240 of 100 to 500 μm thickness. In this configuration, the corona ions can be more easily moved toward the corona ion control electrode 216 by applying the bias voltage 222 between the corona ion generation electrode 218 and the barrier electrode 221.

Next, as a fourth variation, the corona ion generation electrode 218 can be made in such a shape that the edge at the slit 220 has an angle with respect to the insulative substrate 217, which is less than 90°.

Figure 37:
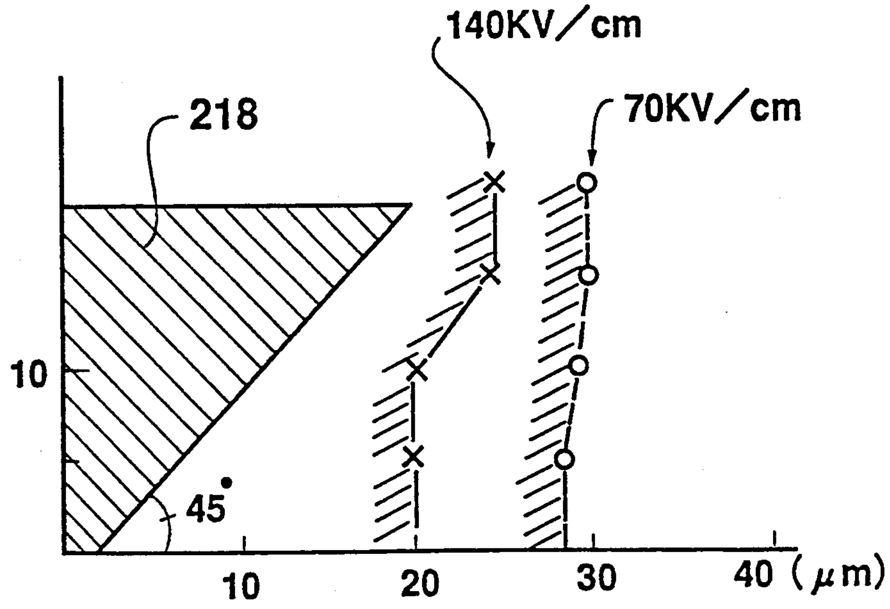
FIG. 37(A) is an enlarged cross sectional view of a corona ion generation electrode in a third variation of the apparatus of FIG. 21.
FIG. 37(B) is an enlarged cross sectional view of a corona ion generation electrode in the conventional apparatus for generating ions.
Figure 37:
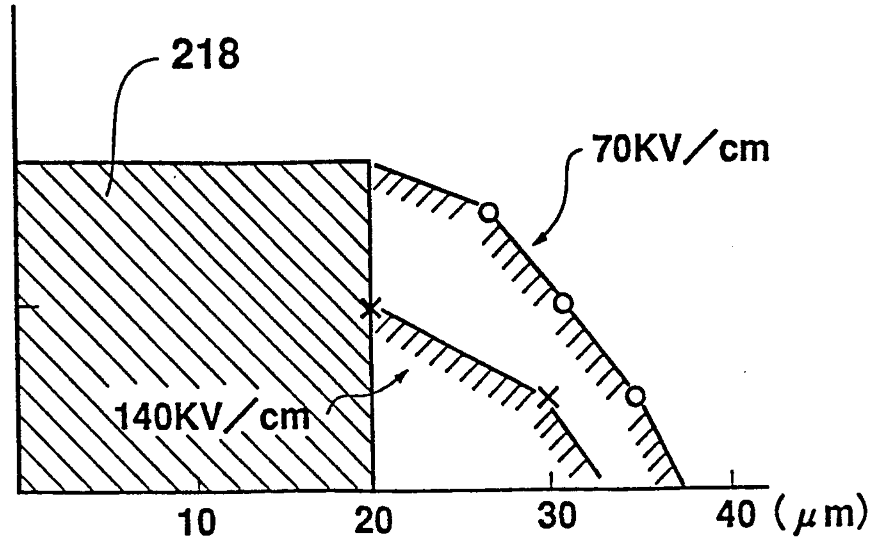

The advantage of this configuration can be seen from FIGS. 37(A) and 37(B) which respectively show field strength in a region in a vicinity of the corona ion generation electrode 218 for this configuration and for usual configuration. These FIGS. 37(A) and 37(B) are obtained with the insulative substrate 217 of 40 μm thick, the corona ion generation electrode 218 of 18 μm thick, the slit 220 of 40 μm wide, and the applied voltage of 1 KV between the corona ion generation electrode 218 and the induction electrode 219. In FIGS. 37(A) and 37(B) the boundaries for 70 KV/cm and 140 KV/cm levels are drawn. Since the insulation breakdown of the air occurs with the field strength greater than 30 KV/cm, it can be assumed that the sufficient corona ion generation is taking place within the boundaries drawn in FIGS. 37(A) and 37(B). As shown, the configuration of this variation is capable to enhance the region for the corona ion generation significantly, compared with the usual configuration.

Figure 38:
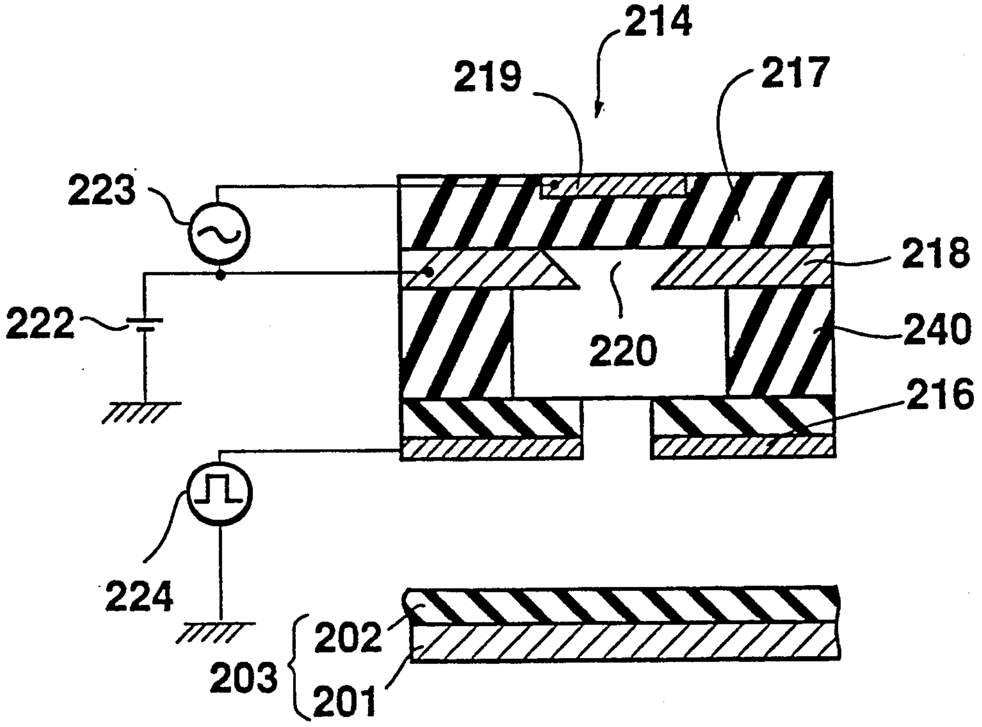
FIG. 38 is a schematic cross sectional view diagram of a third variation of the apparatus of FIG. 21.
Figure 39:
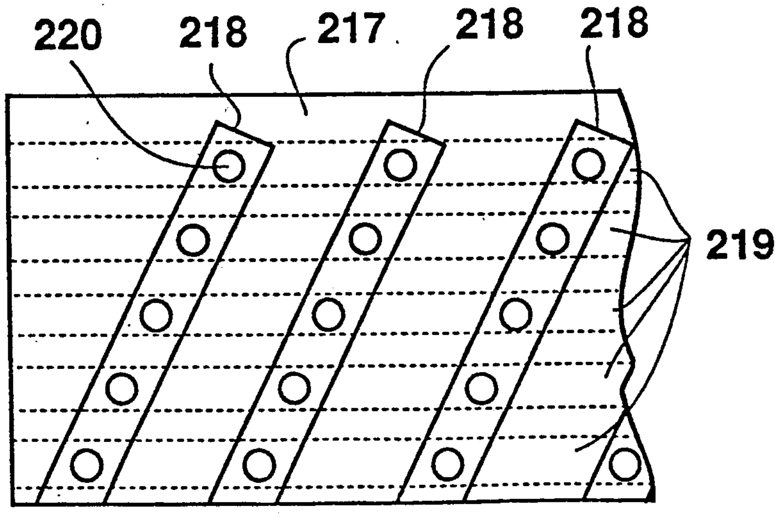
FIG. 39 is a bottom view of a corona ion generation electrodes in the apparatus of FIG. 38.

The ion recording head incorporating this corona ion generation electrode 218 is shown in FIG. 38 in which the angle between the edge of the corona ion generation electrode 218 and the face of the insulative substrate 217 is 60°. As shown in FIG. 39, in this ion recording head, looking from the control electrode 216, the plurality of the corona ion generation electrodes 218 are arranged to cross five induction electrodes 219 provided on the back of the insulative substrate 217 and the slits 220 in shapes of round holes are made on the corona ion generation electrodes 218 at the intersections of the corona ion generation electrodes 218 and the induction electrodes 219.

Figure 40:
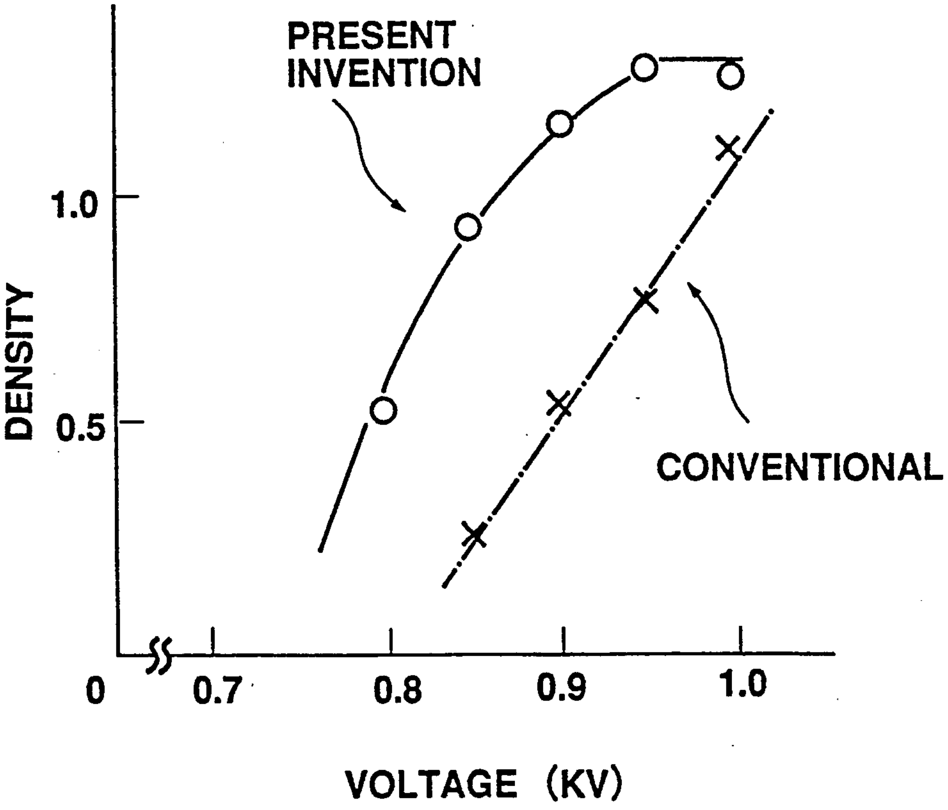
FIG. 40 is a graph of all mark density as a function of applied voltage level for the apparatus of FIG. 38 and for the conventional apparatus for generating ions.

To demonstrate the effect of this configuration of the corona ion generation electrode 218, the all mark density was measured by the ion recording head of FIG. 38 and by the conventional ion recording head in which the angle between the edge of the corona ion generation electrode and the face of the insulative substrate is 90°, for various applied voltage, the result of which is shown in FIG. 40. In the conventional ion recording head, the recording speed was 75 mm/sec, the signal voltage was +400V, and the acceleration voltage was +200V. As shown, it is possible with the ion recording head of FIG. 38 to have higher all mark density even at the low applied voltages, which indicates the higher corona ion generation efficiency.

It is to be noted that the corona ion generator 214 of FIG. 38 without the corona ion control electrode 216 can be utilized as the ion transfer device for transferring the developed toner image from the recording drum to the recording paper, or as a discharging device for clearing the residual corona ions left on the recording drum after the transferring, with the appropriate applied voltages, just as the conventional corona ion generator can be utilized in such manners. In these cases, the higher corona ion generation efficiency of the corona ion generator 214 of FIG. 38 enable to lower the applied voltages than those required for the conventional corona ion generator.

Figure 41:
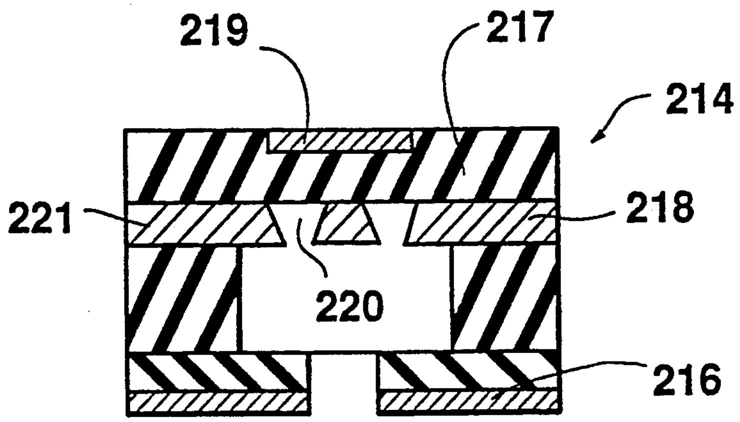
FIG. 41 is a schematic cross sectional view of one variation on the apparatus of FIG. 38.
Figure 42:
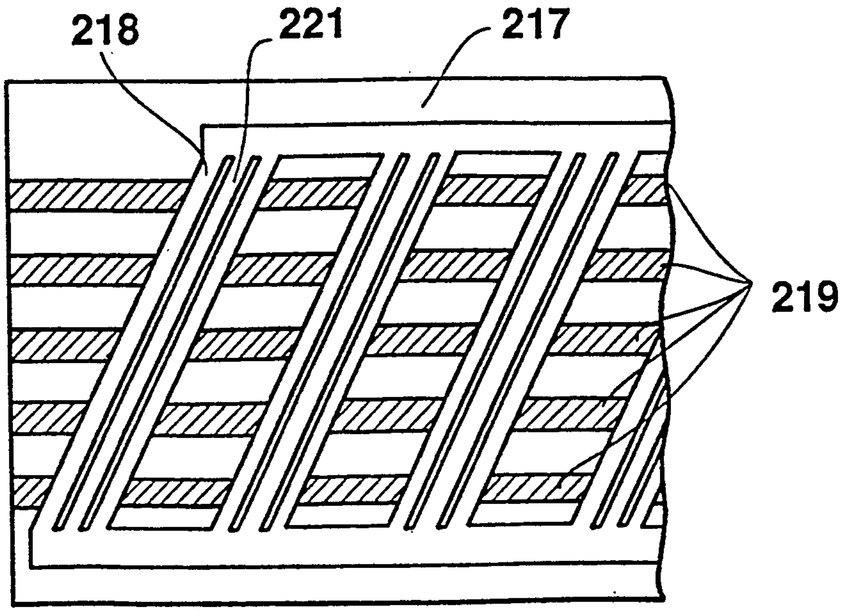
FIG. 42 is a bottom view of a corona ion generation electrodes in the apparatus of FIG. 41.

Furthermore, the barrier electrode 221 can be incorporated in the corona ion generator 214 of FIG. 38 described above, as shown in FIG. 41 in which the angle between the edge of the corona ion generation electrode 218 and the face of the insulative substrate 217 is 75°. As shown in FIG. 42, in this corona ion generator 214, looking from the corona ion control electrode 216, the plurality of the corona ion generation electrodes 218 with the slits 220 in shapes of elongated windows are arranged to cross five induction electrodes 219 provided on the back of the insulative substrate 217, and the barrier generations 221 located in the slits 220 are connected with the corona ion electrodes 218 at side ends located off the induction electrode 219.

Next, as a fifth variation, the width of the slit 220 of the corona ion generation electrode 18 can be made less than the diameter of the corona ion passing hole 216 *a* of the corona ion control electrode 216, so as to be able to tolerate larger dislocation of the corona ion control electrode 216 with respect to the corona ion generation electrode 218 in the manufacturing process by reducing the chance of obstructing the flow of the corona ion current by the corona ion control electrode 216 itself. This feature ensures the same amount of the corona ion currents from all the corona ion generation electrodes, and reduces the number of unacceptable products in the course of manufacturing.

Figure 43:
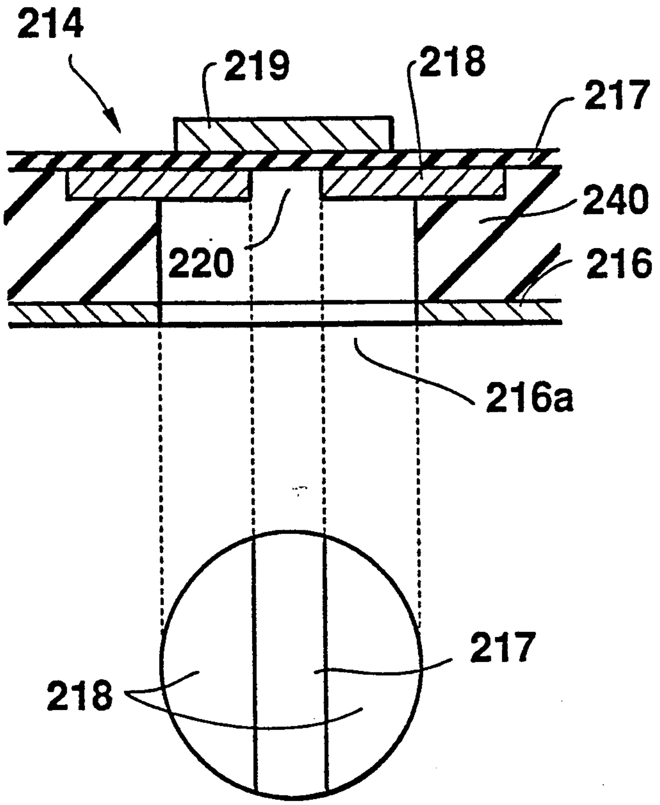
FIG. 43 is a schematic cross sectional view of a fourth variation of the apparatus of FIG. 21.
Figure 44:
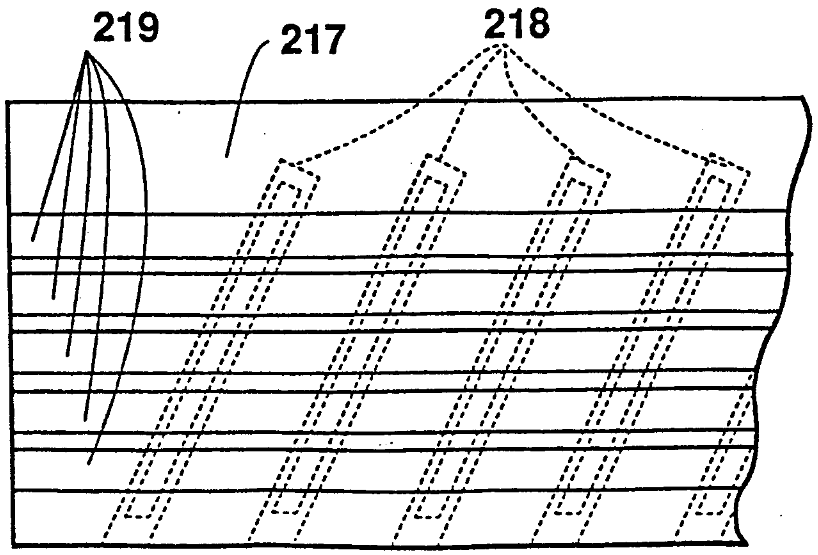
FIG. 44 is a top view of an induction electrodes in the apparatus of FIG. 43.

The corona ion generator 214 incorporating this feature is shown in FIG. 43 in which the slit 220 has the width of 30 μm while the diameter of the corona ion passing hole 216*a* is 100 μm as before, so that about 30 μm dislocation to the corona ion generation electrode 218 is tolerable. FIG. 43 also incorporates a view from the corona ion passing hole 216*a*. As shown in FIG. 44, in this corona ion generator 214, looking from the induction electrode side, five induction electrodes 219 are arranged to cross the plurality of the corona ion generation electrodes 218 with the slits 220 in shapes of elongated windows provided on the other side of the insulative substrate 217. The narrowing of the slit 220 also has the effect of cutting off unnecessary electric field in the slit 220.

Figure 45:
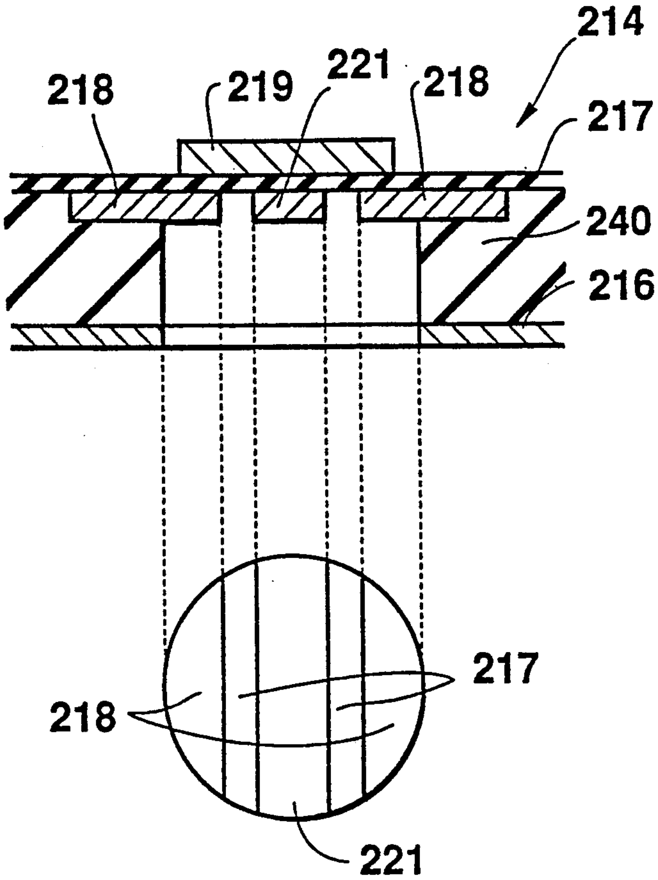
FIG. 45 is a schematic cross sectional view of one variation on the apparatus of FIG. 43.

It is to be noted that the barrier electrode 221 can be incorporated in the slit 220 as in FIG. 45. In this case, the amount of the corona ion generation can be increased so that it is suitable for the high speed recording.

Figure 46:
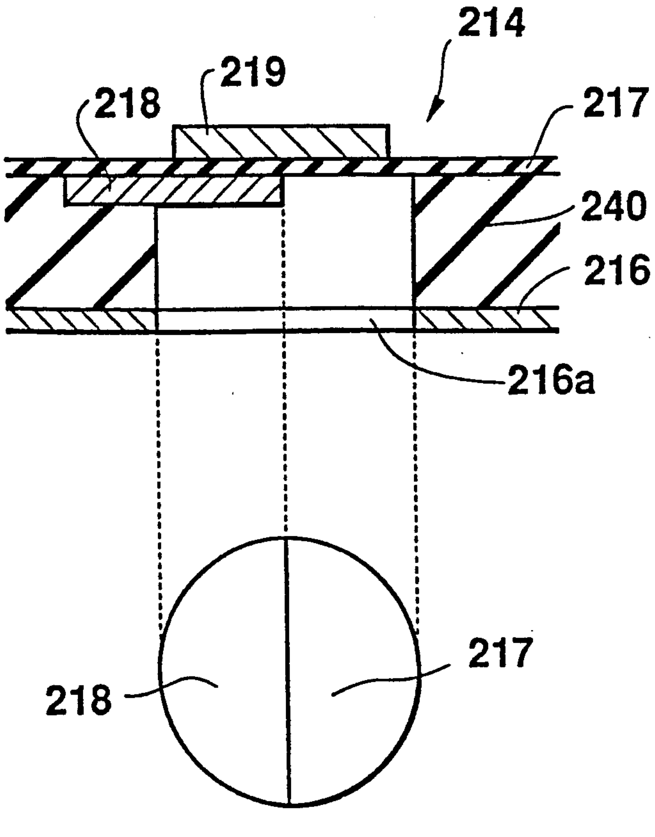
FIG. 46 is a schematic cross sectional view of another variation on the apparatus of FIG. 43.

On the other, even larger tolerance with regards the dislocation of the corona ion control electrode 216 with respect to the corona ion generation electrode 218 is obtainable by making the corona ion generation electrode 218 to be a single bar without the slit, as shown in FIG. 46, in which case as much as 40 μm of the dislocation will be tolerable. However, in this case the amount of the corona ion electrode decreases so that the high speed recording becomes impossible.

Figure 47:
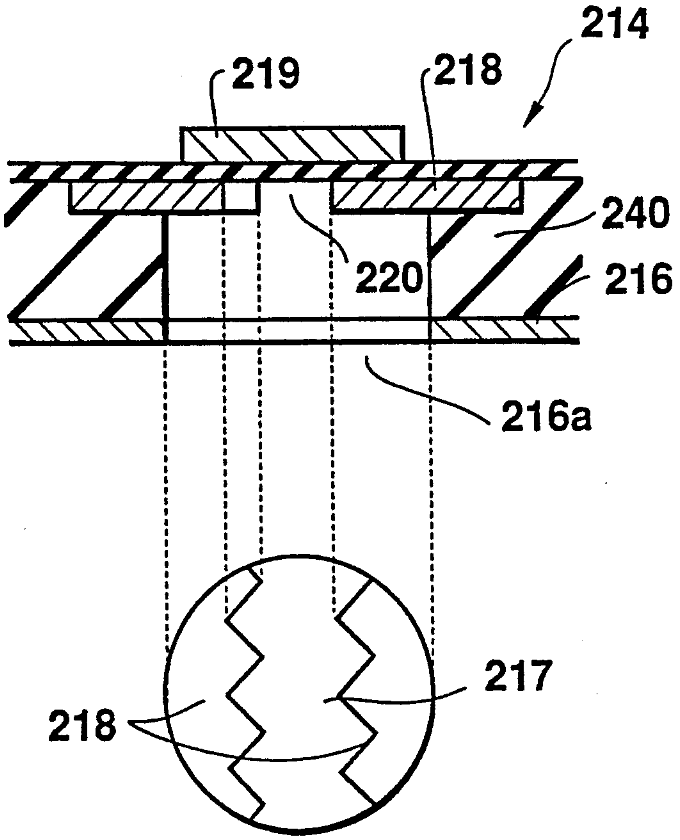
FIG. 47 is a schematic cross sectional view of still another variation on the apparatus of FIG. 43.

It is also to be noted that the slit can have the jagged shape as shown in FIG. 47, instead of the straight shape as in the above. This jagged shape also contribute to increase the amount of the corona ion generation since the region of the strong electric field becomes longer and the electric field becomes stronger at the corners.

Figure 48:
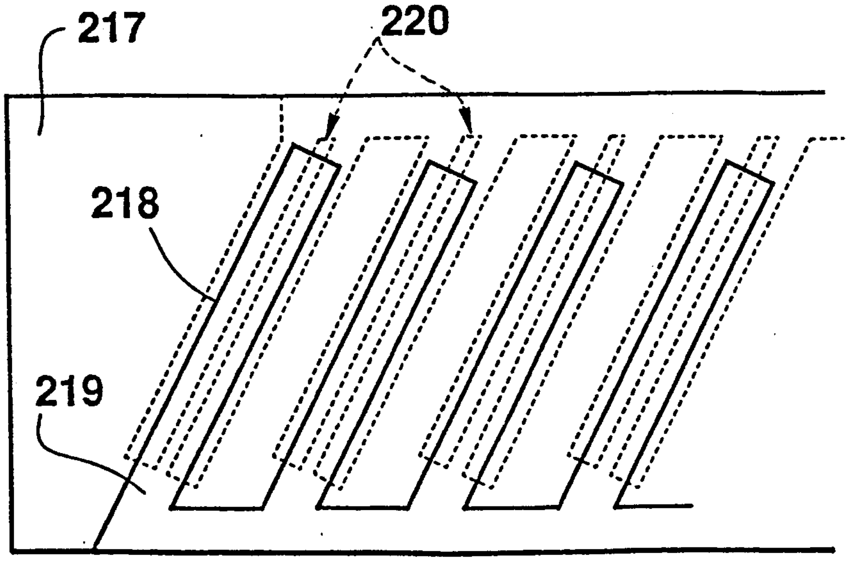
FIG. 48 is a top view of one variation of a configuration for an induction electrodes of FIG. 44 in the apparatus of FIG. 43.
Figure 49:
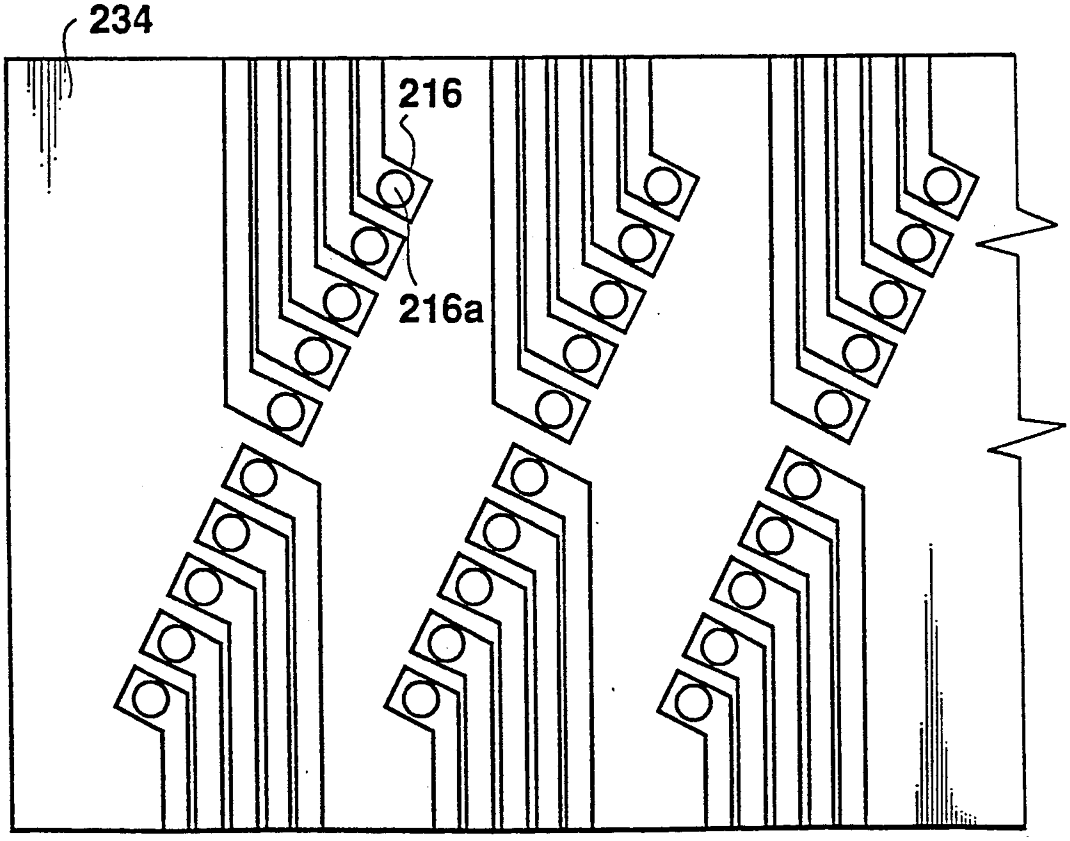
FIG. 49 is a bottom view of a corona ion control electrodes in the variation of FIG. 48.
Figure 50:
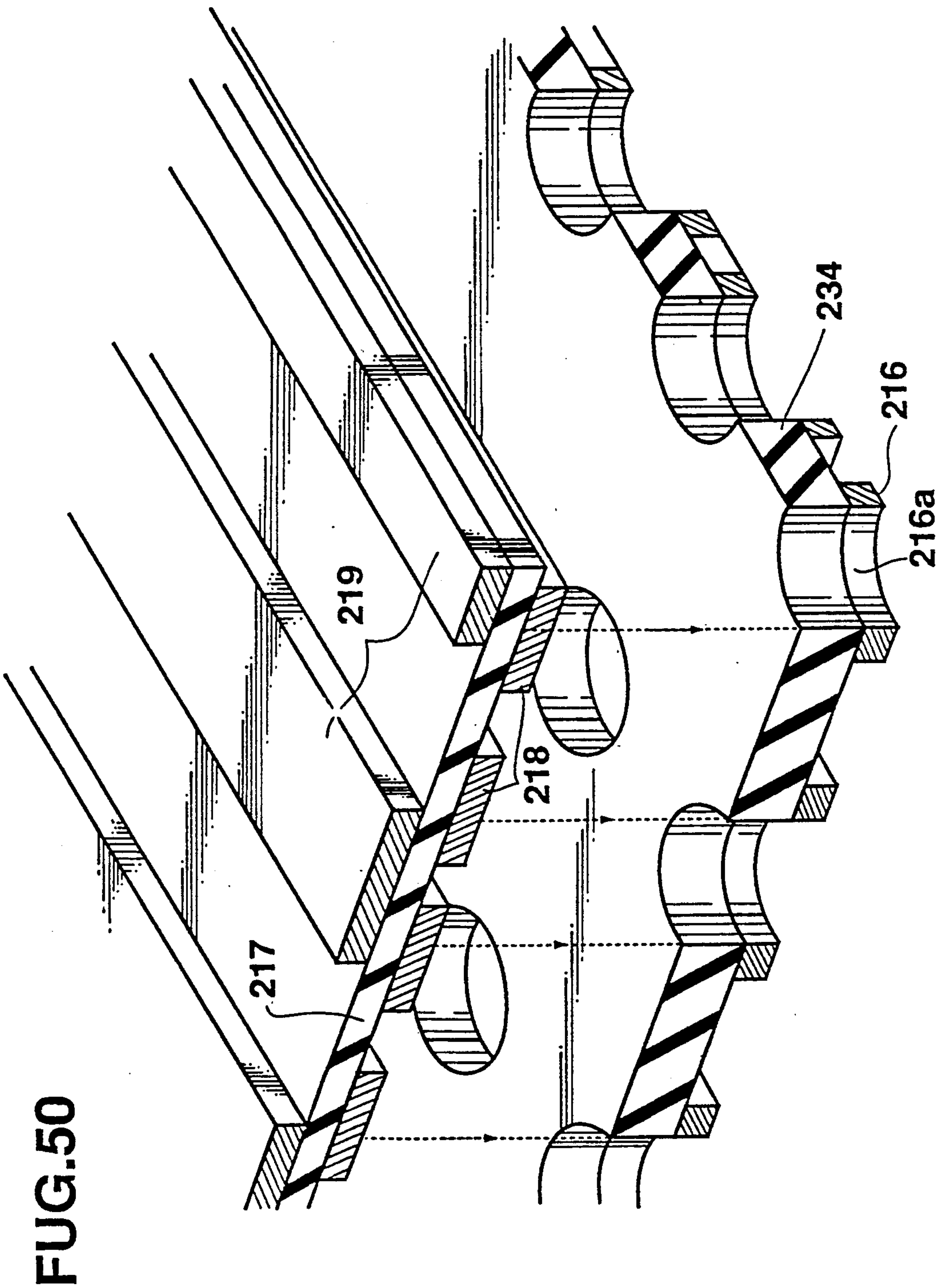
FIG. 50 is a perspective view of electrodes in the variation of FIG. 48.

It is also to be noted that the configuration of the corona ion generation electrode 218 and the induction electrode 219 shown in FIG. 44 can be modified as shown in FIG. 48 in which, looking from the induction electrode side, the plurality of induction electrodes 219 are arranged to overlap with the plurality of the corona ion generation electrodes 218 with the slits 220 in shapes of elongated windows provided on the other side of the insulative substrate 217. This insulative substrate 217 with the corona ion generation electrodes 218 and the induction electrodes 219 is then combined with the insulative substrate 240 carrying the corona ion control electrodes 216 with corona ion passing holes 216*a* arranged to line up with the slits 220 of the corona ion generation electrodes 218 which is shown in FIG. 49. The expanded perspective view of these insulative substrates 217 and 240 is shown in FIG. 50.

Now, there are several applications of the various embodiment of the apparatus for ion recording described above which can endow additional advantages, which will now be described.

As a first application, the third embodiment of the ion recording head described above can be utilized in reducing the excess toner on the recording drum resulting from the excessive toner image formation outside of the real electrostatic latent image as follows.

Figure 51:
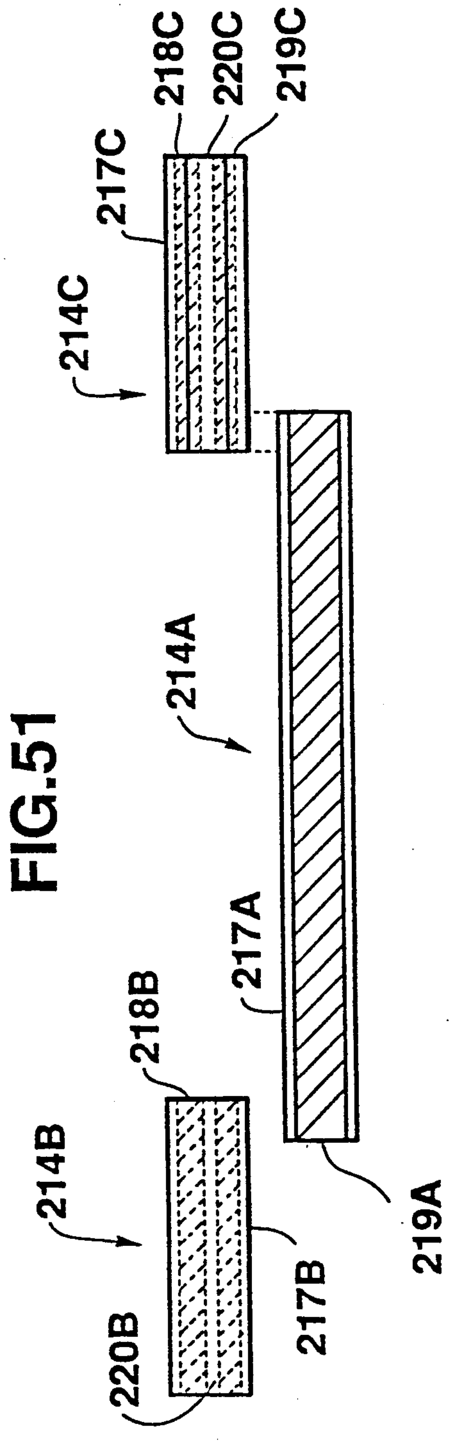
FIG. 51 is a schematic top plan view of a fifth variation of the pre-charging corona ion generator in the apparatus of FIG. 21.

Namely, in a case of a printer for printing two different sizes of papers which is taken as A4 size (21 cm wide) and A3 size (29.7 cm wide), the corona ion generator 214 is divided up into three pieces 214A, 214B, and 214C as shown in FIG. 51 in a top view. As shown, the middle piece 214A is 21 cm wide while each of the two side pieces 214B and 214C is 4.5 cm wide, and these two side pieces 214B and 214C are placed 1 mm away from the middle piece 214A with 1.5 mm overlaps between the middle piece 214A and each of the side pieces 214B and 214C.

Figure 52:
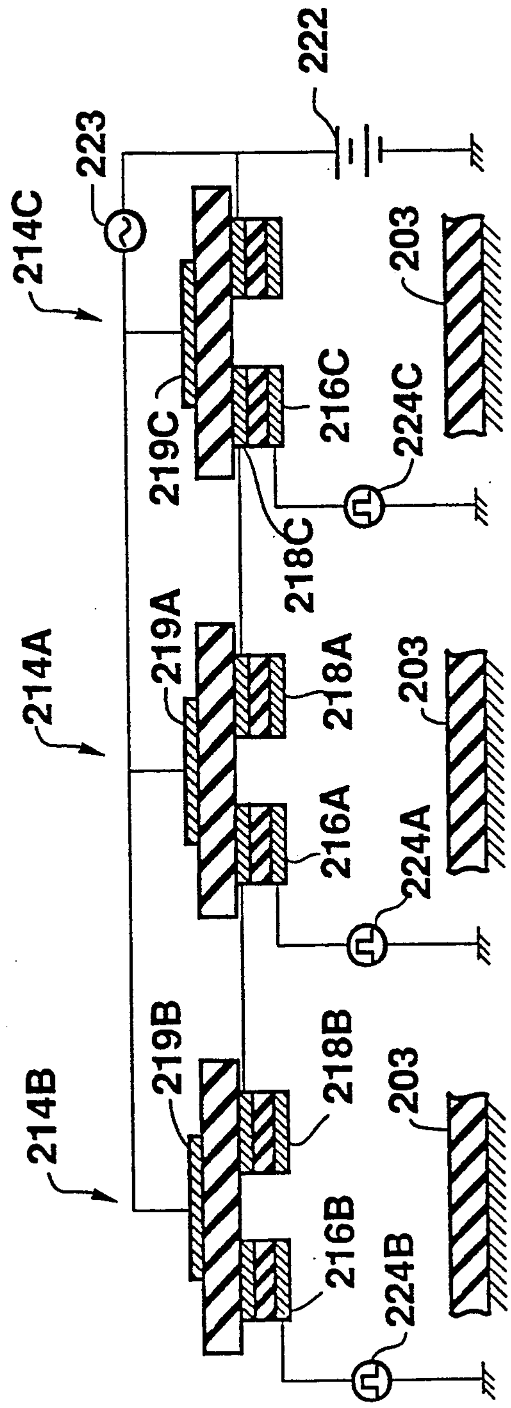
FIG. 52 is a schematic cross sectional view diagram of the apparatus of FIG. 51.

These three pieces 214A, 214B and 214C are connected as shown in circuit diagram of FIG. 52. Namely, the corona ion generation electrodes and the induction electrodes of all three pieces 214A, 214B and 214C are applied with the common bias voltage 222 and the common alternating voltage 223, whereas the corona ion control electrodes of the three pieces 214A, 214B and 214C are selectively activated by separate signal voltages 224A, 224B and 224C in accordance with the paper size. This is possible because in the corona ion generator of the third embodiment the corona ion current can easily be shut on and off by the low signal voltage.

Figure 53:
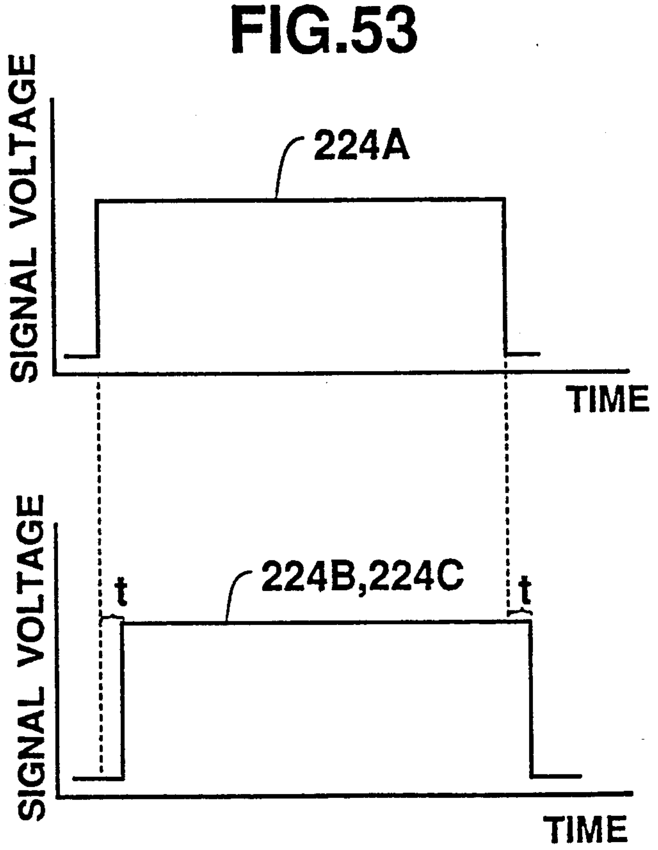
FIG. 53 is a diagram for signal voltages to be used in the apparatus of FIG. 51.

In printing A4 size paper, only the middle piece 214A will be activated by the signal voltage 114 A of a shape shown in upper half of FIG. 53 where the rise and fall corresponds to top and bottom of A4 size paper. On the other hand, in printing A3 size paper, the middle piece 214A is activated as before, and two side pieces 214B and 214C are also activated by the signal voltages 224B and 224C of a shape shown in lower half of FIG. 53 which is delayed for a time t corresponding to 1 mm separation between the middle piece 214A and the two side pieces 214B and 214C. In this case, the rise and fall of the signal voltages 224A, 224B and 224C corresponds to top and bottom of A3 size paper.

Figure 54:
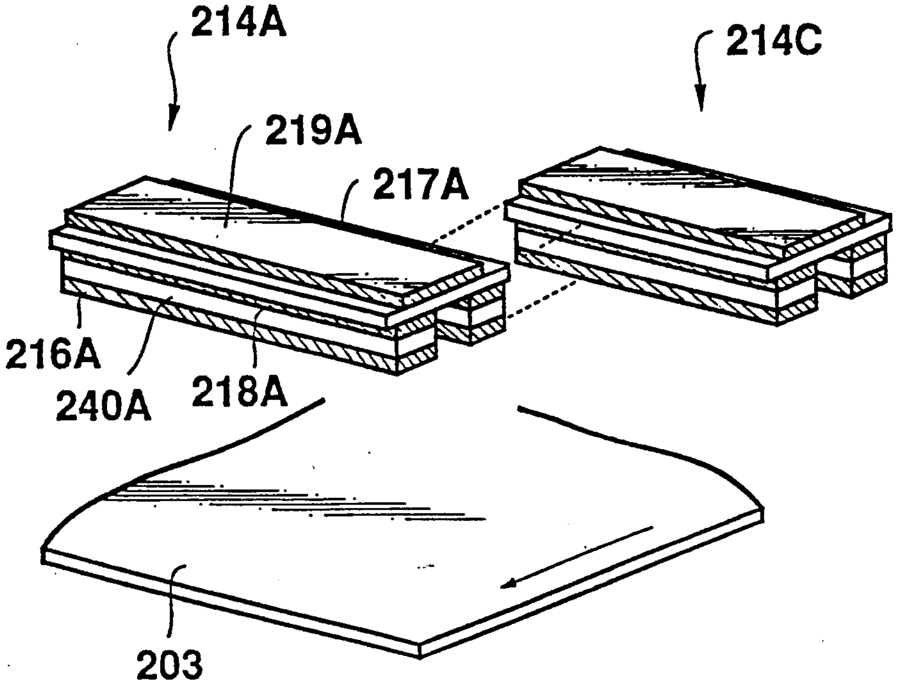
FIG. 54 is a partial perspective view of the apparatus of FIG. 51 for explaining its operation.

Now, in printing A3 size paper, there are regions of the recording medium 203 which are charged twice by the overlapping sections of the middle piece 214A and that of one of the two side pieces 214B and 214C, one of which is depicted in FIG. 54.

Figure 55:
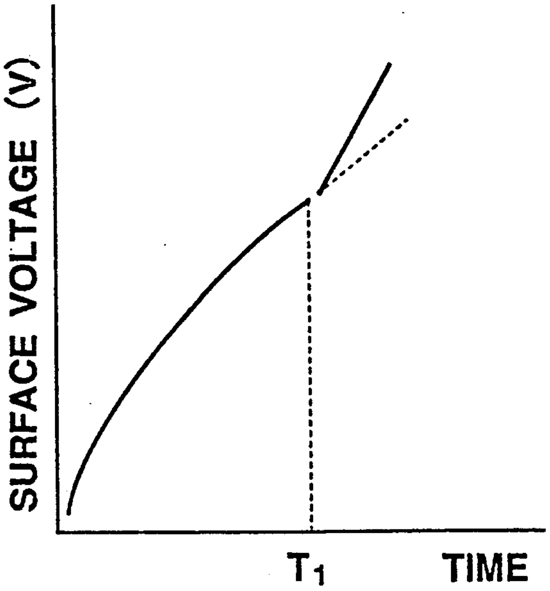
FIG. 55 is a graph of a surface voltage level of a recording medium as a function of time in a conventional apparatus for generating ions.

Here, if the conventional charger using high voltages is used, the surface voltage level of the recording drum increases in time as shown in FIG. 55, such that after the surface voltage level were raised to the appropriate level for printing at time $T_1$ by the middle piece, the side piece raises the surface voltage level further, so that the portions of the recording drum under the overlapping sections are excessively charged which causes uneven printing result.

Figure 56:
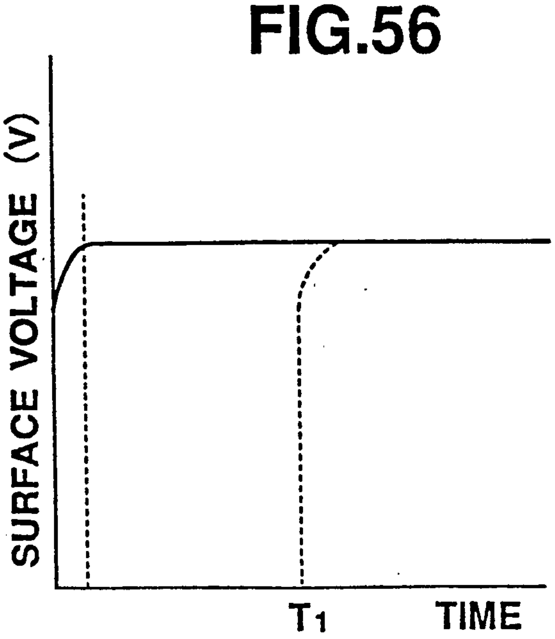
FIG. 56 is a graph of a surface voltage level of a recording medium as a function of time in the apparatus of FIG. 51.

On the other hand, as shown in FIG. 56, with the corona ion generator of the third embodiment, the corona ion current is quickly saturated so that within few μsec the surface voltage level are raised to the appropriate level for printing and will be maintained afterward, and the side piece does not raise the surface voltage level but only maintains it at the appropriate level, so that the even printing result is obtainable.

Next, as a second application, the ion recording head according to the present invention can be utilized to make an electrostatic recording apparatus such as a facsimile capable of recording with the recording medium moved at varying speed or even intermittently.

This is possible because in the ion recording head according to the present invention the signal voltage can be applied in the timing determined in accordance with the motion of the recording medium. As a consequence, the uniform recording quality is obtainable regardless of the speed of motion of the recording medium because the surface voltage level of the recording medium is unrelated to the speed of motion of the recording medium.

With this recording apparatus, a page memory capacity usually equipped with a high quality recording apparatus in order to achieve the uniform recording quality will be unnecessary, and it is possible to have high quality recording on ordinary papers at high speed with intermittent recording process allowed, which has not been possible conventionally.

Now, the process of developing the electrostatic latent image in the third embodiment of the ion recording apparatus shown in FIG. 26 will be explained, which is carried out along with the cleaning of the residual toner on the recording drum in this embodiment.

Figure 57:
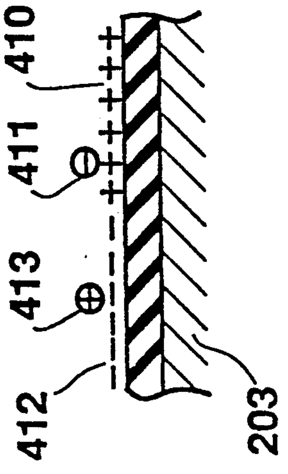
FIGS. 57(A) to 57(E) are schematic diagrams of a recording medium in the apparatus of FIG. 26 or explaining the process of developing electrostatic latent image.
Figure 57:
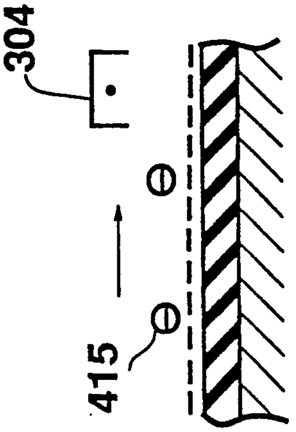
Figure 57:
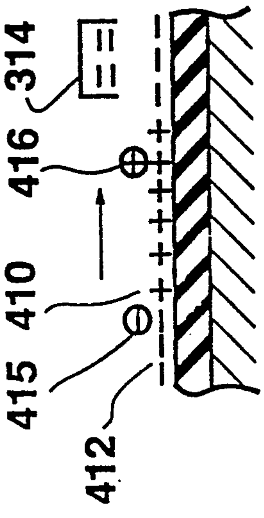
Figure 57:
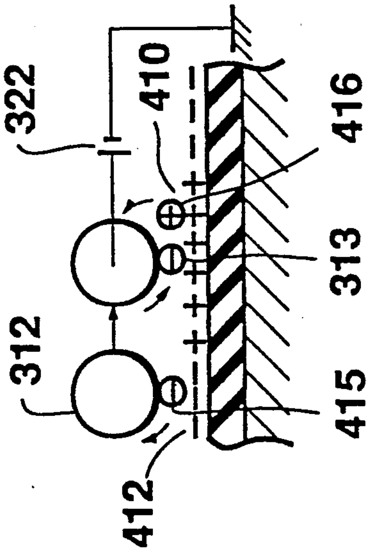
Figure 57:
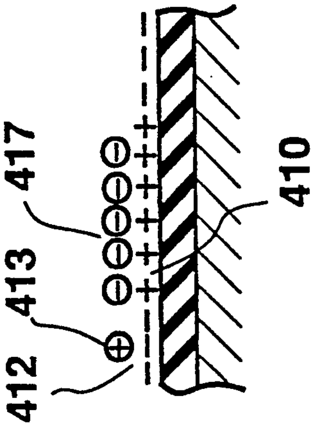

As shown in FIG. 57(A), after the completion of one recording, the recording medium 203 still carries residual toner 411 left over from the previous recording on an image region 410 and fog toner 413 resulting from the previous recording on a non-image region 412 which can either be positively charged as shown or negatively charged.

Then, as shown in FIG. 57(B), the surface voltage level of the recording medium 203 is brought down to −50V or 0V by the discharging from the pre-charging corona ion generator 304. Here, the recording medium 203 is made to have the uniform voltage level because of the leakage due to discharging at the side faces, regardless of the amount of the residual toner. All the residual toner and fog toner are turned into negatively charged remaining toner 415 as a result of this discharging step.

Next, as shown in FIG. 57(C), new electrostatic latent image is formed by the positive corona ions from the ion recording head 314 on the recording medium 203. Here, the image region 410 as well as original residual toner 416 located on the image region 410 are positively charge, whereas the non-image region 412 remains at the low level obtained at the discharging step.

Next, as shown in FIG. 57(D), the developing of the electrostatic latent image and the cleaning of the residual toner are simultaneously performed by the developing roller 312 which is positively biased by a bias voltage 322 not greater than the surface voltage level of the electrostatic latent image. Here, the negatively charged remaining toner 415 on the non-image region 412 is attracted toward the positively biased developing roller 312 so as to be cleaned off the recording medium 203, while the original residual toner 416 is also attracted toward the developing roller 312 which has lower voltage level than the electrostatic latent image on the image region 410 so as to be cleaned of the recording medium 203. On the other hand, the negatively charged developer toner 313 carried by the developing roller 312 is attracted toward the electrostatic latent image on the recording medium 203 which has higher voltage level than the developing roller 312 so as to develop the electrostatic latent image.

As a result, as shown in FIG. 57(E), visible developed image 417 is formed on the recording medium 203 over the image region 410, while some for toner 413 may be left on the non-image region 412 which may either be positively charged as shown or negatively charged. This developed image 417 is then transferred onto the recording paper P by the roller transfer device 318 which may produce some residual toner 411 on the image region 410 as has already been shown in FIG. 57(A).

Figure 58:
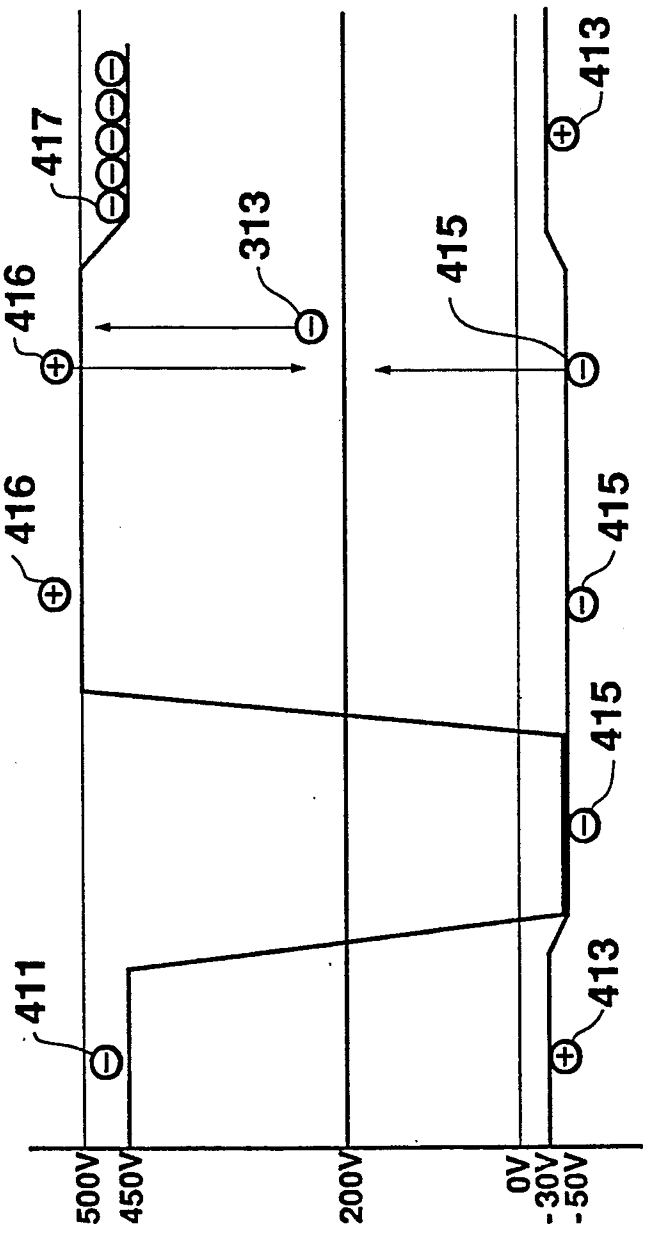
FIG. 58 is a diagram of surface voltage levels of the recording medium in the apparatus of FIG. 26 for explaining the process of developing electrostatic latent image.

The change of the surface voltage level of the recording medium 203 during the course of this developing process is shown in FIG. 58, in which sections (A) to (E) correspond to steps explained above using FIGS. 57(A) to 57(E), respectively. In FIG. 58, the surface voltage level of the image region 410 is drawn as a solid line, that of the non-image region 412 is drawn as a dashed line, and the bias voltage of the developing roller 312 is drawn as a chain line.

The recording medium 203 at the beginning step (A) is at +450V on the image region 410 with the negative residual toner 411 and −30V on the non-image region 412 with the positive for toner 413. By the discharging step (B), the surface voltage level of the recording medium 203 becomes uniform at −50V along with the negatively charged remaining toner 415. At the recording step (C) the image region 410 is elevated to α500V along with the original residual toner 416, while the non-image region 412 remains at −50V along with the negatively charged remaining toner 415. At the developing step (D), the original residual toner at +500V as well as the negatively charged remaining toner 415 at −50V are attracted toward the developing roller 312 at +200V, while the negatively charged developer toner 313 is attracted toward the electrostatic latent image on the image region 410 at +500V. As a result, at the last step (E) the image region 410 is at +450V with the developed image 417 while the non-image region 412 is at −30V with the for toner 413.

Thus, in this developing process, no image memory from the previous recording appears on new image subsequently recorded.

It is to be noted by using the corona ion generators of the present invention, it is possible to achieve further simplification of the apparatus around the recording medium 203 by adjusting the control voltages at the corona ion control electrodes 216 such that the negatively charged corona ions are given to the non-image region 412 whereas the positively corona ions are given to the image region 410, so that the discharging by the pre-charging corona ion generator 204 can be omitted.

As for the roller transfer device 318 in FIG. 26, a highly advantageous roller transfer device disclosed in U.S. pat. application Ser. No. 07/343,621 by some of the present inventors can be employed. Such a combination is regarded as highly preferable, as some of the advantages gained by one can be further amplified by the other in this combination.

It is to be noted that various features of various embodiments and variations described above may be combined in any possible combination, so far as being compatible with each other, in order to obtain various advantages of the combined features together.

It is further to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for ion recording of an image information on a recording paper, comprising:

a recording medium on which an electrostatic latent image corresponding to the image information is to be formed;

first corona ion generator means for charging the recording medium uniformly at a pre-charge voltage level in a first polarity; and second corona ion generator means for forming the electrostatic latent image on the recording medium by charging the recording medium to a recording voltage level in a second polarity which is opposite the first polarity with flows of corona ions corresponding to the electrostatic latent image to be formed, including a plurality of ion generators, each of which is corresponding to a picture element of the electrostatic latent image and includes corona ion generation electrode means having a gap for generating corona ions in the gap, the corona ions being accelerated toward the recording medium by the one voltage level give to the recording medium by the first corona ion generator means;

field production inducing electrode means for inducing production of an electric field for generating corona ions in the gap of the corona ion generation electrode means;

corona ion control electrode means having a corona ion passing hole for controlling flows of corona ions generated by the corona ion generation electrode means and passing through the corona ion passing hole;

alternating voltage source means for applying alternating voltage to cause corona ion generation at the corona ion generation electrode means between corona ion generation electrode means and the field production inducing electrode means; and driving IC means for applying signal voltage to the corona ion control electrode means, the signal voltage being significantly less than a peak voltage of the alternating voltage, according to which the flow of corona ions is controlled by the corona ion control electrode means.

2. The apparatus of claim 1, wherein the alternating voltage and the signal voltage have periods significantly longer than a time taken by the flows of corona ions to move from the corona ion generation electrode means to the recording medium.

3. The apparatus of claim 1, wherein the first corona ion generator means comprises:

pre-charging corona ion generation electrode means having a gap for generating corona ions in the gap;

pre-charging field production inducing electrode means for inducing production of an electric field for generating corona ions in the gap of the pre-charging corona ion generation electrode means; and pre-charging alternating voltage source means for applying alternating voltage to cause corona ion generation at the pre-charging generation electrode means between the pre-charging corona ion generation electrode means and the pre-charging field production inducing electrode means.

4. The apparatus of claim 3, further comprising insulative substrate on which the pre-charging corona ion generation electrode means and the pre-charging field production inducing electrode means are mounted, and wherein the gap in the pre-charging corona ion generation electrode means has a width wider than a thickness of the insulative substrate.

5. The apparatus of claim 1, wherein the first corona ion generator means and the second corona ion generator means are arranged together to form a single entity.

6. The apparatus of claim 1, wherein the gap of the corona ion generation electrode means is an elongated slit which extends over more than one of the corona ion passing holes of the corona ion control electrode means.

7. The apparatus of claim 1, wherein the recording medium moves with respect to the second corona ion generator means at variable speed.

8. The apparatus of claim 1, wherein the recording medium moves with respect to the second corona ion generator means intermittently.

9. The apparatus of claim 3, wherein the recording medium moves with respect to the corona ion generator means at variable speed.

10. The apparatus of claim 3, wherein the recording medium moves with respect to the first corona ion generator means intermittently.

11. The apparatus of claim 1, further comprising:

means for developing the electrostatic latent image with developer into developed image on the recording medium; and means for transferring the developed image onto the recording paper electrostatically; and wherein first residual developer remaining on the recording medium after the transfer of the developed image by the transferring means in previous recording inside the electrostatic latent image for next recording is charged to one of the pre-charge voltage, level and the recording voltage level by one of the first corona ion generator means and the second corona ion generator means, whereas second residual developer remaining on the recording medium after the transfer of the developed image by the transferring means in previous recording outside the electrostatic latent image for next recording is charged to another one of the pre-charge voltage level and the recording voltage level by another one of the first corona ion generator means and the second corona ion generator means.

12. The apparatus of claim 11, wherein the developing means is biased to a voltage level between the pre-charge voltage level and the recording voltage level, and wherein the developer is in the first polarity of the pre-charge voltage level, such that the developer moves from the developing means to the electrostatic latent image on the recording medium to develop the electrostatic latent image, while both of the first and second residual developers moved from the recording medium to the developing means so as to be cleaned off the recording medium.

13. The apparatus of claim 1, wherein each of the ion generators further comprises barrier electrode means, placed inside the gap in the corona ion generation electrode means, for cutting off unnecessary electric field inside the gap.

14. The apparatus of claim 13, wherein the barrier electrode means has a width greater than a diameter of the corona ion passing hole of the corona ion control electrode means.

15. The apparatus of claim 13, wherein the barrier electrode means has a width less than a diameter of the corona ion passing hole of the corona ion control electrode means.

16. The apparatus of claim 13, further comprising bias voltage source means for applying a common bias voltage to the corona ion generation electrode means and the barrier electrode means with respect to the corona ion control electrode means.

17. The apparatus of claim 1, wherein the signal voltage comprises two distinct voltage levels corresponding to turning on and off of the flow of corona ions, and which further comprises bias voltage source means for applying bias voltage between the corona ion generation electrode means and the field production inducing electrode means with respect to the corona ion control electrode means, where the bias voltage is equal to one of the two distinct levels of the signal voltage.

18. The apparatus of claim 1, further comprising insulative substrate on which the corona ion generation electrode means and the field production inducing electrode means are mounted, and wherein the gap in the corona ion generation electrode means has a width wider than a thickness of the insulative substrate.

19. The apparatus of claim 1, wherein the alternating voltage has a frequency which is an integer multiple of a frequency of the signal voltage.

20. The apparatus of claim 1, wherein the alternating voltage source means and the driving IC means are synchronized.

21. The apparatus of claim 1, wherein the alternating voltage has a peak voltage significantly greater than that required for generating sufficient amount of the corona ions needed in recording the electrostatic latent image.

22. The apparatus of claim 1, wherein the corona ion generation electrode means, the field production inducing electrode means, and the driving IC means are mounted on a single insulative substrate.

23. The apparatus of claim 1, wherein the corona ion control electrode means comprises a pair of upper electrode means closer to the corona ion generation electrode means and lower electrode means farther from the corona ion generation electrode means.

24. The apparatus of claim 23, wherein the upper electrode means of the corona ion control electrode means is grounded.

25. The apparatus of claim 1, wherein the corona ion generation electrode means and the corona ion control electrode means are separated by a distance greater than a width of the gap in the corona ion generation electrode means.

26. The apparatus of claim 1, further comprising acceleration voltage source means for applying an acceleration voltage to accelerate the flow of corona ions between the corona ion generation electrode means and the corona ion control electrode means.

27. The apparatus of claim 1, further comprising insulative substrate on which the corona ion generation electrode means is mounted, and wherein an angle between edges of the corona ion generation electrode means facing the gap and a face of the insulative substrate facing the gap is less than 90°.

28. The apparatus of claim 27, wherein each of the ion generators further comprises barrier electrode means, placed inside the gap in the corona ion generation electrode means and also mounted on the insulative substrate, for cutting off unnecessary electric field inside the gap, and wherein an angle between edges of the barrier electrode means facing the gap and a face of the insulative substrate facing the gap is less than 90°.

29. The apparatus of claim 1, wherein the second corona ion generator means is divided into more than one divided sections which can be activated independently.

30. The apparatus of claim 29, wherein the signal voltage comprises more than one independent parts each of which is to be given to each one of the divided sections of the second corona ion generator means independently.

31. The apparatus of claim 29, wherein each of the divided sections has portions overlapping with adjacent divided sections.

* * * * *